United States Patent
Adams et al.

(10) Patent No.: US 10,681,377 B2
(45) Date of Patent: *Jun. 9, 2020

(54) STREAMING THE VISIBLE PARTS OF A SPHERICAL VIDEO

(71) Applicant: GOOGLE LLC, Mountain View, CA (US)

(72) Inventors: Riley Adams, Mountain View, CA (US); Jim Bankoski, Los Gatos, CA (US)

(73) Assignee: GOOGLE LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/916,959

(22) Filed: Mar. 9, 2018

(65) Prior Publication Data
US 2018/0199065 A1    Jul. 12, 2018

Related U.S. Application Data

(63) Continuation of application No. 14/518,956, filed on Oct. 20, 2014, now Pat. No. 9,918,082, and a continuation of application No. 14/519,006, filed on Oct. 20, 2014, now Pat. No. 9,918,094, and a continuation of application No. 14/518,710, filed on
(Continued)

(51) Int. Cl.
*H04N 7/12* (2006.01)
*H04N 19/597* (2014.01)
*H04N 19/61* (2014.01)
*H04N 19/85* (2014.01)
*H04N 19/176* (2014.01)
(Continued)

(52) U.S. Cl.
CPC ............ *H04N 19/597* (2014.11); *G06T 11/00* (2013.01); *H04N 19/176* (2014.11); *H04N 19/503* (2014.11); *H04N 19/61* (2014.11); *H04N 19/85* (2014.11)

(58) Field of Classification Search
CPC .................................................. H04N 19/597
See application file for complete search history.

(56) References Cited

U.S. PATENT DOCUMENTS

| 6,356,297 B1 | 3/2002 | Cheng et al. |
| 6,466,254 B1 | 10/2002 | Furlan et al. |
| 2006/0034374 A1 | 2/2006 | Park et al. |

FOREIGN PATENT DOCUMENTS

| CN | 102685532 A | 9/2012 |
| EP | 1162830 A2 | 12/2001 |

(Continued)

OTHER PUBLICATIONS

Extended European Search Report for European Application No. 15853542.7, dated Feb. 16, 2018, 11 pages.
(Continued)

*Primary Examiner* — Y Lee
(74) *Attorney, Agent, or Firm* — Brake Hughes Bellerman LLP

(57) ABSTRACT

A method includes determining a tile position in a frame of a spherical video based on a view perspective, selecting a portion of the frame of the spherical video as a two dimensional tile based on the tile position, encoding the two dimensional tile at a first quality, mapping the frame of the spherical video to a two dimensional representation of the spherical video based on a two dimensional projection algorithm, and encoding the two dimensional representation of the spherical video at a second quality.

16 Claims, 39 Drawing Sheets

Related U.S. Application Data

Oct. 20, 2014, now Pat. No. 9,917,877, and a continuation of application No. 14/518,779, filed on Oct. 20, 2014, now abandoned.

(51) Int. Cl.
*H04N 19/503* (2014.01)
*G06T 11/00* (2006.01)

(56) References Cited

FOREIGN PATENT DOCUMENTS

| | | |
|---|---|---|
| EP | 2645713 A1 | 10/2013 |
| WO | 2016064862 | 4/2016 |

OTHER PUBLICATIONS

German, D. M. et al., "New methods to project panoramas for practical and aesthetic purposes", Computational Aesthetics in Graphics Visualization, and Imaging, The Eurographics Association, XP002523600, Jun. 1, 2007, pp. 13-22.
International Search Report and Written Opinion from PCT/US2015/056442, dated Feb. 18, 2016, 14 Pages.
First Office Action with English translation for Chinese Application No. 201580035476.1, dated Feb. 2, 2019, 31 pages.

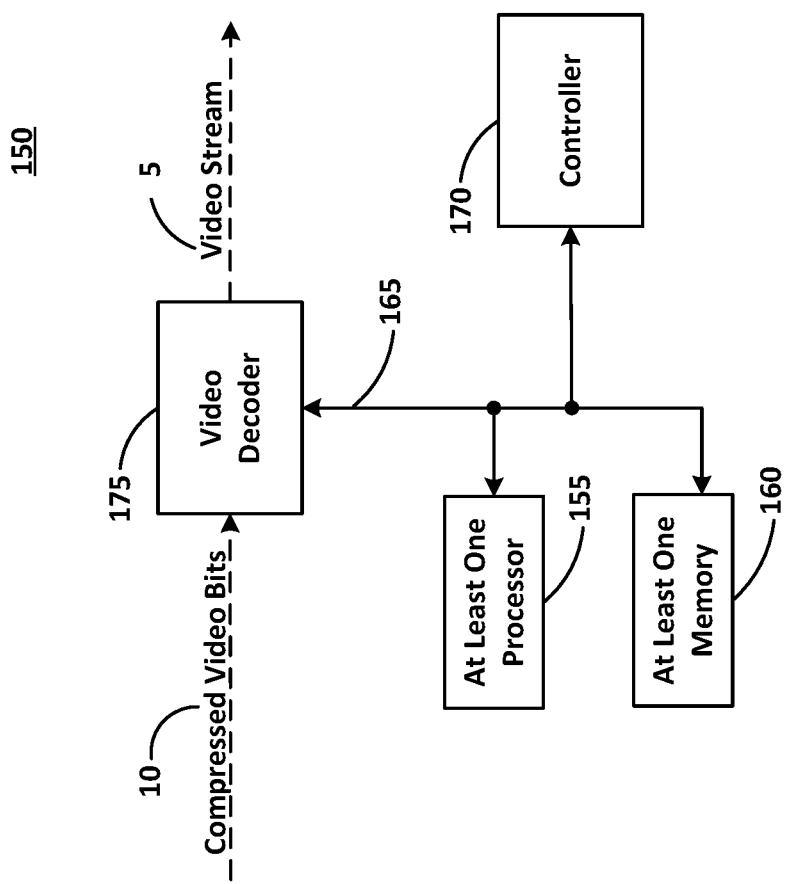

| Block | Adjacent End Block - column | Adjacent End Block - row |
|---|---|---|
| 415-2 | 425-2 | |
| 440 | 435 | |
| 420 | | 430 |
| ... | ... | ... |

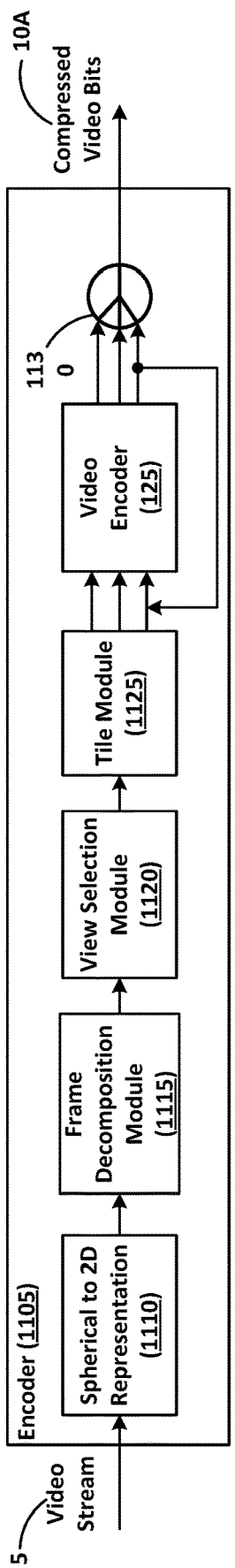
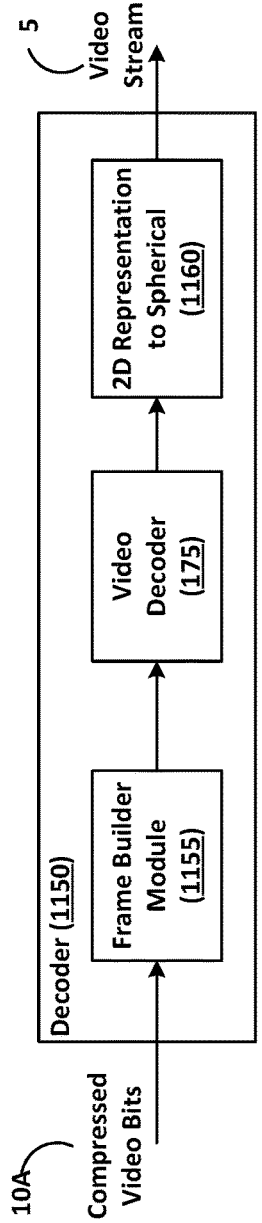
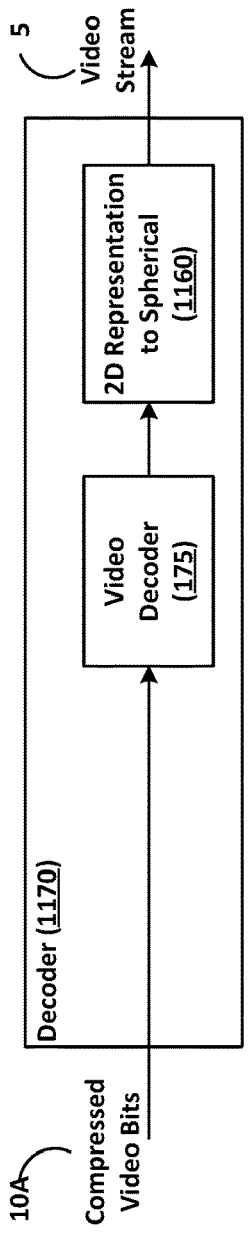
FIG. 11A
FIG. 11B
FIG. 11C

| Block | Adjacent End Block - column | Adjacent End Block - row |
|---|---|---|
| 2130-1 | 2130-2 | |
| 2135-1 | | 2135-2 |
| ... | | ... |
| ... | ... | ... |

STREAMING THE VISIBLE PARTS OF A SPHERICAL VIDEO

RELATED APPLICATIONS

This application is a continuation of U.S. Non-provisional patent application Ser. No. 14/518,956, filed on Oct. 20, 2014, entitled "CONTINUOUS PREDICTION DOMAIN", of U.S. Non-provisional patent application Ser. No. 14/519,006, filed on Oct. 20, 2014, entitled "COMPRESSING AND REPRESENTING MULTI-VIEW VIDEO", of U.S. Non-provisional patent application Ser. No. 14/518,710, filed on Oct. 20, 2014, entitled "STREAMING THE VISIBLE PARTS OF A SPHERICAL VIDEO", and of U.S. Non-provisional patent application Ser. No. 14/518,779, filed on Oct. 20, 2014, entitled "MAPPING SPHERICAL IMAGE TO 2D REPRESENTATIONS", the contents of which are incorporated in their entirety herein by reference.

FIELD

Embodiments relate to encoding and decoding a spherical image and a spherical video. Embodiments relate to streaming spherical video.

BACKGROUND

Streaming spherical video (or other three dimensional video) can consume a significant amount of system resources. For example, an encoded spherical video can include a large number of bits for transmission which can consume a significant amount of bandwidth as well as processing and memory associated with encoders and decoders.

SUMMARY

Example embodiments describe systems and methods to optimize streaming spherical video (and/or other three dimensional video) based on visible (by a viewer of a video) portions of the spherical video.

In a general aspect, a method includes determining a tile position in a frame of a spherical video based on a view perspective, selecting a portion of the frame of the spherical video as a two dimensional tile based on the tile position, encoding the two dimensional tile at a first quality, mapping the frame of the spherical video to a two dimensional representation of the spherical video based on a two dimensional projection algorithm, and encoding the two dimensional representation of the spherical video at a second quality.

Implementations can include one or more of the following features. For example, the method can further include transmitting the encoded two dimensional tile and the encoded two dimensional representation as a streaming spherical video. The first quality is a higher quality as compared to the second quality. The view perspective can be based on a viewable portion of the spherical video as seen by a viewer during a playback of the spherical video. For example, the method can further include receiving an indication of the view perspective from a device executing a playback of the spherical video. For example, the method can further include transmitting the encoded two dimensional tile over a first time period while streaming the spherical video, and transmitting the encoded two dimensional tile and the encoded two dimensional representation over a first time period while streaming the spherical video.

For example, the selecting of the portion of the frame of the spherical video as the two dimensional tile and the encoding of the two dimensional tile can include selecting the two dimensional tile from a datastore of previously encoded tiles and reading the from the two dimensional tile from the datastore. The selecting of the portion of the frame of the spherical video as the two dimensional tile can include selecting the two dimensional tile from the frame of the spherical video as a frame to be encoded based on a position on the spherical video, wherein the position on the spherical video is based on the view perspective. The encoding of the two dimensional tile can include generating at least one residual for the two dimensional tile by subtracting a template from un-encoded pixels of a block of the two dimensional tile to be encoded, encoding the at least one residual by applying a transform to a residual block including the at least one residual, quantizing transform coefficients associated with the encoded at least one residual and entropy encoding the quantized transform coefficients as at least one compressed video bit, wherein at least one of the generating of the at least one residual, the encoding of the at least one residual, the quantizing of the transform coefficients, and the quantizing of the transform coefficients includes setting of at least one parameter based on the first quality.

For example, the encoding of the two dimensional representation of the spherical video can include generating at least one residual for the two dimensional representation of the spherical video by subtracting a template from un-encoded pixels of a block of the two dimensional representation of the spherical video to be encoded, encoding the at least one residual by applying a transform to a residual block including the at least one residual, quantizing transform coefficients associated with the encoded at least one residual, and entropy encoding the quantized transform coefficients as at least one compressed video bit, wherein at least one of the generating of the at least one residual, the encoding of the at least one residual, the quantizing of the transform coefficients, and the quantizing of the transform coefficients includes setting of at least one parameter based on the second quality.

In a general aspect, a method includes receiving an encoded bit stream including an encoded two dimensional representation of a spherical video frame and an encoded two dimensional tile selected from the spherical video frame, decoding the two dimensional tile, decoding the two dimensional representation of the spherical video frame, converting the two dimensional representation to the spherical video frame, and replacing corresponding blocks of the spherical video frame with the decoded two dimensional tile.

Implementations can include one or more of the following features. For example, the receiving of the encoded bit stream includes receiving a header indicating a technique used during a conversion of a frame of the spherical video to the two dimensional representation of the spherical video frame. The replacing of the corresponding blocks of the spherical video frame with the decoded two dimensional tile includes one of pixel by pixel or block by block replacement of pixels or blocks in the decoded and converted spherical video frame with pixels or blocks of the decoded two dimensional tile.

For example, the converting of the two dimensional representation of the spherical video frame includes mapping the two dimensional representation of the spherical video frame to a spherical image using an inverse of a technique used to map the spherical video frame to the two dimensional representation of the spherical video frame. For example, the method can further include generating a spherical video stream based on at least one spherical video frame including the replaced two dimensional tile such that during a playback of the spherical video stream, wherein a visible portion of the spherical video stream is of a higher quality than a non-visible portion of the spherical video stream.

In a general aspect, a non-transitory computer-readable storage medium having stored thereon computer executable program code which, when executed on a computer system, causes the computer system to perform steps including determining a tile position in a frame of a spherical video based on a view perspective, selecting a portion of the frame of the spherical video as a two dimensional tile based on the tile position, encoding the two dimensional tile at a first quality, mapping the frame of the spherical video to a two dimensional representation of the spherical video based on a two dimensional projection algorithm, and encoding the two dimensional representation of the spherical video at a second quality.

Implementations can include one or more of the following features. For example, the steps can further include receiving an indication of the view perspective from a device executing a playback of the spherical video, wherein the view perspective is based on a viewable portion of the spherical video as seen by a viewer during the playback of the spherical video. The first quality is a higher quality as compared to the second quality. The selecting of the portion of the frame of the spherical video as the two dimensional tile and the encoding of the two dimensional tile can include selecting the two dimensional tile from a datastore of previously encoded tiles, and reading the two dimensional tile from the two dimensional tile from the datastore. The selecting of the portion of the frame of the spherical video as the two dimensional tile can include selecting the two dimensional tile from the frame of the spherical video as a frame to be encoded based on a position on the spherical video, wherein the position on the spherical video is based on the view perspective.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the example embodiments and wherein:

FIG. 1B illustrates a video decoder system according to at least one example embodiment.

FIG. 11A illustrates a flow diagram for a video encoder system according to at least one example embodiment.

FIGS. 11B and 11C illustrate flow diagrams for a video decoder system according to at least one example embodiment.

FIG. 21F illustrates a look-up table according to at least one example embodiment.

Figure 1A:
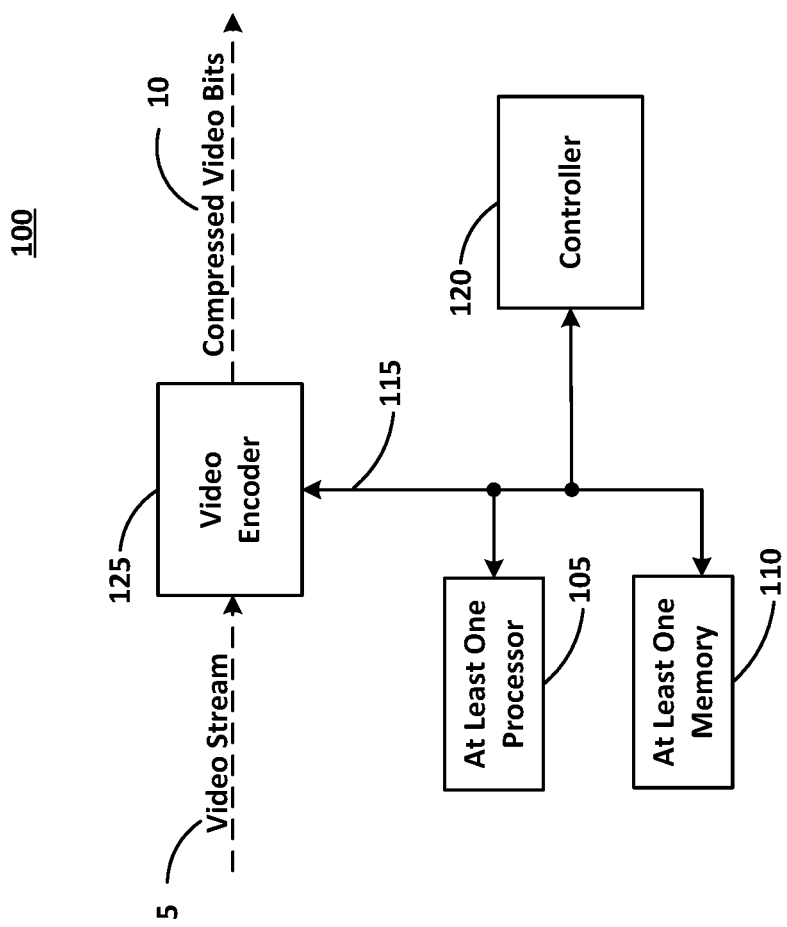
FIG. 1A illustrates a video encoder system according to at least one example embodiment.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of structural elements may be reduced or exaggerated for clarity. The use of similar or identical reference numbers in the various drawings is intended to indicate the presence of a similar or identical element or feature.

DETAILED DESCRIPTION OF THE EMBODIMENTS

While example embodiments may include various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

In the example of FIG. 1A, a video encoder system 100 may be, or include, at least one computing device and can represent virtually any computing device configured to perform the methods described herein. As such, the video encoder system 100 can include various components which may be utilized to implement the techniques described herein, or different or future versions thereof. By way of example, the video encoder system 100 is illustrated as including at least one processor 105, as well as at least one memory 110 (e.g., a non-transitory computer readable storage medium).

FIG. 1A illustrates the video encoder system according to at least one example embodiment. As shown in FIG. 1A, the video encoder system 100 includes the at least one processor 105, the at least one memory 110, a controller 120, and a video encoder 125. The at least one processor 105, the at least one memory 110, the controller 120, and the video encoder 125 are communicatively coupled via bus 115.

The at least one processor 105 may be utilized to execute instructions stored on the at least one memory 110, so as to thereby implement the various features and functions described herein, or additional or alternative features and functions. The at least one processor 105 and the at least one memory 110 may be utilized for various other purposes. In particular, the at least one memory 110 can represent an example of various types of memory and related hardware and software which might be used to implement any one of the modules described herein.

The at least one memory 110 may be configured to store data and/or information associated with the video encoder system 100. For example, the at least one memory 110 may be configured to store codecs associated with intra-prediction and/or mapping spherical video or images to 2D representations of the spherical video or images. The at least one memory 110 may be a shared resource. For example, the video encoder system 100 may be an element of a larger system (e.g., a server, a personal computer, a mobile device, and the like). Therefore, the at least one memory 110 may be configured to store data and/or information associated with other elements (e.g., image/video serving, web browsing or wired/wireless communication) within the larger system.

The controller 120 may be configured to generate various control signals and communicate the control signals to various blocks in video encoder system 100. The controller 120 may be configured to generate the control signals to implement the techniques described below. The controller 120 may be configured to control the video encoder 125 to encode an image, a sequence of images, a video frame, a video sequence, and the like according to example embodiments. For example, the controller 120 may generate control signals corresponding to inter-prediction, intra-prediction and/or mapping spherical video or images to 2D representations of the spherical video or images. More details related to the functions and operation of the video encoder 125 and controller 120 will be described below in connection with at least FIGS. 5 and 6.

The video encoder 125 may be configured to receive a video stream input 5 and output compressed (e.g., encoded) video bits 10. The video encoder 125 may convert the video stream input 5 into discrete video frames. The video stream input 5 may also be an image, accordingly, the compressed (e.g., encoded) video bits 10 may also be compressed image bits. The video encoder 125 may further convert each discrete video frame (or image) into a C×R matrix of blocks (hereinafter referred to as blocks or as macroblocks). For example, a video frame (or image) may be converted to a matrix of 16×16, a 16×8, an 8×8, a 4×4 or a 2×2 blocks each having a number of pixels. Although five example matrices are listed, example embodiments are not limited thereto.

The compressed video bits 10 may represent the output of the video encoder system 100. For example, the compressed video bits 10 may represent an encoded video frame (or an encoded image). For example, the compressed video bits 10 may be ready for transmission to a receiving device (not shown). For example, the video bits may be transmitted to a system transceiver (not shown) for transmission to the receiving device.

The at least one processor 105 may be configured to execute computer instructions associated with the controller 120 and/or the video encoder 125. The at least one processor 105 may be a shared resource. For example, the video encoder system 100 may be an element of a larger system (e.g., a mobile device). Therefore, the at least one processor 105 may be configured to execute computer instructions associated with other elements (e.g., image/video serving, web browsing or wired/wireless communication) within the larger system.

In the example of FIG. 1B, a video decoder system 150 may be at least one computing device and can represent virtually any computing device configured to perform the methods described herein. As such, the video decoder system 150 can include various components which may be utilized to implement the techniques described herein, or different or future versions thereof. By way of example, the video decoder system 150 is illustrated as including at least one processor 155, as well as at least one memory 160 (e.g., a computer readable storage medium).

Thus, the at least one processor 155 may be utilized to execute instructions stored on the at least one memory 160, so as to thereby implement the various features and functions described herein, or additional or alternative features and functions. The at least one processor 155 and the at least one memory 160 may be utilized for various other purposes. In particular, the at least one memory 160 can represent an example of various types of memory and related hardware and software which might be used to implement any one of the modules described herein. According to example embodiments, the video encoder system 100 and the video decoder system 150 may be included in a same larger system (e.g., a personal computer, a mobile device and the like). The video decoder system 150 can be configured to perform the opposite or reverse operations of the encoder 100.

The at least one memory 160 may be configured to store data and/or information associated with the video decoder system 150. For example, the at least one memory 110 may be configured to store inter-prediction, intra-prediction and/or mapping spherical video or images to 2D representations of the spherical video or images. The at least one memory 160 may be a shared resource. For example, the video decoder system 150 may be an element of a larger system (e.g., a personal computer, a mobile device, and the like). Therefore, the at least one memory 160 may be configured to store data and/or information associated with other elements (e.g., web browsing or wireless communication) within the larger system.

The controller 170 may be configured to generate various control signals and communicate the control signals to various blocks in video decoder system 150. The controller 170 may be configured to generate the control signals in order to implement the video decoding techniques described below. The controller 170 may be configured to control the video decoder 175 to decode a video frame according to example embodiments. The controller 170 may be configured to generate control signals corresponding to intra-prediction and/or mapping spherical video or images to 2D representations of the spherical video or images. More details related to the functions and operation of the video decoder 175 and controller 170 will be described below in connection with at least FIGS. 7 and 8.

The video decoder 175 may be configured to receive a compressed (e.g., encoded) video bits 10 input and output a video stream 5. The video decoder 175 may convert discrete video frames of the compressed video bits 10 into the video stream 5. The compressed (e.g., encoded) video bits 10 may also be compressed image bits, accordingly, the video stream 5 may also be an image.

The at least one processor 155 may be configured to execute computer instructions associated with the controller 170 and/or the video decoder 175. The at least one processor 155 may be a shared resource. For example, the video decoder system 150 may be an element of a larger system (e.g., a personal computer, a mobile device, and the like). Therefore, the at least one processor 155 may be configured to execute computer instructions associated with other elements (e.g., web browsing or wireless communication) within the larger system.

Figure 2A:
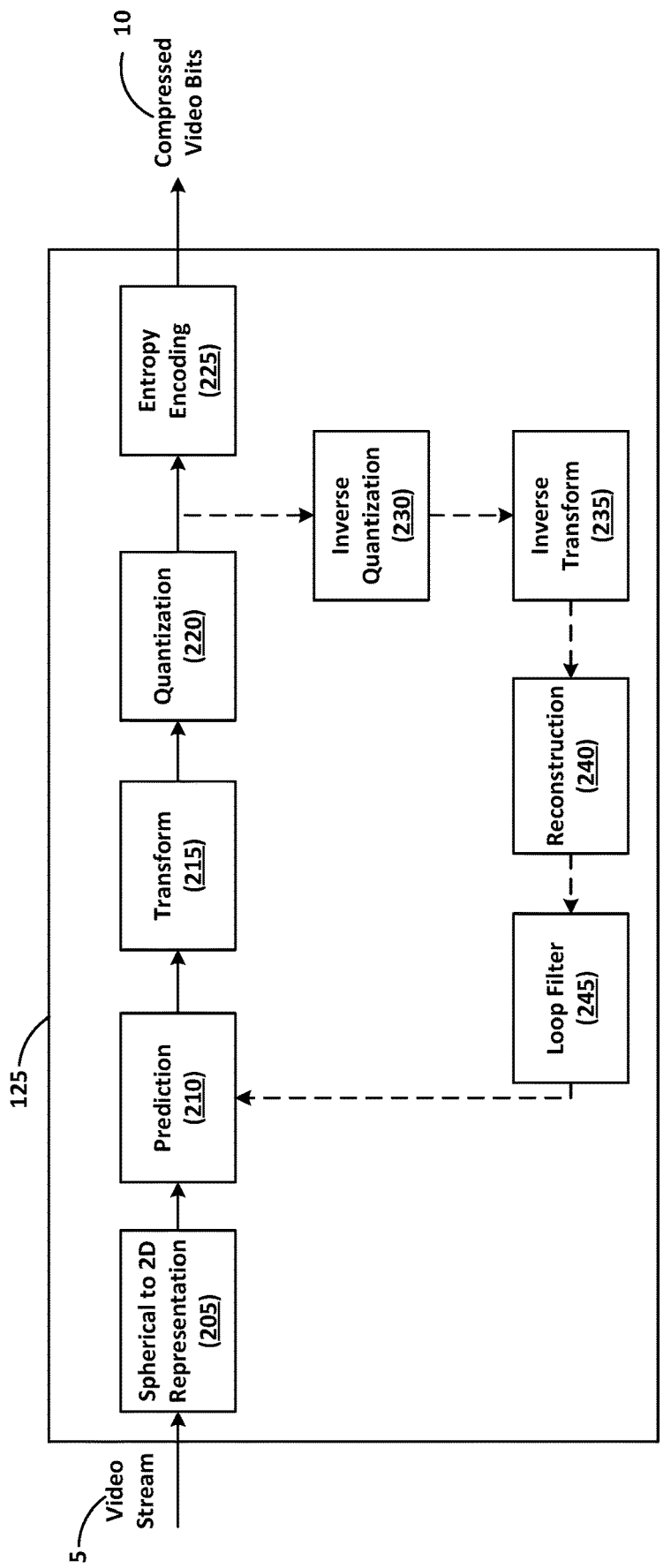
FIG. 2A illustrates a flow diagram for a video encoder system according to at least one example embodiment.
Figure 2B:
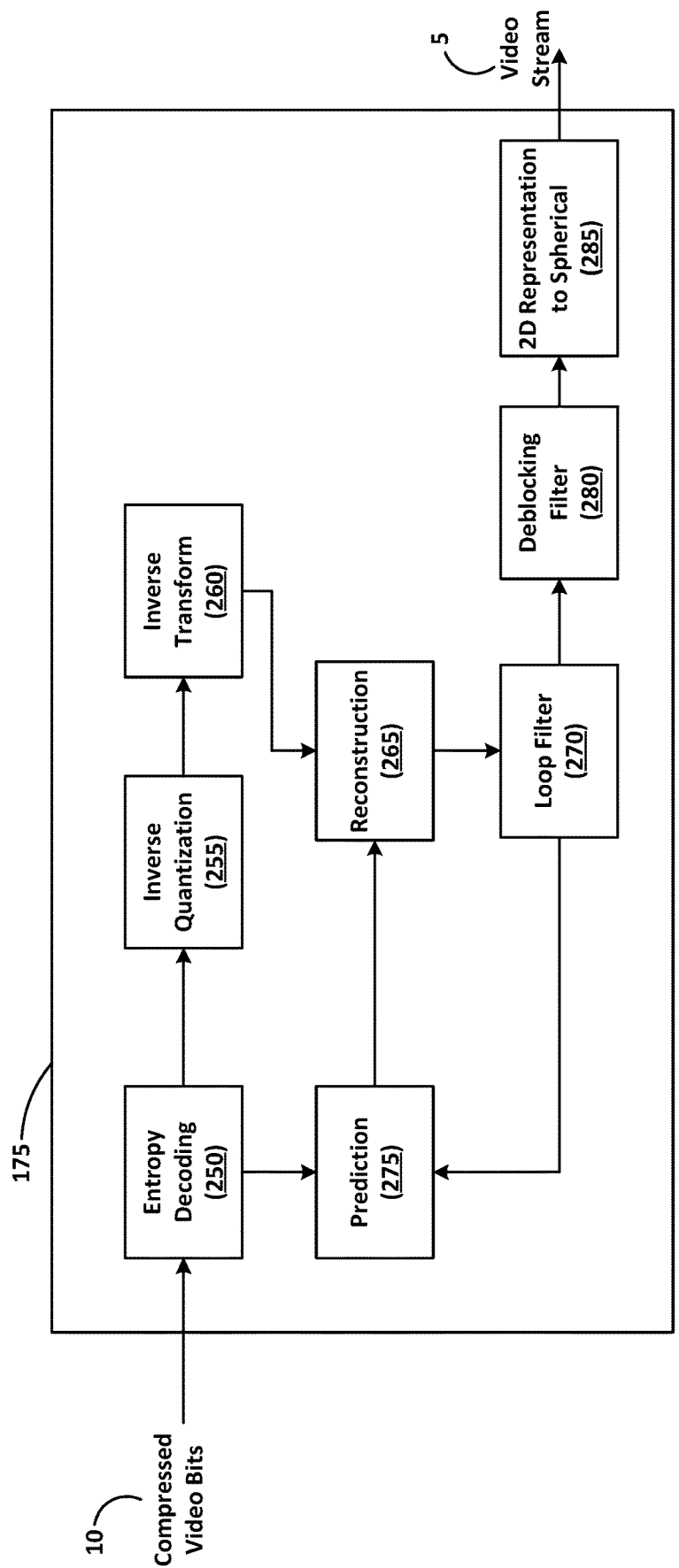
FIG. 2B illustrates a flow diagram for a video decoder system according to at least one example embodiment.

FIGS. 2A and 2B illustrate a flow diagram for the video encoder 125 shown in FIG. 1A and the video decoder 175 shown in FIG. 1B, respectively, according to at least one example embodiment. The video encoder 125 (described above) includes a spherical to 2D representation block 205, a prediction block 210, a transform block 215, a quantization block 220, an entropy encoding block 225, an inverse quantization block 230, an inverse transform block 235, a reconstruction block 240, and a loop filter block 245. Other structural variations of video encoder 125 can be used to encode input video stream 5. As shown in FIG. 2A, dashed lines represent a reconstruction path amongst the several blocks and solid lines represent a forward path amongst the several blocks.

Each of the aforementioned blocks may be executed as software code stored in a memory (e.g., at least one memory 110) associated with a video encoder system (e.g., as shown in FIG. 1A) and executed by at least one processor (e.g., at least one processor 105) associated with the video encoder system. However, alternative embodiments are contemplated such as a video encoder embodied as a special purpose processor. For example, each of the aforementioned blocks (alone and/or in combination) may be an application-specific integrated circuit, or ASIC. For example, the ASIC may be configured as the transform block 215 and/or the quantization block 220.

Figure 4A:
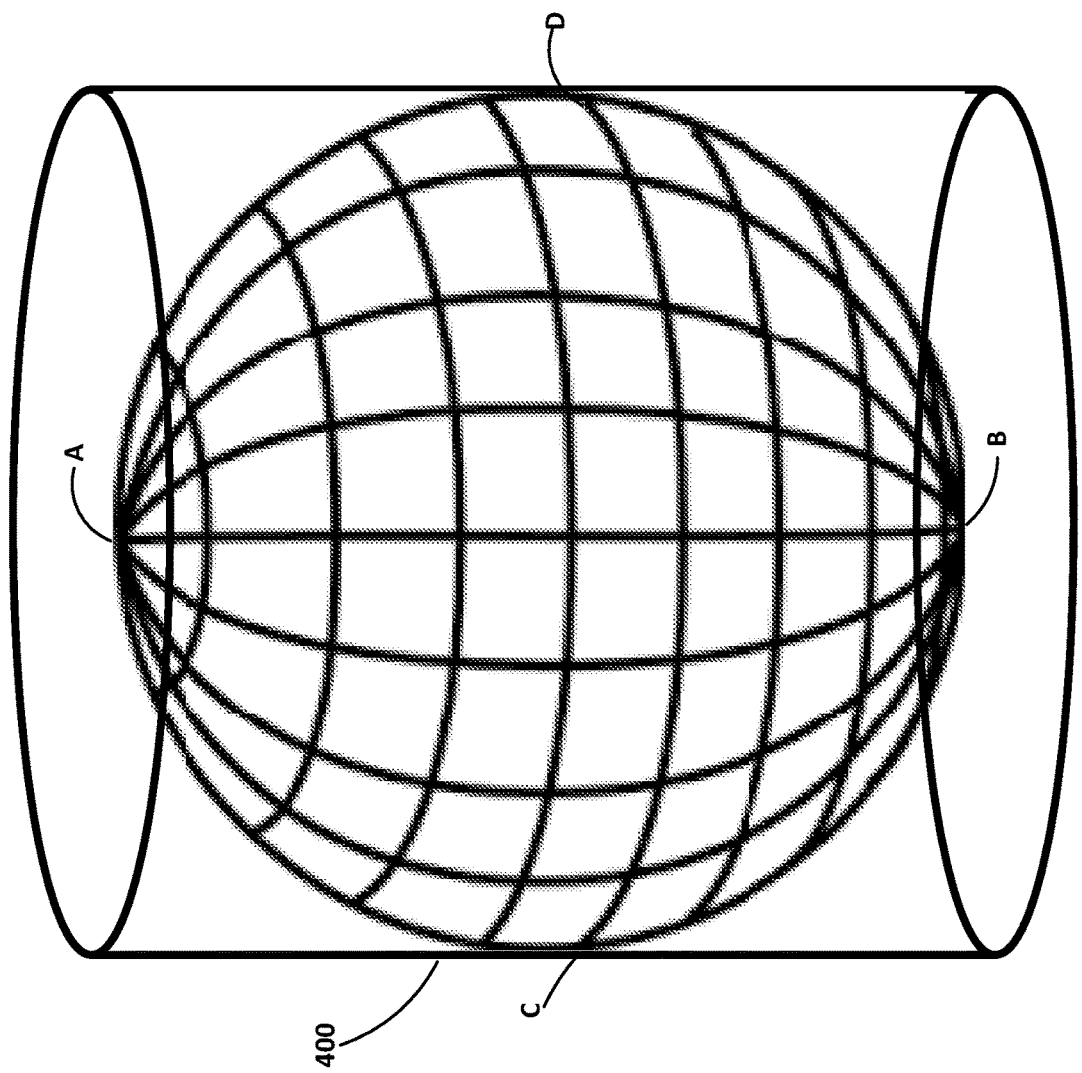
FIG. 4A illustrates a spherical image within a cylinder according to at least one example embodiment.

The spherical to 2D representation block 205 may be configured to map a spherical frame or image to a 2D representation of the spherical frame or image. For example, FIG. 4A illustrates the sphere 300 (e.g., as a frame or an image) inside of a cylinder 400. The sphere 300 can be projected onto the surface of the cylinder 400. The projection can be, for example, equirectangular or semi-equirectangular. Mapping a spherical frame or image to a 2D representation of the spherical frame or image is described in more detail below with regard to FIG. 5.

The prediction block 210 may be configured to utilize video frame coherence (e.g., pixels that have not changed as compared to previously encoded pixels). Prediction may include two types. For example, prediction may include intra-frame prediction and inter-frame prediction. Intra-frame prediction relates to predicting the pixel values in a block of a picture relative to reference samples in neighboring, previously coded blocks of the same picture. In intra-frame prediction, a sample is predicted from reconstructed pixels within the same frame for the purpose of reducing the residual error that is coded by the transform (e.g., entropy encoding block 225) and entropy coding (e.g., entropy encoding block 225) part of a predictive transform codec. Inter-frame prediction relates to predicting the pixel values in a block of a picture relative to data of at least one previously coded picture.

The transform block 215 may be configured to convert the values of the pixels from the spatial domain to transform coefficients in a transform domain. The transform coefficients may correspond to a two-dimensional matrix of coefficients that can be the same size as the original block. In other words, there may be as many transform coefficients as pixels in the original block. However, due to the transform, a portion of the transform coefficients may have values equal to zero.

The transform block 215 may be configured to transform the residual (from the prediction block 210) into transform coefficients in, for example, the frequency domain. The transforms can include the Karhunen-Loève Transform (KLT), the Discrete Cosine Transform ("DCT"), the Singular Value Decomposition Transform ("SVD") and the asymmetric discrete sine transform (ADST).

The quantization block 220 may be configured to reduce the data in each transformation coefficient. Quantization may involve mapping values within a relatively large range to values in a relatively small range, thus reducing the amount of data needed to represent the quantized transform coefficients. The quantization block 220 may convert the transform coefficients into discrete quantum values, which are referred to as quantized transform coefficients or quantization levels. For example, the quantization block 220 may be configured to add zeros to the data associated with a transformation coefficient. For example, an encoding standard may define 128 quantization levels in a scalar quantization process.

The quantized transform coefficients are then entropy encoded by entropy encoding block 225. The entropy-encoded coefficients, together with the information required to decode the block, such as the type of prediction used, motion vectors and quantizer value, are then output as the compressed video bits 10. The compressed video bits 10 can be formatted using various techniques, such as run-length encoding (RLE) and zero-run coding.

The reconstruction path in FIG. 2A is present to ensure that both the video encoder 125 and the video decoder 175 (described below with regard to FIG. 2B) use the same reference frames to decode compressed video bits 10 (or compressed image bits). The reconstruction path performs functions that are similar to functions that take place during the decoding process that are discussed in more detail below, including inverse quantizing the quantized transform coefficients at the inverse quantization block 230 and inverse transforming the inverse quantized transform coefficients at the inverse transform block 235 in order to produce a derivative residual block (derivative residual). At the reconstruction block 240, the prediction block that was predicted at the prediction block 210 can be added to the derivative residual to create a reconstructed block. A loop filter 245 can then be applied to the reconstructed block to reduce distortion such as blocking artifacts.

The video encoder 125 described above with regard to FIG. 2A includes the blocks shown. However, example embodiments are not limited thereto. Additional blocks may be added based on the different video encoding configurations and/or techniques used. Further, each of the blocks shown in the video encoder 125 described above with regard to FIG. 2A may be optional blocks based on the different video encoding configurations and/or techniques used.

FIG. 2B is a schematic block diagram of a decoder 175 configured to decode compressed video bits 10 (or compressed image bits). Decoder 175, similar to the reconstruction path of the encoder 125 discussed previously, includes an entropy decoding block 250, an inverse quantization block 255, an inverse transform block 260, a reconstruction block 265, a loop filter block 270, a prediction block 275, a deblocking filter block 280 and a 2D representation to spherical block 285.

The data elements within the compressed video bits 10 can be decoded by entropy decoding block 250 (using, for example, Context Adaptive Binary Arithmetic Decoding) to produce a set of quantized transform coefficients. Inverse quantization block 255 dequantizes the quantized transform coefficients, and inverse transform block 260 inverse transforms (using ADST) the dequantized transform coefficients to produce a derivative residual that can be identical to that created by the reconstruction stage in the encoder 125.

Using header information decoded from the compressed video bits 10, decoder 175 can use prediction block 275 to create the same prediction block as was created in encoder 175. The prediction block can be added to the derivative residual to create a reconstructed block by the reconstruction block 265. The loop filter block 270 can be applied to the reconstructed block to reduce blocking artifacts. Deblocking filter block 280 can be applied to the reconstructed block to reduce blocking distortion, and the result is output as video stream 5.

The 2D representation to spherical block 285 may be configured to map a 2D representation of a spherical frame or image to a spherical frame or image. For example, FIG. 4A illustrates the sphere 300 (e.g., as a frame or an image) inside of a cylinder 400. The sphere 300 could have been previously projected onto the surface of the cylinder 400. The projection can be, for example, equirectangular or semi-equirectangular. The mapping of the 2D representation of a spherical frame or image to the spherical frame or image can be the inverse of the previous mapping. Mapping a 2D representation of the spherical frame or image to a spherical frame or image is described in more detail below with regard to FIG. 8.

The video decoder 175 described above with regard to FIG. 2B includes the blocks shown. However, example embodiments are not limited thereto. Additional blocks may be added based on the different video encoding configurations and/or techniques used. Further, each of the blocks shown in the video decoder 175 described above with regard to FIG. 2B may be optional blocks based on the different video encoding configurations and/or techniques used.

The encoder 125 and the decoder may be configured to encode spherical video and/or images and to decode spherical video and/or images, respectively. A spherical image is an image that includes a plurality of pixels spherically organized. In other words, a spherical image is an image that is continuous in all directions. Accordingly, a viewer of a spherical image can reposition (e.g., move her head or eyes) in any direction (e.g., up, down, left, right, or any combination thereof) and continuously see a portion of the image.

A spherical image can have perspective. For example, a spherical image could be an image of a globe. An inside perspective could be a view from a center of the globe looking outward. Or the inside perspective could be on the globe looking out to space. An outside perspective could be a view from space looking down toward the globe. As another example, perspective can be based on that which is viewable. In other words, a viewable perspective can be that which can be seen by a viewer. The viewable perspective can be a portion of the spherical image that is in front of the viewer. For example, when viewing from an inside perspective, a viewer could be lying on the ground (e.g., earth) and looking out to space. The viewer may see, in the image, the moon, the sun or specific stars. However, although the ground the viewer is lying on is included in the spherical image, the ground is outside the current viewable perspective. In this example, the viewer could turn her head and the ground would be included in a peripheral viewable perspective. The viewer could flip over and the ground would be in the viewable perspective whereas the moon, the sun or stars would not.

A viewable perspective from an outside perspective may be a portion of the spherical image that is not blocked (e.g., by another portion of the image) and/or a portion of the spherical image that has not curved out of view. Another portion of the spherical image may be brought into a viewable perspective from an outside perspective by moving (e.g., rotating) the spherical image and/or by movement of the spherical image. Therefore, the viewable perspective is a portion of the spherical image that is within a viewable range of a viewer of the spherical image.

A spherical image is an image that does not change with respect to time. For example, a spherical image from an inside perspective as relates to the earth may show the moon and the stars in one position. Whereas a spherical video (or sequence of images) may change with respect to time. For example, a spherical video from an inside perspective as relates to the earth may show the moon and the stars moving (e.g., because of the earths rotation) and/or an airplane streak across the image (e.g., the sky).

Figure 3:
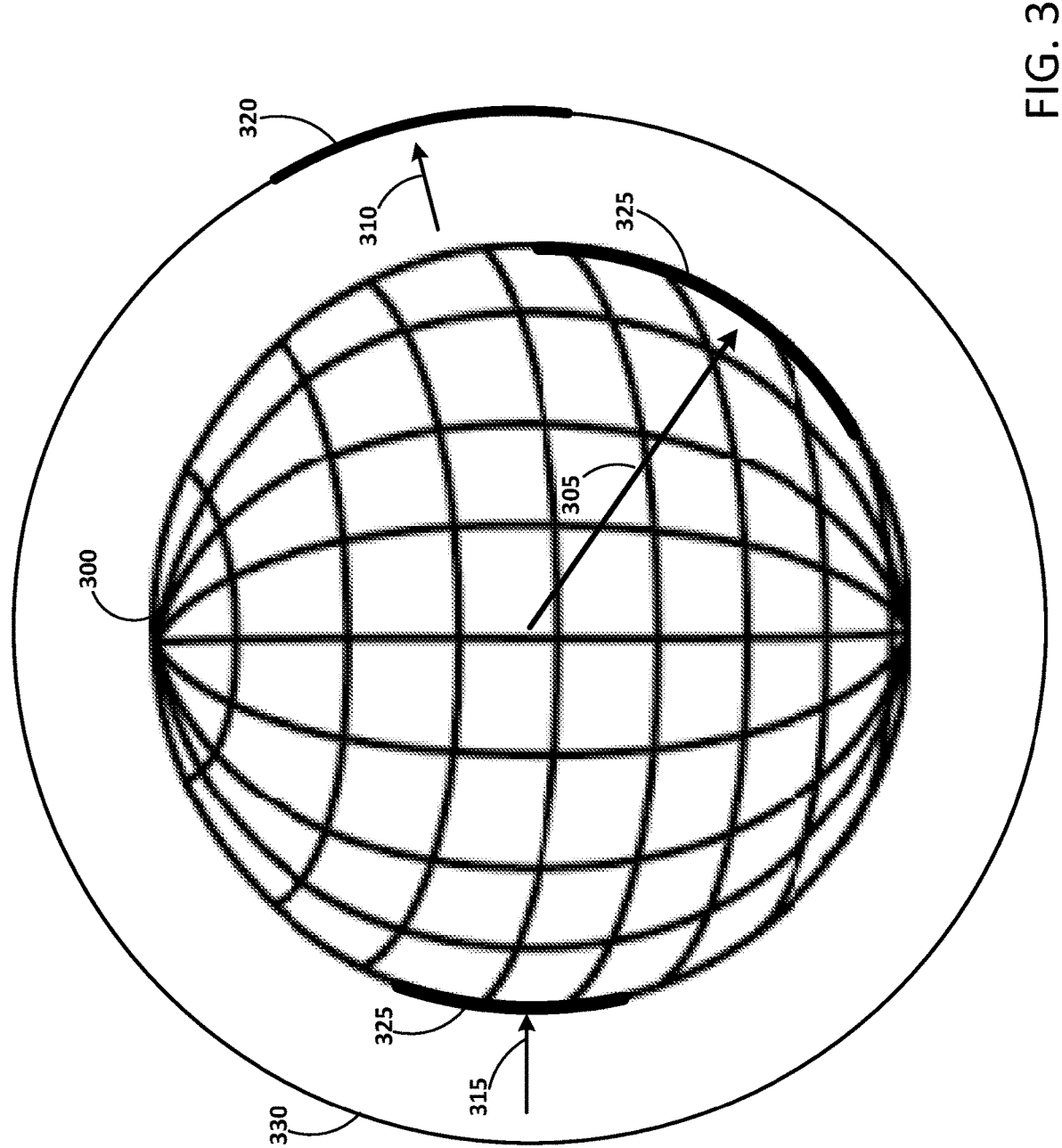
FIG. 3 illustrates a two dimensional (2D) representation of a sphere according to at least one example embodiment.

FIG. 3 is a two dimensional (2D) representation of a sphere. As shown in FIG. 3, the sphere 300 (e.g., as a spherical image) illustrates a direction of inside perspective 305, 310, outside perspective 315 and viewable perspective 320, 325, 330. The viewable perspective 320 may be a portion of a spherical image 335 as viewed from inside perspective 310. The viewable perspective 320 may be a portion of the sphere 300 as viewed from inside perspective 305. The viewable perspective 325 may be a portion of the sphere 300 as viewed from outside perspective 315.

FIGS. 5-8 are flowcharts of methods according to example embodiments. The steps described with regard to FIGS. 5-8 may be performed due to the execution of software code stored in a memory (e.g., at least one memory 110) associated with an apparatus (e.g., as shown in FIG. 1) and executed by at least one processor (e.g., at least one processor 105) associated with the apparatus. However, alternative embodiments are contemplated such as a system embodied as a special purpose processor. Although the steps described below are described as being executed by a processor, the steps are not necessarily executed by a same processor. In other words, at least one processor may execute the steps described below with regard to FIGS. 5-8.

Figure 5:
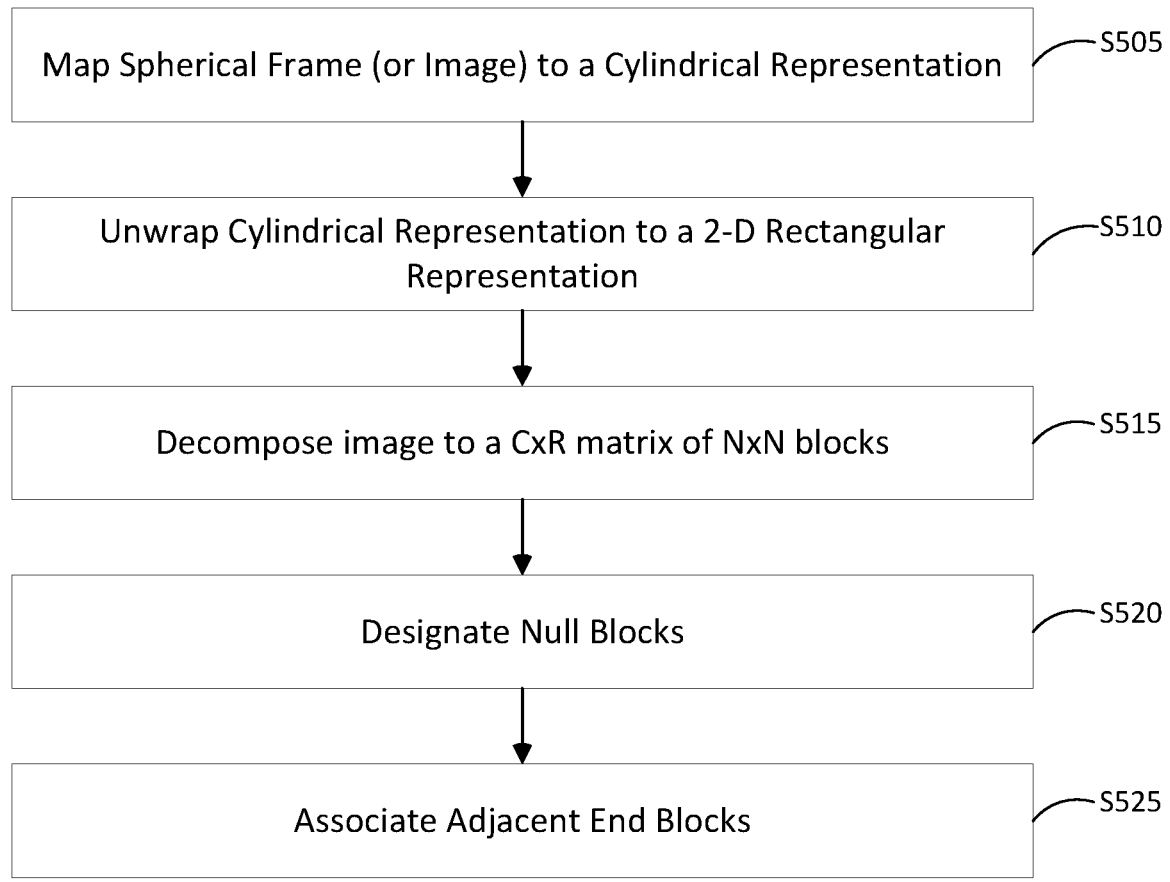
FIG. 5 is a flowchart of a method for mapping a spherical frame/image to a 2D representation of the spherical frame/image according to at least one example embodiment.

FIG. 5 is a flowchart of a method for mapping a spherical image to a 2D representation of the spherical image according to at least one example embodiment. As shown in FIG. 5, in step S505 a spherical frame (or image) is mapped to a cylindrical representation. The mapping (or conversion) can include mapping a frame of a spherical video or the image or to a 2D representation based on a spherical to cylindrical projection. For example, FIG. 4A illustrates the sphere 300 (e.g., as a frame or an image) inside of a cylinder 400. The sphere 300 can be projected onto the surface of the cylinder 400. In one example implementation, the projection can be equirectangular. For example, a line between points C and D can be equidistant between poles A and B. The line between points C and D can be projected onto the cylinder 400. In other words pixels along the line between points C and D are mapped to an equidistant line (between the top and the bottom of the cylinder 400) around the circumference of the cylinder 400. Then, moving away (up and down from the line between points C and D, each horizontal line is mapped to the cylinder as a straight line across the middle of the image with the vertical line remaining vertical. As the horizontal line gets closer and closer to the poles A and B, the image can be stretched to fit to the cylinder. Mathematically the equirectangular projection can be defined as $x=\lambda \cos \theta$ and $y=\theta$ where $\lambda$ is the longitude and $\theta$ is the latitude.

In another example implementation, the projection can be semi-equirectangular. In a semi-equirectangular projection, each horizontal line is mapped to the cylinder as a straight line across the middle of the image with the vertical line remaining vertical as in the equirectangular projection. However, as the horizontal line gets closer and closer to the poles A and B, the image can be projected onto the cylinder without stretching or with reduced stretching (e.g., scaled). In the semi-equirectangular projection portions of the image projected on to the cylinder are empty or null pixels. The empty or null pixels may be represented as black or white (or some other constant pixel representation) pixels. Mathematically the semi-equirectangular projection can be defined as $x=a\lambda \cos \theta$ and $y=b\theta$ where $\lambda$ is the longitude and $\theta$ is the latitude and where a and b are scaling factors. Other cylindrical projections are within the scope of this disclosure.

Figure 4B:
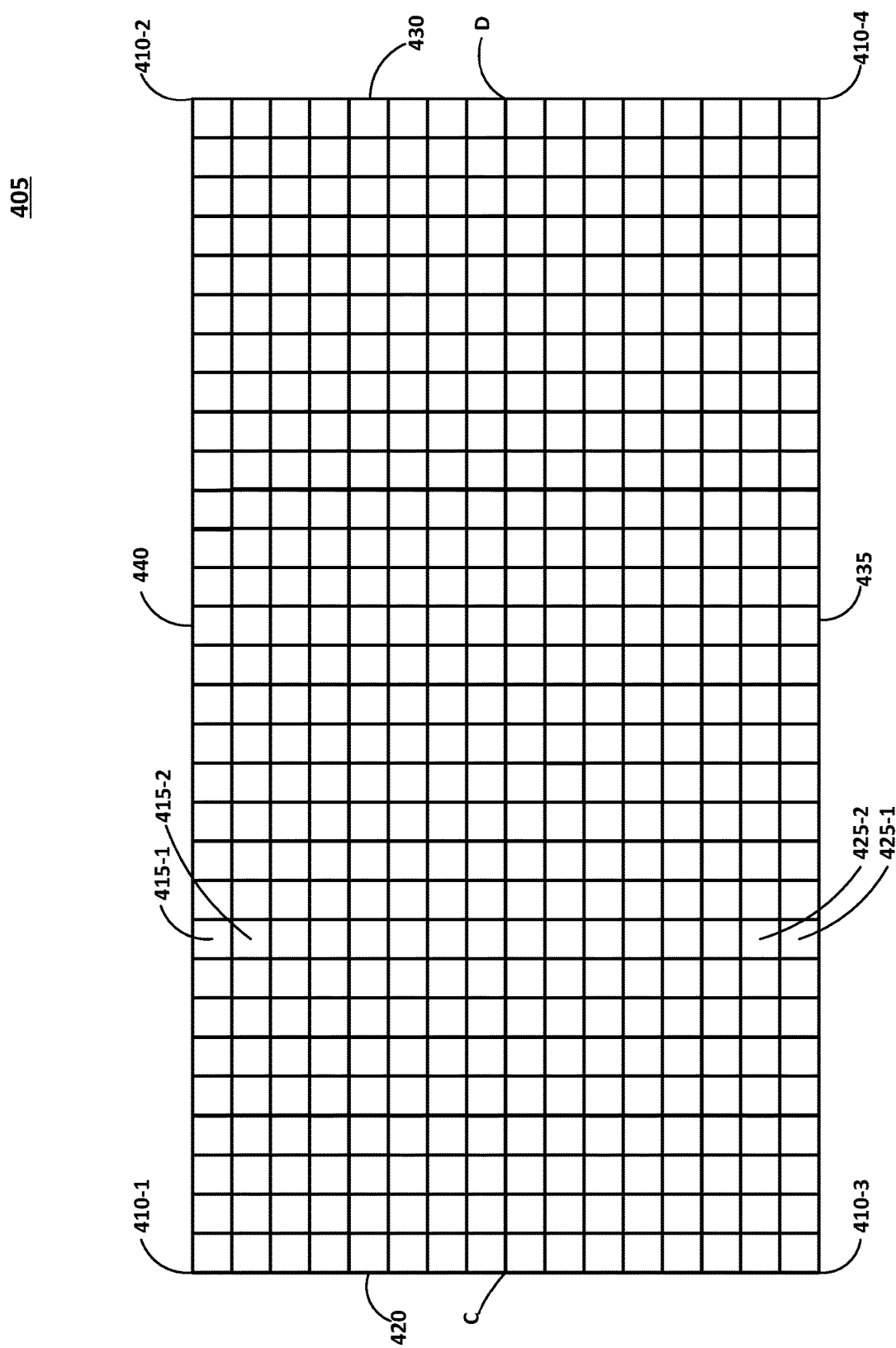
FIG. 4B illustrates block diagrams of an unwrapped video frame(s)/block(s) or image/block(s) according to at least one example embodiment.

In step S510 the cylindrical representation is unwrapped to a 2-D rectangular representation. For example, cylinder 400 may be separated at some vertical line and opened to form a rectangle. FIG. 4B illustrates an unwrapped cylindrical representation 405 as a 2-D rectangular representation. An equirectangular projection of an image shown as an unwrapped cylindrical representation 405 may appear as a stretched image as the image progresses vertically (up and down as shown in FIG. 4B) away from a mid line between points A and B. In a semi-equirectangular projection the image may appear as an oval with empty or null pixels filling a space inside or surrounding corner blocks 410-1, 410-2, 410-3, 410-4 of the unwrapped cylindrical representation 405.

In step S515 the 2-D rectangular representation is decomposed to a C×R matrix of N×N blocks. For example, as shown in FIG. 4B, the illustrated unwrapped cylindrical representation 405 is a 30×16 matrix of N×N blocks. However, other C×R dimensions are within the scope of this disclosure. The blocks may be 2×2, 4×4, 8×8, 16×16, and the like blocks (or blocks of pixels).

In step S520 null blocks are designated. For example, in a semi-equirectangular projection a number of blocks may include empty or null pixels. Blocks that include all, most, or a significant portion of empty or null pixels may be designated as null blocks. For example, if the blocks are 2×2 blocks, any blocks that include, for example, a threshold number or a percentage of empty or null pixels may be designated as null blocks. Null blocks may be stored in a table or look-up table. For example, null blocks may be stored in the look-up table 445 illustrated in FIG. 4C. As discussed below, null blocks may be excluded from use during intra/inter-prediction. If equirectangular projection is used, there may be no designation of null blocks.

As discussed above, a spherical image is an image that is continuous in all directions. Accordingly, if the spherical image were to be decomposed into a plurality of blocks, the plurality of blocks would be contiguous over the spherical image. In other words, there are no edges or boundaries as in a 2D image. In example implementations, an adjacent end block may be adjacent to a boundary of the 2D representation. In addition, an adjacent end block may be a contiguous block to a block on a boundary of the 2D representation. For example, the adjacent end block being associated with two or more boundaries of the two dimensional representation. In other words, because a spherical image is an image that is continuous in all directions, an adjacent end can be associated with a top boundary (e.g., of a column of blocks) and a bottom boundary in an image or frame and/or associated with a left boundary (e.g., of a row of blocks) and a right boundary in an image or frame.

For example, if equirectangular projection is used, an adjacent end block may be the block on the other end of the column or row. For example, as shown in FIG. 4B block 415-1 and 425-1 may be respective adjacent end blocks (by column) to each other. Further, block 435 and 440 may be respective adjacent end blocks (by column) to each other. Still further, block 420 and 430 may be respective adjacent end blocks (by row) to each other. As discussed below, adjacent end blocks may be used as a 1, 2, 3, ..., n pixel boundary to the left and/or above the block to be encoded (herein after referred to as a template) for an intra-prediction scheme. Further, adjacent end blocks may be used as a prediction block for an inter-prediction scheme. In a semi-equirectangular projection a number of blocks may include null blocks. As a result, in semi-equirectangular projection some adjacent end blocks may not be used as a template for intra/inter-prediction scheme.

Figures 4C, 4D:
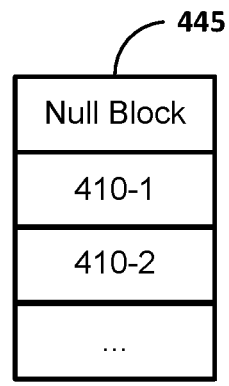
FIGS. 4C and 4D illustrate look up tables (LUT) according to at least one example embodiment.

Accordingly, in step S525 adjacent end blocks are associated. For example, as discussed above, in a semi-equirectangular projection a number of blocks may include empty or null pixels. Therefore, an end block in a row or column may not be at the top or bottom of a row and/or the left or right of a column. Accordingly, for blocks that are at the end of an image but not at the end of a column or row (e.g., block 415-2, where 415-1 is a null block), the adjacent end block may not be at the end of the other side of the column or row (e.g., block 425-2, where 425-1 is a null block). Therefore, the adjacent end blocks may be associated and stored in a lookup table (e.g., lookup table 450 as shown in FIG. 4D).

Exploiting spatial redundancy between samples within a frame (e.g., frame, image, slice, group of macroblocks) is referred to as intra-prediction. In intra-prediction a template can be generated from previously encoded and reconstructed blocks, pixels or sub-pixels (e.g., ½, ¼ and the like) in the same frame (or image). The template is subtracted from the current block prior to encoding. For example, with luminance (luma) samples, the template can be formed for each N×N (e.g., 4×4) sub-block or for an N×N (e.g., 16×16) macroblock. During encoding and/or decoding, the blocks or macroblocks can be sequentially coded within each frame or slice. According to example embodiments, spatial redundancy includes taking into account the continuous nature of the frame based on a spherical video or image. Accordingly, intra-prediction can use a template based on previously encoded and reconstructed blocks, pixels or sub-pixels (e.g., ½, ¼ and the like) across boundaries in the same frame (or image).

In intra-prediction, a coding pass can include sequentially coding blocks along a row (e.g., top to bottom), a column (e.g., left to right) or in a zig-zag pattern (e.g., starting from the upper left corner). In an intra-prediction scheme or coding pass, the blocks which are located above and to the left of the current block within the frame (or image), have been previously encoded and reconstructed. Accordingly, the blocks which are located above and to the left of the current block can be available to the encoder/decoder as a template. However, if the current block (or block to be encoded) is in the upper left corner of a frame, then no previous blocks have been previously encoded and reconstructed or decoded in the frame. Further, if the current block is in the upper row of a frame, then no neighbors above the current block (or block to be encoded) have been previously encoded and reconstructed or decoded. Still further, if the current block (or block to be encoded) is in the left column of a frame, then no neighbors on the same row as the current block have been previously encoded and reconstructed or decoded.

Exploiting spatial redundancy for samples between frames (e.g., frame, image, slice, group of macroblocks) is referred to as inter-prediction. In inter-prediction a prediction block can be generated in response to previously encoded and reconstructed blocks in a different (e.g., sequentially previous in time or a base/template) frame.

In inter-prediction, the current frame can be divided into blocks (e.g., macroblocks) of fixed size. To encode a block (e.g., a current block or block to be encoded) a best matching block is searched for in the reference frame. For example, the search may include searching a search area of a reference frame. A comparison is made between the macroblock from in the current frame to possible candidate macroblocks to find a matching (e.g., a close or a good match) candidate macroblock. Candidate macroblocks can be checked (e.g., pixel by pixel and/or sub-pixel by sub-pixel) in the search area based on, for example, a desired motion estimation resolution, the difference between the macroblock of the current frame and the candidate macroblock, the processing cost of encoding the motion vector for that macroblock and the like. According to example embodiments, spatial redundancy includes taking into account the continuous nature of the frame based on a spherical video or image. Accordingly, inter-prediction can use a search area of a reference frame including blocks, pixels or sub-pixels (e.g., ½, ¼ and the like) across boundaries in the reference frame (or image) to select a best matching block, a candidate block and/or a prediction block.

Figure 6:
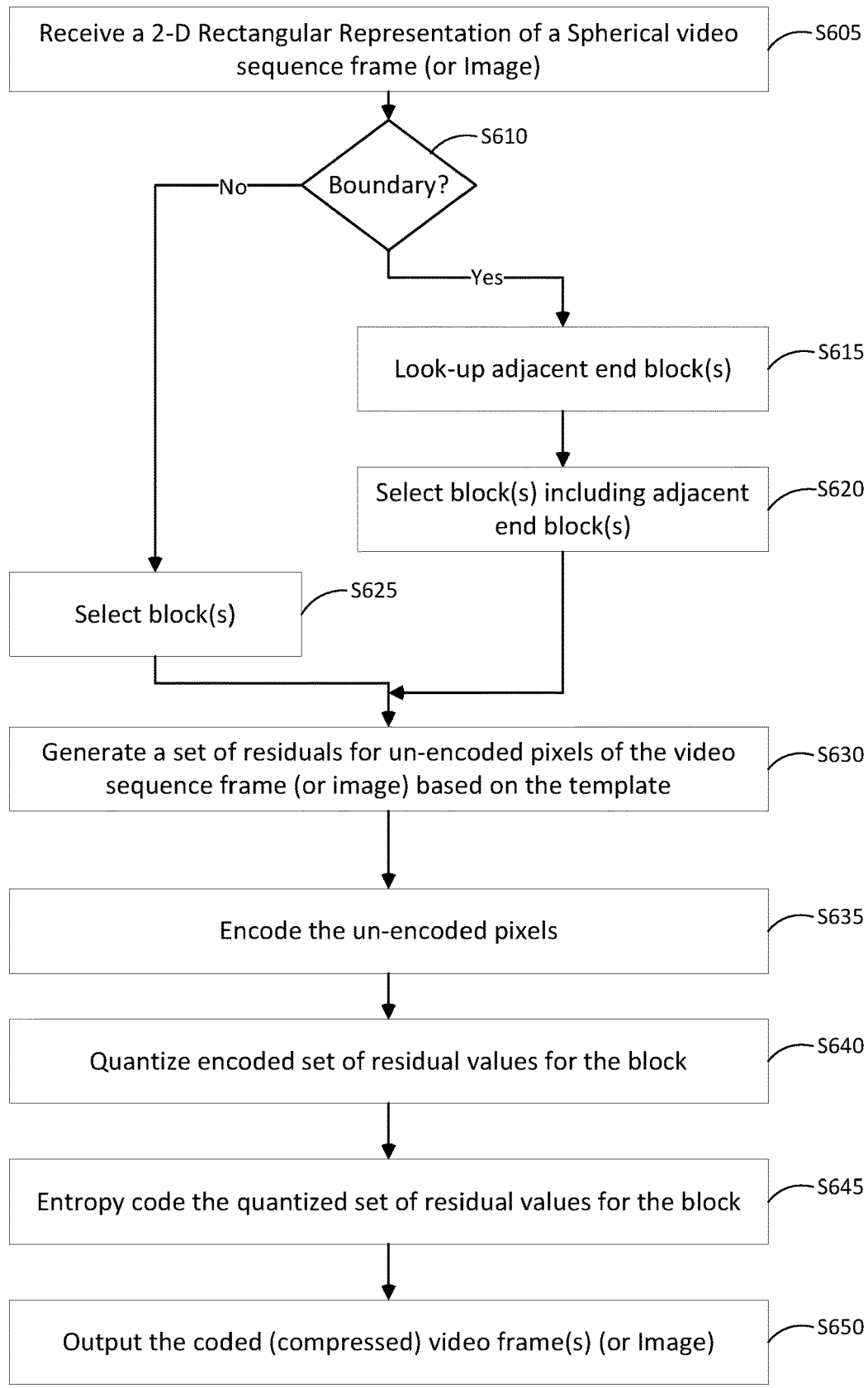
FIGS. 6 and 7 are flowcharts of a method for encoding/decoding a video frame according to at least one example embodiment.

FIG. 6 is a flowchart of a method for encoding a video frame according to at least one example embodiment. As shown in FIG. 6, in step S605 a controller (e.g., controller 120) receives a 2-D rectangular representation of a spherical video sequence frame (or image) to encode. For example, the video encoder may receive a spherical video stream input 5, break the stream into a plurality of video frames, convert each frame to a 2-D rectangular representation (as discussed above with regard to FIG. 5) and select the first video frame. The controller may also set initial configurations. For example, the controller may set an intra-frame coding scheme or mode.

In step S610 whether or not a block is associated with a prediction scheme is at/on (or blocks include) a frame (or image) boundary of the 2-D rectangular representation is determined. The associated block (or blocks) may be one or more of an adjacent left and or upper block in an intra-prediction implementation. Alternatively, the block or blocks may be one or more blocks of or within a search area of a reference frame in an inter-prediction implementation. For example, in one example embodiment, a C×R matrix of N×N blocks includes pixels in each block (e.g., when an equirectangular projection is used). Accordingly, blocks in row 0, column 0, row R-1 and column C-1 include pixels of the spherical image. Therefore, if, during a scan or search, the C×R matrix of blocks includes pixels in each block (e.g., equirectangular projection) and the column/row=0 or the column/row=C-1/R-1, the block is at a boundary.

In another example implementation, an N×N matrix of blocks includes at least one null block or empty or null pixels in at least one block (e.g., when a semi-equirectangular projection is used). Therefore, if, during a scan or search, an adjacent block is a null block, the block is at a boundary. For example, to determine an adjacent block is a null block the adjacent block may be looked-up (e.g., searched for, identified) in a look-up table (e.g., LUT 445, 450). In this example scenario, a block is also at a boundary if the block is at column/row=0 or the column/row=A-1/B-1. If the block is at a boundary, processing moves to step S615. Otherwise, processing continues to step S625.

In step S615 an adjacent end block(s) is looked-up. For example, in one example implementation, a C×R matrix of N×N blocks includes pixels in each block (e.g., when a equirectangular projection is used). Accordingly, an adjacent end block associated with a column for a block in row 0 is a block in row R-1. Further, an adjacent end block associated with a column for a block in row R-1 is a block in row 0. An adjacent end block associated with a row for a block in column 0 is a block in column C-1. Lastly, an adjacent end block associated with a row for a block in column C-1 is a block in column 0. For example, in another example implementation, a C×R matrix of blocks that includes null blocks (e.g., when a semi-equirectangular projection is used). In this example column and row adjacent end blocks can be looked-up in a look-up table (e.g., LUT 450).

In step S620 at least one block including an adjacent end block is selected. In an intra-prediction scheme, at least one adjacent end block can be selected as the template. In other words, one or more of the 1, 2, 3, . . . , n pixels to the left and/or above the block to be encoded can be selected from the template which can be selected from at least one adjacent end block. The adjacent end block being associated with two or more boundaries of the two dimensional representation. The selecting of the adjacent end block can include selecting a reconstructed block from at least one of an opposite end of a same row as the block associated with the prediction scheme or an opposite end of a same column as the block to be encoded.

For example, the adjacent end block may be a reconstructed block other than a left reconstructed block or an upper reconstructed block of (or as compared to) the block to be encoded. In other words, an adjacent end block is not above or to the left of the block to be encoded during the intra-prediction scan of the un-encoded blocks. For example, as discussed above, during intra-prediction a template can be generated based on previously encoded and reconstructed blocks in the same frame (or image). The previously encoded and reconstructed block(s) may be selected from adjacent blocks (e.g., a block that is above and/or to the left of the block to be encoded) as a template. In this case, the block to be encoded is on the end of a column and/or row in the C×R matrix or is next to a null block (e.g., the above block is null or the left block is null). In other words, a block that would be used as a template does not exist or is a null block. Accordingly, at least one of the adjacent blocks to be selected as a template can be one of the looked-up adjacent end blocks.

In an inter-prediction scheme, at least one adjacent end block can be selected as a block within a search area of a reference frame. Accordingly, at least one adjacent end block can be selected as a best matching block, a candidate block and/or a prediction block.

In step S625 at least one block is selected. In this case, the at least one block does not include an adjacent end block. For example, in an intra-prediction scheme the previously encoded and reconstructed block(s) may be selected from adjacent blocks (e.g., a block that is above and/or to the left of the block to be encoded) as a template. In this case, the block to be encoded is away from the boundary. In other words, the block to be encoded is not on the end of a column and/or row in the C×R matrix and not next to a null block. Accordingly, at least one of the adjacent blocks to be selected as a template can be selected from a block above and/or to the left of the block to be encoded. For example, in an inter-prediction scheme the search area can be contiguous within the 2D frame. Accordingly, the search area can be selected without traversing a boundary of the 2D frame. Therefore, the search area does not include an adjacent end block.

In at least one example implementation, more than one block can be selected for use as a template. For example, in an intra-prediction scheme an adjacent block and a block adjacent (in the same direction) to the adjacent block can be selected (e.g., two blocks). The selected blocks can then be averaged to form a template block. In this example, it is possible for the template to be based on an adjacent block and an adjacent end block. For example, in an inter-prediction scheme the best matching block can be centered on a pixel with portions of a plurality of blocks forming the best matching block, the candidate block and/or the prediction block.

In step S630 a set of residuals for un-encoded pixels of the video sequence frame (or image) is generated based on the template. The set of residuals may be associated with one of an intra-prediction process or an inter-prediction process. For example, in the intra-prediction process, at least one value associated with each pixel may be subtracted from a corresponding value associated with a corresponding block (or pixel) of the selected template. For example, in the inter-prediction process, at least one value associated with each pixel may be subtracted from a corresponding value associated with a corresponding block (or pixel) of the selected best matching block, a candidate block and/or a prediction block.

In step S635 the un-encoded pixels are encoded. For example, the residuals for the un-encoded pixels may be transformed (encoded or compressed) into transform coefficients using a configured transform (e.g., a KLT, a SVD, a DCT or an ADST).

In step S640 the encoder quantizes the encoded set of residual values for the block. For example, the controller 120 may instruct (or invoke) the quantization block 220 to quantize coded motion vectors and the coded residual errors, through any reasonably suitable quantization techniques. In addition, at step S645, the controller 120 may instruct the entropy coding block 220 to, for example, assign codes to the quantized motion vector codes and residual error codes to match code lengths with the probabilities of the quantized motion vector codes and residual error codes, through any coding technique.

In step S650 the encoder outputs the coded (compressed) video frame(s). For example, the controller 120 may output the coded video (e.g., as coded video frames) to one or more output devices. The controller 120 may output the coded video as a single motion vector and a single set of predictor values (e.g., residual errors) for the macroblock. The controller 120 may output information indicating the mode or scheme use in intra-frame coding by the encoder. For example, the coded (compressed) video frame(s) may include a header for transmission. The header may include, amongst other things, the information indicating the mode or scheme use in intra-frame coding by the encoder. The intra-frame coding scheme or mode may be communicated with the coded (compressed) video frame(s) (e.g., in the header). The communicated intra-frame coding scheme or mode may indicate parameters used to convert each frame to a 2-D rectangular representation (e.g., indicate equirectangular projection or semi-equirectangular projection as well as any equations used). The communicated intra-frame coding scheme or mode may be numeric based (e.g., mode 101 may indicate semi-equirectangular projection with scaling factors a and b).

Figure 7:
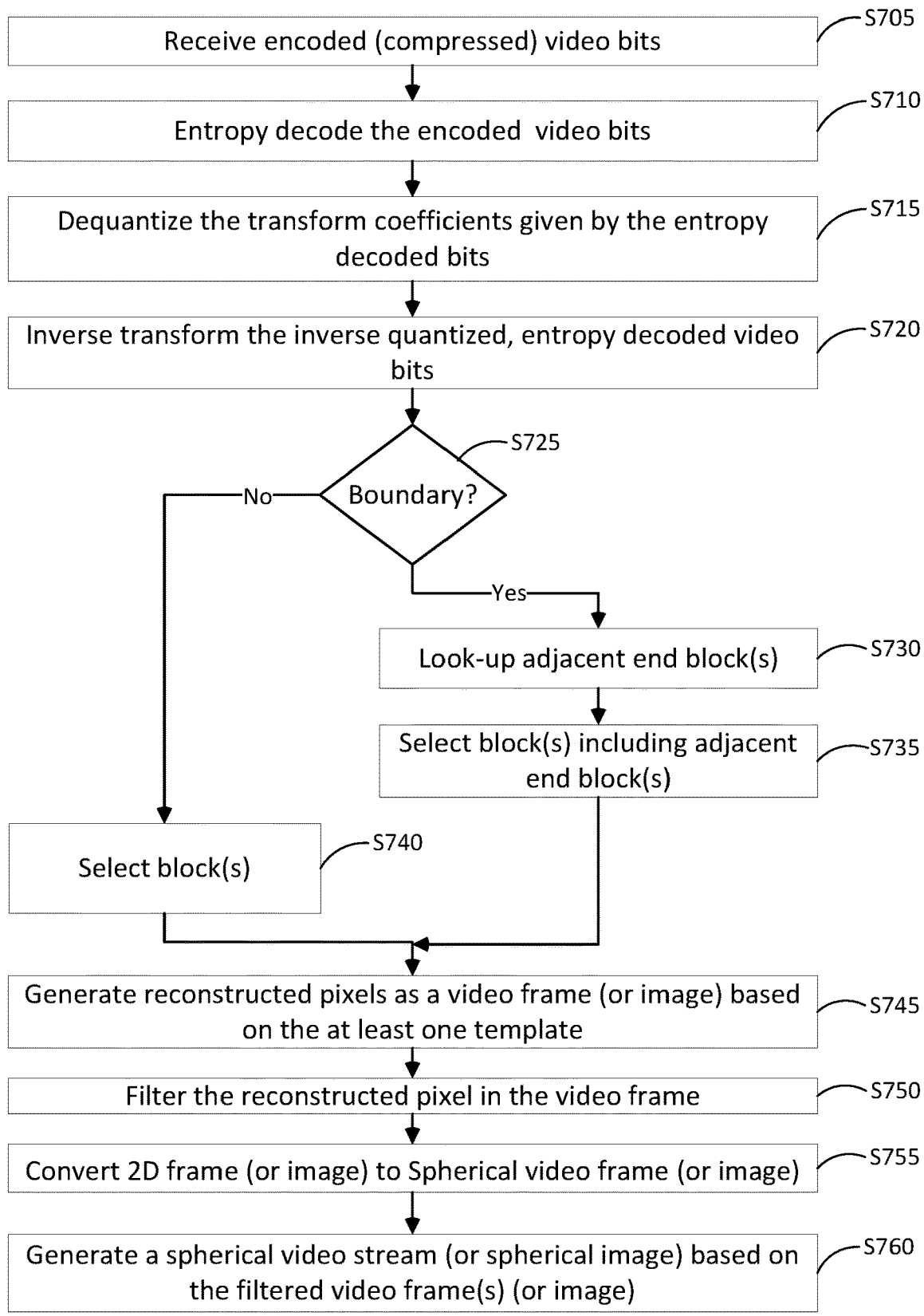

FIG. 7 is a flowchart of a method for decoding a video frame according to at least one example embodiment. As shown in FIG. 7, in step S705 a video decoder (e.g., video decoder 175) receives encoded (compressed) video bits (e.g., compressed video bits 10). For example, the encoded (compressed) video bits may be a previously encode (e.g., by video encoder 125) real time video spherical stream (e.g., a concert or sporting event recording) received via communication network (e.g., Internet or Intranet). For example, the video stream may also be a previously recorded video (e.g., a movie or a video recorder recording). The coded (compressed) video frame(s) may include a header for transmission. The header may include, amongst other things, the information indicating the mode or scheme use in intra-frame coding by the encoder. For example, the intra-frame coding scheme or mode may indicate parameters used to convert each frame to a 2-D rectangular representation (e.g., indicate equirectangular projection or semi-equirectangular projection as well as any equations used).

In step S710 the video decoder entropy decodes the encoded video bits. For example, the compressed video bits can be decoded by entropy decoding using, for example, Context Adaptive Binary Arithmetic Decoding to produce a set of quantized transform coefficients. In step S715 the video decoder de-quantizes the transform coefficients given by the entropy decoded bits. For example, the entropy decoded video bits can be de-quantized by mapping values within a relatively small range to values in a relatively large range (e.g. opposite of the quantization mapping described above). Further, in step S720 the video decoder inverse transforms the video bits using an indicated (e.g., in the header) transform (e.g., a KLT, a SVD, a DCT or an ADST).

In step S725 whether or not a block is associated with a prediction scheme is at/on (or blocks include) a frame (or image) boundary of the 2-D rectangular representation is determined. The associated block (or blocks) may be one or more of an adjacent left and or upper block in an intra-prediction implementation. Alternatively, the block or blocks may be one or more blocks of or within a search area of a reference frame in an inter-prediction implementation. For example, in one example embodiment, a C×R matrix of N×N blocks includes pixels in each block (e.g., when a equirectangular projection is used). Accordingly, blocks in row 0, column 0, row R-1 and column C-1 include pixels of the spherical image. Therefore, if, during a scan or search, the C×R matrix of blocks includes pixels in each block (e.g., equirectangular projection) and the column/row=0 or the column/row=C-1/R-1, the block is at a boundary.

In another example implementation, a C×R matrix of N×N blocks includes at least one null block or empty or null pixels in at least one block (e.g., when a semi-equirectangular projection is used). Therefore, if, during a scan or search, an adjacent block is a null block, the block is at a boundary. For example, to determine an adjacent block is a null block the adjacent block may be looked-up (or searched for) in a look-up table (e.g., LUT 445, 450). In this example scenario, a block is also at a boundary if the block is at column/row=0 or the column/row=C-1/R-1. If the block is at a boundary, processing moves to step S730. Otherwise, processing continues to step S740.

In step S730 an adjacent end block is looked-up. For example, in one example implementation, a C×R matrix of blocks includes pixels in each block (e.g., when a equirectangular projection is used). Accordingly, an adjacent end block associated with a column for a block in row 0 is a block in row R-1. Further, an adjacent end block associated with a column for a block in row R-1 is a block in row 0. An adjacent end block associated with a row for a block in column 0 is a block in column C-1. Lastly, an adjacent end block associated with a row for a block in column C-1 is a block in column 0. For example, in another example implementation, a C×R matrix of blocks that includes Null blocks (e.g., when a semi-equirectangular projection is used). In this example column and row adjacent end blocks can be looked-up (e.g., identified) in a look-up table (e.g., LUT 450).

In step S735 at least one block including an adjacent end block is selected. In an intra-prediction scheme, at least one adjacent end block can be selected as the template. In other words, one or more of the 1, 2, 3, . . . , n pixels to the left and/or above the block to be encoded can be selected from the template which can be selected from at least one adjacent end block. The adjacent end block being associated with two or more boundaries of the two dimensional representation. For example, the adjacent end block may be a reconstructed block other than a left reconstructed block or an upper reconstructed block of (or as compared to) the block to be encoded. In other words, an adjacent end block is not above or to the left of the block to be encoded during the intra-prediction scan of the un-encoded blocks. For example, as discussed above, during intra-prediction a template can be generated based on previously encoded and reconstructed blocks in the same frame (or image). The previously encoded and reconstructed block(s) may be selected from adjacent blocks (e.g., a block that is above and/or to the left of the block to be encoded) as a template. In this case, the block to be encoded is on the end of a column and/or row in the C×R matrix or is next to a null block (e.g., the above block is null or the left block is null). In other words, a block that would be used as a template does not exist or is a null block. Accordingly, at least one of the adjacent blocks to be selected as a template can be one of the looked-up adjacent end blocks.

In an intra-prediction scheme, at least one adjacent end block can be selected as a block within a search area of a reference frame. Accordingly, at least one adjacent end block can be selected as a best matching block, a candidate block and/or a prediction block.

In step S740 at least one block is selected. In this case, the at least one block does not include an adjacent end block. For example, in an intra-prediction scheme the previously encoded and reconstructed block(s) may be selected from adjacent blocks (e.g., a block that is above and/or to the left of the block to be encoded) as a template. In this case, the block to be encoded is not on the end of a column and/or row in the C×R matrix and not next to a null block. Accordingly, at least one of the adjacent blocks to be selected as a template can be selected from a block above and/or to the left of the block to be encoded. For example, in an inter-prediction scheme the search area can be contiguous within the 2D frame. Accordingly, the search area can be selected without traversing a boundary of the 2D frame. Therefore, the search area does not include an adjacent end block.

In at least one example implementation, more than one block can be selected for use as a template. For example, in an intra-prediction scheme an adjacent block and a block adjacent (in the same direction) to the adjacent block can be selected (e.g., two blocks). The selected blocks can then be averaged to form a template block. In this example, it is possible for the template to be based on an adjacent block and an adjacent end block. For example, in an inter-prediction scheme the best matching block can be centered on a pixel with portions of a plurality of blocks forming the best matching block, the candidate block and/or the prediction block.

In step S745 the video decoder generates reconstructed pixels as a video frame based the decoded video bits. In an intra-prediction scheme, the reconstructed pixels can be generated using the block as a template. In other words, one or more of the 1, 2, 3, . . . , n pixels to the left and/or above the block to be decoded can be can be selected from the block(s) and used as the template to generate reconstructed pixels from the decoded video bits. In an example implementation, the block (and, therefore, the 1, 2, 3, . . . , n pixels to the left and/or above the block to be decoded) can include adjacent end block(s). In an intra-prediction scheme, the reconstructed pixels can be generated using the block as a prediction block. Therefore, in an example implementation, the prediction block can include adjacent end block(s). For example, to generate the reconstructed pixels, the video decoder may add the residuals (e.g., transformed or decompressed video bits) to the corresponding position in the template or the prediction block resulting in a reconstructed pixel.

In step S750 the video decoder filters the reconstructed pixel in the video frame. For example, a loop filter can be applied to the reconstructed block to reduce blocking artifacts. For example, a deblocking filter can be applied to the reconstructed block to reduce blocking distortion.

In step S755 the 2D frame (or image) is converted to a spherical video frame (or image). For example, the 2D frame can be converted using the inverse of the technique described above with regard to mapping a spherical frame (or image) to a 2D representation of the spherical frame (or image). An example technique is described in more detail below with regard to FIG. 8.

In step S760 the video decoder generates a spherical video stream (or spherical image) based on the video frame(s). For example, at least one video frame of reconstructed converted pixels may be organized in a sequence to form a spherical video stream.

Figure 8:
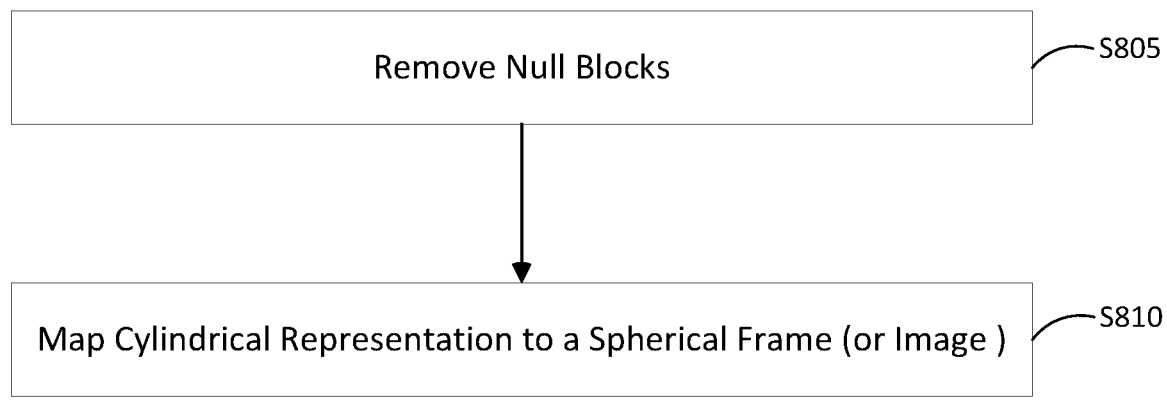
FIG. 8 is a flowchart of a method for converting a 2D representation of a spherical image to a spherical frame/image according to at least one example embodiment.

FIG. 8 is a flowchart of a method for converting a 2D representation of a spherical image to a spherical frame/image according to at least one example embodiment. As shown in FIG. 8, in step S805 null blocks are removed. For example, as discussed above, in a semi-equirectangular projection implementation null blocks may be added where there are no pixels in one or more of the N×N blocks in the C×R matrix. These null blocks may be skipped (e.g., during a processing of), deleted or removed from a 2D frame or image. The null blocks may be indicated in a look-up table (e.g., LUT 445) which may be included in a header associated with received coded (compressed) video frame(s). In an equirectangular projection implementation this step may be skipped.

In step S810 the 2D representation is mapped to a spherical frame (or image). For example, the cylindrical representation can be mapped to a spherical image using an inverse transformation (e.g., using the inverse of equations described above) based on what type of projection (e.g., equirectangular or semi-equirectangular) was used to convert the spherical image to the 2D representation. For example, the equations may be the inverse of $x=\lambda \cos \theta$ and $y=\theta$ where $\lambda$ is the longitude and $\theta$ is the latitude of $\lambda=x \cos y$ and $\theta=y$. Other inverse transforms are within the scope of this disclosure.

Figure 9A:
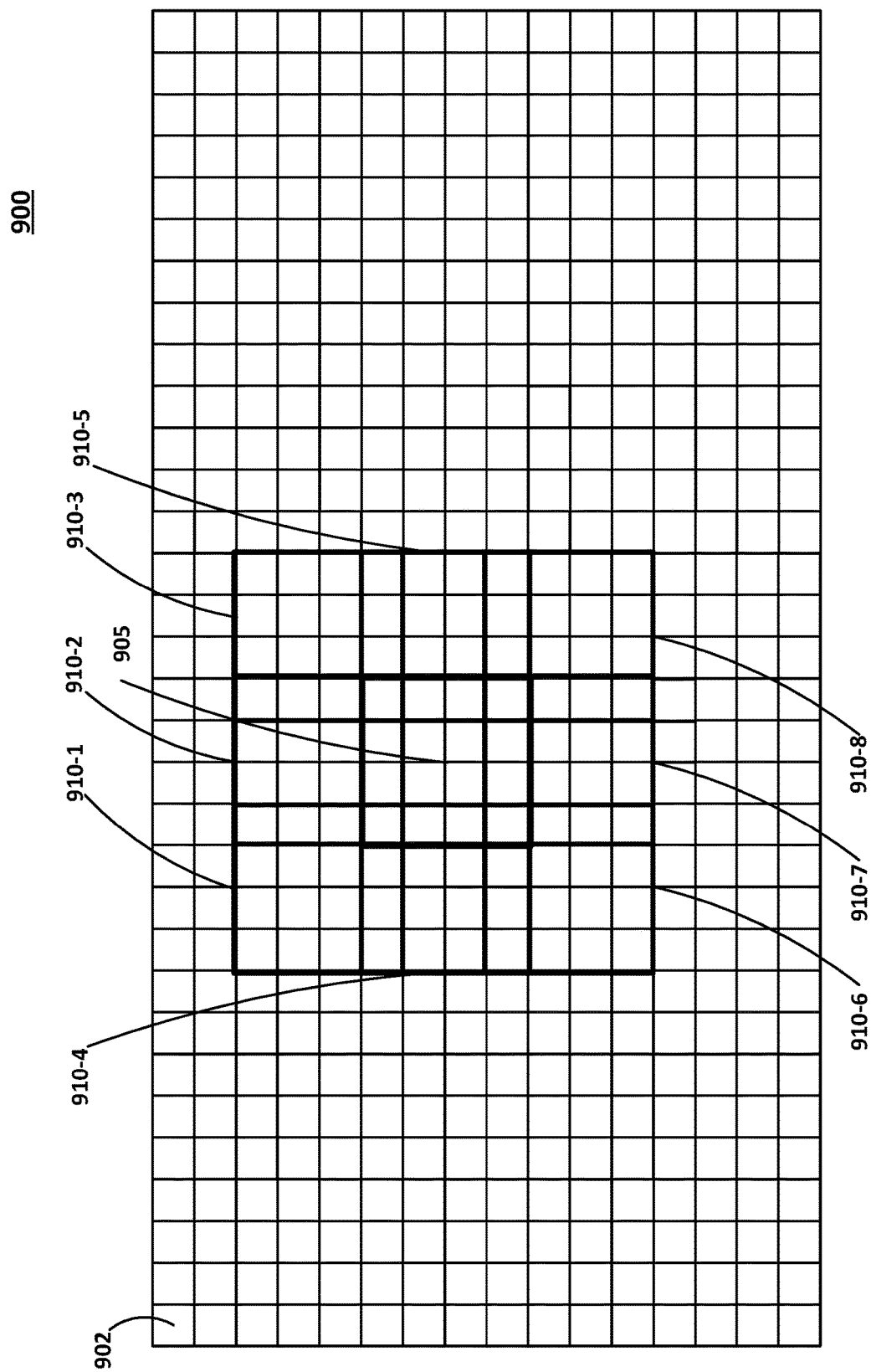
FIGS. 9A and 9B illustrate a 2D representation of a spherical video frame or image including tiles according to at least one example embodiment.
Figure 9B:
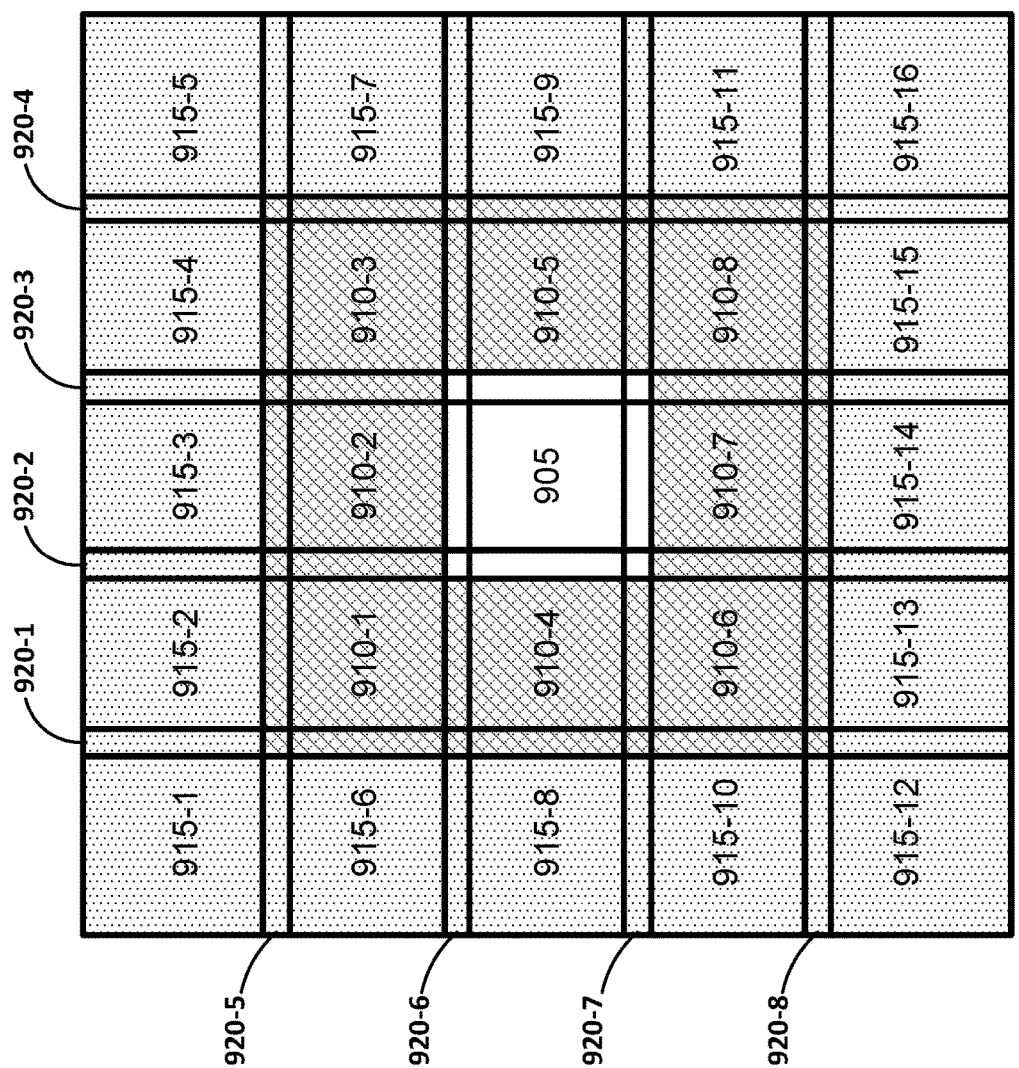

FIGS. 9A and 9B illustrate a 2D representation of a spherical video frame or image including tiles according to at least one example embodiment. As shown in FIG. 9A, the 2D representation of a spherical video frame 900 includes a plurality of blocks (e.g., block 902) organized in a C×R matrix. Each block may be an N×N block of pixels. For example, a video frame (or image) may be converted to a matrix of blocks each having a number of pixels. A tile may be formed of a number of blocks or pixels. For example, tiles 905, 910-1, 910-2, 910-3, 910-4, 910-5, 910-6, 910-7 and 910-8 each include 16 blocks which in-turn include a plurality (e.g., N×N) pixels. Tile 905 may be a tile that includes a view perspective of a viewer of the video (or image) during a playback of the spherical video. In other words, tile 905 may be a tile that includes a portion of the spherical video frame that a viewer of the spherical video can see (e.g., the viewable perspective). Tiles 910-1, 910-2, 910-3, 910-4, 910-5, 910-6, 910-7 and 910-8 may be tiles that include portions of the spherical video frame at a peripheral view or outside (e.g., not seen by a viewer during playback) the view perspective.

According to an example implementation, tiles may overlap. In other words, a block, a portion of a block, a pixel and/or a plurality of pixels may be associated with more than one tile. As shown in FIGS. 9A and 9B, tiles 910-1, 910-2, 910-3, 910-4, 910-5, 910-6, 910-7 and 910-8 may overlap tile 905 (e.g., include a block, a portion of a block, a pixel and/or a plurality of pixels also associated with tile 905). As shown in FIG. 9B, this overlapping pattern may continue expanding outward from tile 905. For example, tiles 915-1, 915-2, 915-3, 915-4, 915-5, 915-6, 915-7, 915-8, 915-9, 915-10, 915-11, 915-12, 915-13, 915-14, 915-15 and/or 915-16 can overlap one or more of tiles 910-1, 910-2, 910-3, 910-4, 910-5, 910-6, 910-7 and/or 910-8. As shown in FIG. 9B, the overlap is illustrated as overlap video portions 920-1, 920-2, 920-3, 920-4, 920-5, 920-6, 920-7 and 920-8.

According to an example implementation, in order to conserve resources during the streaming of spherical video, only a portion of the spherical video can be streamed. For example, the portion of the spherical video that is indicated as being viewed by a viewer during playback can be streamed. Referring to FIG. 9B, the tile 905 may be a tile that is indicated as a portion of the spherical video frame that a viewer of the spherical video is watching. Therefore, for a minimum viewing experience, the tile 905 should be streamed. However, should the viewer change what is being watched (e.g., by moving her eyes or her head) and only tile 905 is being streamed, the viewing experience will be undesirable because the viewer would have to wait for the appropriate spherical video to be streamed. For example, if the viewer changes a view perspective from tile 905 to tile 910-2 and only tile 905 is being streamed, the viewer may experience a delay until tile 910-2 is streamed.

Therefore, according to at least one example embodiment, a plurality of tiles (e.g., as a portion of the spherical video frame) can be streamed. Again referring to FIG. 9B, tiles 905, 910-1, 910-2, 910-3, 910-4, 910-5, 910-6, 910-7, 910-8, 915-1, 915-2, 915-3, 915-4, 915-5, 915-6, 915-7, 915-8, 915-9, 915-10, 915-11, 915-12, 915-13, 915-14, 915-15 and/or 915-16 can be streamed. Further, in order to conserve resources during the streaming of the spherical video, the plurality of tiles can be encoded based on more than one quality of service (QoS). As discussed below, the QoS may affect resources used to encode a tile or tiles, the bandwidth used to stream a tile or tiles, the QoS may also affect the resolution of the tile and/or tiles when decoded. For example, tile 905 can be streamed based on a first QoS, tiles 910-1, 910-2, 910-3, 910-4, 910-5, 910-6, 910-7 and 910-8 can be streamed based on a second QoS, and tiles 915-1, 915-2, 915-3, 915-4, 915-5, 915-6, 915-7, 915-8, 915-9, 915-10, 915-11, 915-12, 915-13, 915-14, 915-15 and 915-16 can be streamed based on a third QoS. The first QoS, the second QoS and the third QoS can be different. For example, the first QoS can be higher than the second QoS and the third QoS can be lower than the first and the second QoS.

Accordingly, decoded tiles corresponding to tiles 915-1, 915-2, 915-3, 915-4, 915-5, 915-6, 915-7, 915-8, 915-9, 915-10, 915-11, 915-12, 915-13, 915-14, 915-15 and/or 915-16 are of a lower quality as compared to decoded tiles corresponding to tiles 910-1, 910-2, 910-3, 910-4, 910-5, 910-6, 910-7 and 910-8. Further, a decoded tile corresponding to tile 905 has the highest quality. As a result, the portion of the spherical video that is indicated as being viewed by a viewer during playback (e.g., tile 905) can have the highest relative quality. Further, the portion of the spherical video that is at a peripheral view or outside (e.g., not seen by a viewer during playback) the view perspective during playback can progressively have a lower quality as compared to the portion of the spherical video (or near by) that is indicated as being viewed by a viewer during playback.

Therefore should the viewer change what is being watched (e.g., by moving her eyes or her head), the viewer continues to see the streamed spherical video (although at a possible lower quality). A subsequently streamed frame of the can then include a peripheral view based on the changed position, thus maintaining a desired user experience while conserving resources during the streaming of the spherical video.

In an example implementation, tile 905 can be of a first dimension N1×N1; tiles 910-1, 910-2, 910-3, 910-4, 910-5, 910-6, 910-7 and 910-8 can be of a second dimension N2×N2; and tiles 915-1, 915-2, 915-3, 915-4, 915-5, 915-6, 915-7, 915-8, 915-9, 915-10, 915-11, 915-12, 915-13, 915-14, 915-15 and 915-16 can be of a third dimension N3×N3. Further, overlaps closer to tile 905 can be smaller than overlaps further away from tile 905. For example, the overlap between tile 905 and tile 910-5, can be 0 or 1 pixel, whereas the overlap between tile 910-5 and tile 915-9, can be 50 pixels. This pattern can continue extending away from tile 905. The choice of 0, 1 and 50 are exemplary in nature and example embodiments are limited thereto.

If tile 905 is smaller (e.g., a smaller length by width) than tile 910-5, encoding tile 910-5 is more efficient than encoding tile 905. Accordingly, additional efficiencies can be gained by configuring the generation of tiles such that the tiles get larger (e.g., a larger length by width) and the overlaps get larger the further away from the tile that includes a view perspective of a viewer of the video (or image) during a playback of the spherical video.

Figure 10:
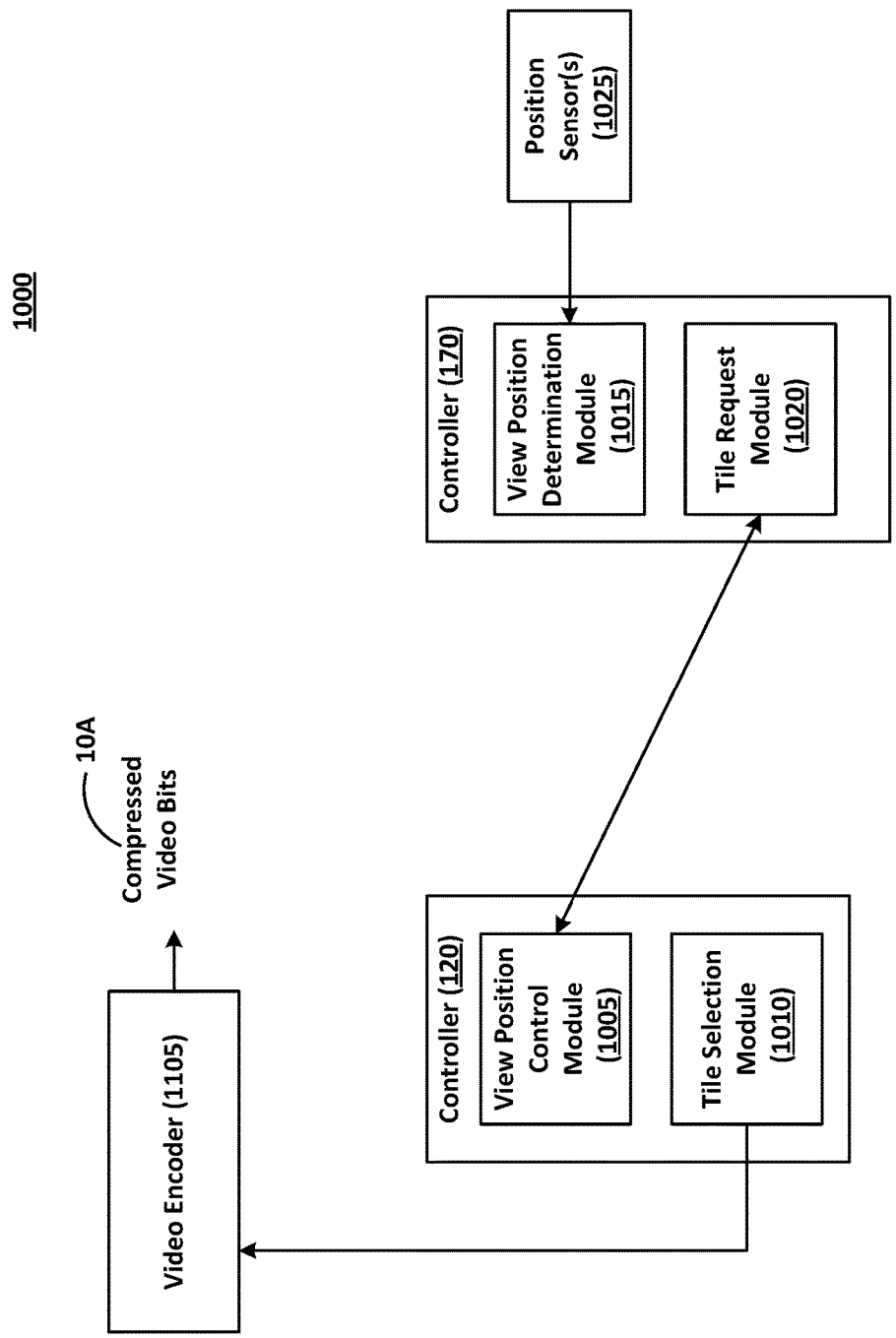
FIG. 10 illustrates a system according to at least one example embodiment.

FIG. 10 illustrates a system 1000 according to at least one example embodiment. As shown in FIG. 10, the system 1000 includes the controller 120, the controller 170, the encoder 1105 (described in detail below) and a position sensor 1025. The controller 120 further includes a view position control module 1005 and a tile selection module 1010. The controller 170 further includes a view position determination module 1015 and a tile request module 1020.

According to an example implementation, the position sensor 1025 detects a position (or change in position) of a viewers eyes (or head), the view position determination module 1015 determines a view, perspective or view perspective based on the detected position and the tile request module 1020 communicates the view, perspective or view perspective as part of a request for a frame of spherical video, a tile or a plurality of tiles. According to another example implementation, the position sensor 1025 detects a position (or change in position) based on an image panning position as rendered on a display. For example, a user may use a mouse, a track pad or a gesture (e.g., on a touch sensitive display) to select, move, drag, expand and/or the like a portion of the spherical video or image as rendered on the display.

The request for the frame of spherical video, the tile or the plurality of tiles may be communicated together with a request for a frame of the spherical video. The request for the tile may be communicated separate from a request for a frame of the spherical video. For example, the request for the tile may be in response to a changed view, perspective or view perspective resulting in a need to replace previously requested and/or a queued tile, plurality of tiles and or frame.

The view position control module 1005 receives and processes the request for the tile. For example, the view position control module 1005 can determine a frame and a position of the tile or plurality of tiles in the frame based on the view perspective. Then the view position control module 1005 can instruct the tile selection module 1010 to select the tile and/or plurality of tiles. Selecting the tile and/or plurality of tiles can include passing a parameter to the encoder 1105. The parameter can be used by the view selection module 1120 during the encoding of the spherical video and/or tile.

Accordingly, the position sensor 1025 can be configured to detect a position (orientation, change in position and/or change in orientation) of a viewer's eyes (or head). For example, the position sensor 1025 can include an accelerometer in order to detect movement and a gyroscope in order to detect position. Alternatively, or in addition to, the position sensor 1025 can include a camera or infra-red sensor focused on the eyes or head of the viewer in order to determine a position of the eyes or head of the viewer. The position sensor 1025 can be configured to communicate position and change in position information to the view position determination module 1015.

The view position determination module 1015 can be configured to determine a view or perspective view (e.g., a portion of a spherical video that a viewer is currently looking at) in relation to the spherical video. The view, perspective or view perspective can be determined as a position, point or focal point on the spherical video. For example, the view could be a latitude and longitude position on the spherical video. The view, perspective or view perspective can be determined as a side of a cube based on the spherical video. The view (e.g., latitude and longitude position or side) can be communicated to the view position control module 1005 using, for example, a Hypertext Transfer Protocol (HTTP).

The view position control module 1005 may be configured to determine a view position (e.g., frame and position within the frame) of a tile or plurality of tiles within the spherical video. For example, the view position control module 1005 can select a square or rectangle centered on the view position, point or focal point (e.g., latitude and longitude position or side). The tile selection module 1010 can be configured to select the square or rectangle as a block, a tile or a plurality of tiles. The tile selection module 1010 can be configured to instruct (e.g., via a parameter or configuration setting) the encoder 1105 to encode the selected tile or plurality of tiles.

FIG. 11A illustrates a flow diagram for a video encoder system according to at least one example embodiment. The video encoder 1105 includes a spherical to 2D representation block 1110, a frame decomposition module 1115, a view selection module 1120, a tile module 1125, the video encoder 125 and a packet builder (or combiner) 1130. The elements 1110-1130, 125 contained in the encoder 1105 may include software modules, hardware components, or combinations thereof. The encoder 1105 may be used in place of the encoder 125 in system 100. Accordingly, the controller 120 may instruct (or invoke) the elements 1110-1130, 125 to encode the spherical video frames.

The spherical to 2D representation block 1110 may be configured to map a spherical frame or image to a 2D representation of the spherical frame or image. For example, the sphere 300 can be projected onto a 2D surface (e.g., a cylinder (unwrapped into a rectangle), a square and/or a rectangle). The projection can be, for example, based on an equirectangular projection equation.

The frame decomposition module 1115 may be configured to decompose each of the spherical video frames into a plurality of blocks (e.g., block 902) having a first set of dimensions N×N. Accordingly, the frame decomposition module 1115 may be configured to decompose (e.g., based on a quad-tree decomposition) the spherical video frames.

The view selection module 1120 may be configured to select a tile (or plurality of tiles) based a view or perspective or view perspective of a user watching the spherical video. For example, as discussed above, the view, perspective or view perspective may be a viewable perspective 320 which in turn may be a portion of the sphere 300 as viewed from inside perspective 305. The tile may be a plurality of pixels selected based on the view. The plurality of pixels may be a block, plurality of blocks or macro-block that can include a portion of the spherical image that can be seen by the user. The portion of the spherical image may have a length and width. The portion of the spherical image may two dimensional or substantially two dimensional. The view selection module 1120 may select a tile (or plurality of tiles) based on an indication of a view or perspective or view perspective from a device playing back the spherical video.

The tile module 1125 may select a plurality of tiles based on the tile selected by the view selection module 1120. The tile module 1125 may select tiles that surround and extend away from the tile selected by the view selection module 1120 (e.g., tile 905) for inclusion in the plurality tiles. For example, as shown in FIG. 9B, the plurality of tiles may include two rows above and two rows below, as well as two columns to the left and two columns to the right of the tile selected by the view selection module 1120 (e.g., tile 905). The plurality of tiles may overlap. The tile module 1125 may be configured to assign a QoS to each of the plurality of tiles. The tile module 1125 may be configured to, in a loop, pass each of the tiles and parameters associated with the QoS for each tile to the encoder 125.

For example, the tile module 1125 may read the blocks (e.g., the pixels) associated with each tile and store the blocks and QoS in a queue and output the contents of the queue one entry at a time (e.g., as instructed or invoked by the controller 120). The encoder 125 may encode the blocks of a tile using the parameters associated with the QoS and output the results to the packet builder 1130. The encoder 125 may encode each of the plurality of tiles separately. The packet builder 1130 may also include a queue in order to queue the results until each of the plurality of tiles is encoded. In another example implementation, the encoder 1105 may include a plurality of video encoders 125 (or a plurality of software implementations of the video encoder 125) such that the plurality of tiles can be encoded in parallel.

The packet builder 1130 may be configured to build a packet for transmission. The packet may include compressed video bits 10A. The packet may include the plurality of encoded tiles. The packet may include a header for transmission. The header may include, amongst other things, the information indicating the mode or scheme use in intra-frame coding by the encoder. The header may include information indicating parameters used to convert a frame of the spherical video frame to a 2-D rectangular representation. The header may include information indicating parameters used to achieve the QoS of (e.g., each of) the plurality of encoded 2-D tiles.

In one example implementation, the packet builder 1130 can build a packet that includes only the plurality of encoded tiles as the encoded bits. In another implementation, the packet builder 1130 can build a packet that mimics an encoded frame of spherical video data (or a spherical image). Accordingly, the packet builder 1130 may fill in a mimicked frame with dummy data in data (or bit) locations (of the frame) that are not associated with the plurality of encoded tiles. For example, the packet builder 1130 could include a template for an encoded frame, map bits associate with the plurality of encoded tiles to a position in the template corresponding to the plurality of encoded tiles and assign the remainder of the positions in the template with dummy data (e.g., a value of 0).

FIG. 11B illustrates a flow diagram for a video decoder system according to at least one example embodiment. The video decoder 1150 includes a frame builder module 1155, the video decoder 175 and a 2D representation to spherical block 1160. The elements 1155, 175, 1160 contained in the decoder 1150 may include software modules, hardware components, or combinations thereof. The decoder 1150 may be used in place of the decoder 175 in system 150. Accordingly, the controller 170 may instruct (or invoke) the elements 1155, 175, 1160 to encode the spherical video frames.

The frame builder module 1155 may be configured to build a frame that mimics an encoded frame of spherical video data (or a spherical image). For example, the frame builder module 1155 may fill in a mimicked frame with dummy data in data (or bit) locations (of the frame) that are not associated with the plurality of encoded tiles. For example, the frame builder module 1155 could include a template for an encoded frame, map bits associate with the plurality of encoded tiles to a position in the template corresponding to the plurality of encoded tiles and assign the remainder of the positions in the template with dummy data (e.g., a value of 0).

The 2D representation to spherical block 1160 may be configured to map a 2D representation of a spherical frame or image to a spherical frame or image. For example, FIG. 3 illustrates the sphere 300 (e.g., as a frame or an image). The sphere 300 could have been previously projected onto the surface of a cylinder (that can be unwrapped to a rectangle), a square or a rectangle. The projection can be, for example, equirectangular or semi-equirectangular. The mapping of the 2D representation of a spherical frame or image to the spherical frame or image can be the inverse of the previous mapping.

FIG. 11C illustrates a flow diagram for a video decoder system according to at least one example embodiment. The video decoder 1170 includes the video decoder 175 and the 2D representation to spherical block 1160. The elements 175, 1160 contained in the decoder 1170 may include software modules, hardware components, or combinations thereof. The decoder 1170 may be used in place of the decoder 175 in system 150. Accordingly, the controller 170 may instruct (or invoke) the elements 175, 1160 to encode the spherical video frames.

In an example implementation, the decoder 1150 may be used in a system where the encoder 1105 communicates packets as compressed video bits 10A, where the packets only data corresponding to the spherical video is the plurality of encoded tiles. In another example implementation, the decoder 1170 may be used in a system where the encoder 1105 communicates packets as compressed video bits 10A, where the packets include data that mimics an encoded video frame that includes data corresponding to the spherical video including the plurality of encoded tiles.

As will be appreciated, the system 100 and 150 illustrated in FIGS. 1A and 1B, the encoders 125, 1105 illustrated in FIGS. 2A and 11A, as well as the decoders 175, 1150, 1170 illustrated in FIGS. 2B, 11B and 11C may be implemented as an element of and/or an extension of the generic computer device 2700 and/or the generic mobile computer device 950 described below with regard to FIG. 27. Alternatively, or in addition to, the system 100 and 150 illustrated in FIGS. 1A and 1B, the encoders 125, 1105 illustrated in FIGS. 2A and 11A, as well as the decoders 175, 1150, 1170 illustrated in FIGS. 2B, 11B and 11C may be implemented in a separate system from the generic computer device 2700 and/or the generic mobile computer device 2750 having some or all of the features described below with regard to the generic computer device 2700 and/or the generic mobile computer device 2750.

Figure 12:
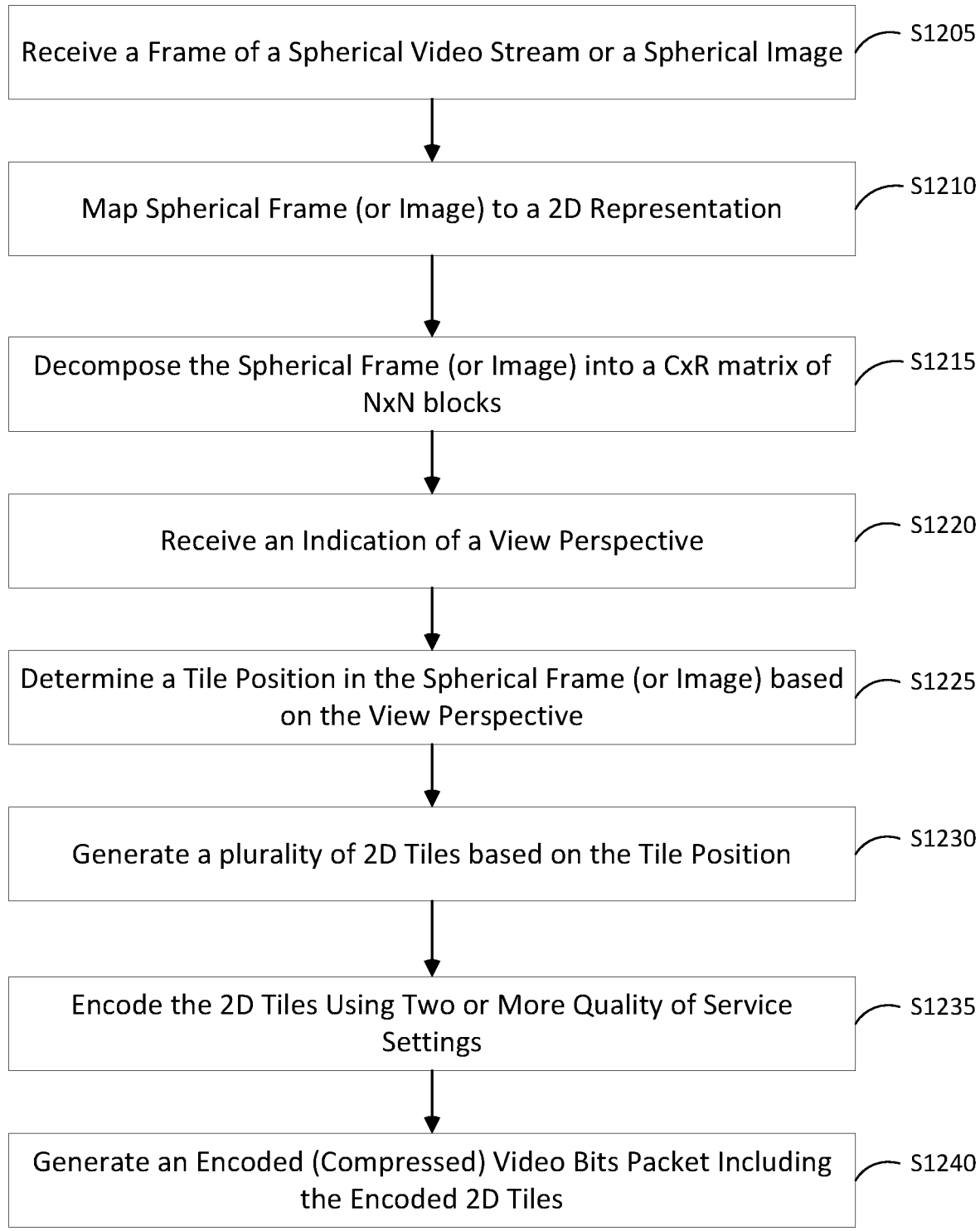
FIGS. 12 and 13 illustrate methods for encoding/decoding streaming spherical video according to at least one example embodiment.
Figure 13:
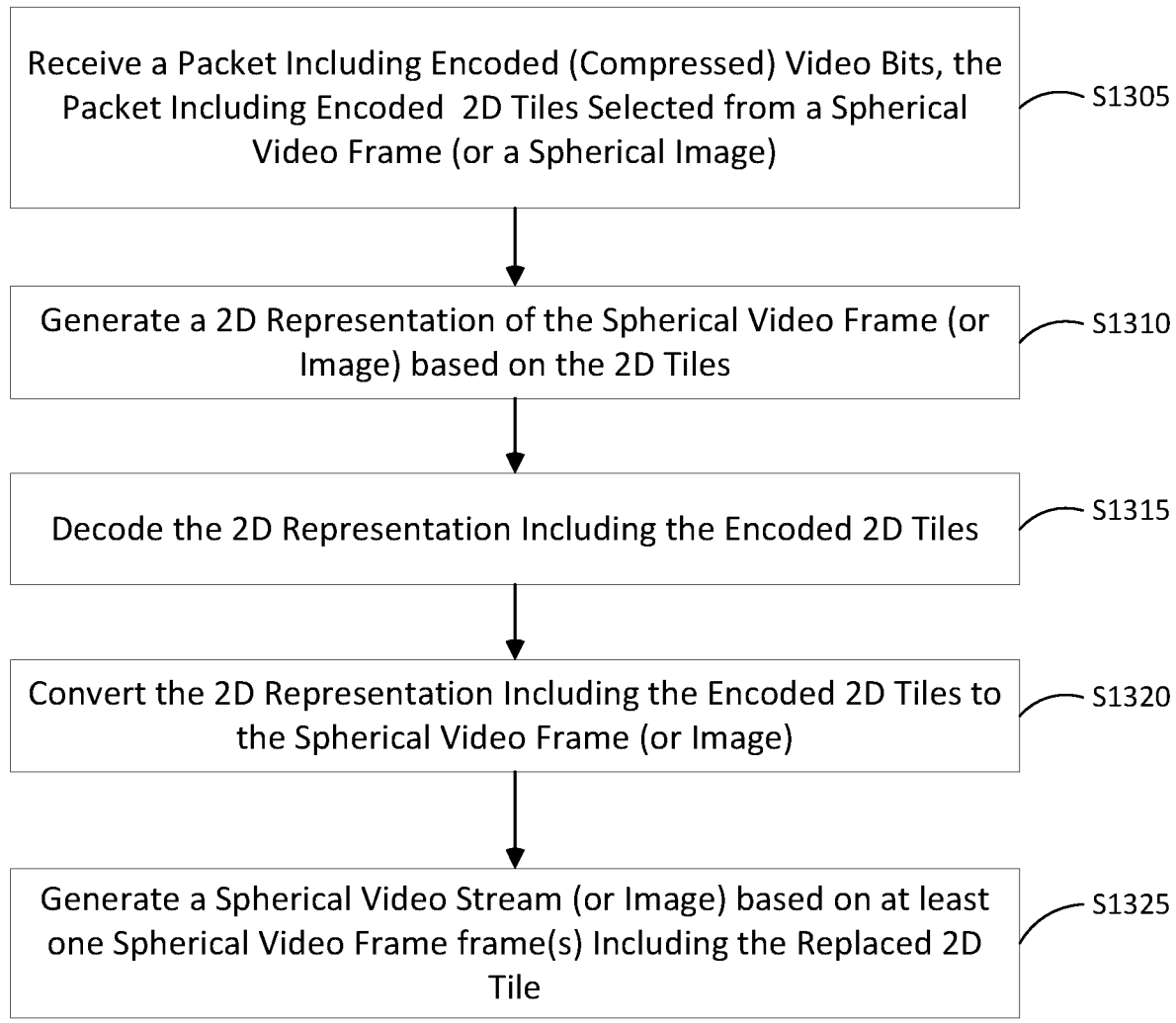

FIGS. 12 and 13 are flowcharts of methods according to example embodiments. The steps described with regard to FIGS. 12 and 13 may be performed due to the execution of software code stored in a memory (e.g., at least one memory 110) associated with an apparatus (e.g., as shown in FIG. 1) and executed by at least one processor (e.g., at least one processor 105) associated with the apparatus. However, alternative embodiments are contemplated such as a system embodied as a special purpose processor. Although the steps described below are described as being executed by a processor, the steps are not necessarily executed by a same processor. In other words, at least one processor may execute the steps described below with regard to FIGS. 12 and 13.

FIG. 12 illustrates a method for encoding streaming spherical video according to at least one example embodiment. As shown in FIG. 12, in step S1205 a frame of a spherical video stream (or a spherical image) is received. For example, a controller (e.g., controller 120) may instruct an encoder (e.g., encoder 125, 1105) to receive one or more frames from a video source(s). The video source(s) the may include any video source (e.g., a data storage device, a network, the Internet, a separate computing device, and the like). For example, the video sequence frame(s) may be video frames associated with a spherical video stream (e.g., video stream 5). The video stream may be a real time video stream (e.g., a video conference or a video chat). For example, the video stream may be a previously recorded video (e.g., a movie or a video recorder recording). In addition, the video content may be analog or digital video.

In step S1210 the spherical frame (or image) is mapped to a 2D representation. For example, mapping a frame (or spherical image) to a 2D representation can include projecting the frame (or spherical image) onto the surface of a cylinder (which is then unwrapped into a rectangle), a square or rectangle. In one example implementation, the projection can be equirectangular. In other words, pixels along a line at the center of the sphere (e.g., an equator) are mapped to an equidistant line between the top and the bottom of the cylinder, square or rectangle. Then, moving away from the line (e.g., up and down from the line), each horizontal line is mapped to the cylinder as a straight line across the middle of the image with the vertical line remaining vertical. As the horizontal line gets closer and closer to the poles of the sphere, the image can be stretched to fit to the cylinder, the square or the rectangle. Other projections are contemplated. For example, a semi-equirectangular projection could be used. A semi-equirectangular may scale the amount of the aforementioned stretch such that the projection does not completely fill the cylinder, the square or the rectangle.

In step S1215 the frame including the 2D representation is decomposed into a C×R matrix of N×N blocks or macroblocks. For example, the controller 120 may instruct the encoder (e.g., the frame decomposition module 1115) to decompose the spherical video frames into a C×R matrix of macroblocks having N×N dimensions. For example, the encoder can use a quadtree decomposition technique to decompose the frame including the 2D representation (or image).

In step S1220 an indication of a view perspective is received. The indication of the view perspective can be received from a device executing a playback of the spherical video. In other words, the indication of the view perspective can be received from a device implementing a decoder (e.g., decoder 175, 1150, 1170) in order for a viewer to view the spherical video. For example, as discussed above, the indication of a view perspective can be based on a portion of a spherical video that a viewer is currently looking at. The indication can be, for example, a point or position (e.g., longitude and latitude) on the sphere, a plurality of points on the sphere, or a side of a cube representing the sphere.

In an example implementation, the indication of a view perspective is received before the spherical frame (or image) is mapped to a 2D representation. In this implementation, the spherical frame (or image) can be rotated such that the view perspective is centered along, for example, the line at the center of the sphere (e.g., along the equator). As a result, the pixels, blocks and/or macro-blocks (e.g., that make up the tiles described above) can be in a position such that any distortion of the pixels, blocks and/or macro-blocks during a projection of the pixels, blocks and/or macro-blocks onto the surface of the cylinder, rectangle or square can be minimized.

In step S1225 a tile position in the spherical frame is determined based on the view perspective. For example, if the indication is a point or position on the sphere (as a spherical image or frame), a tile (e.g., a number of pixels, a block and/or a macro-block) can be determined based on point or position. In an example implementation, the tile (at least one tile or a plurality of tiles) position can be a rectangle centered on the point or position.

In step S1230 a plurality of 2D tiles are generated based on the tile position. For example, as discussed above, the 2D tiles can be an image including a plurality of pixels or blocks. The 2D tiles can include a portion of the frame of the spherical video. The plurality of 2D tiles are generated can be generated by selecting a first portion of the frame of the spherical video as a first two dimensional tile (e.g., tile 905) based on the tile position and selecting a plurality of second two dimensional tiles from a second portion of the frame of the spherical video (e.g., tiles 910-1 to 8 and/or tiles 915-1 to 16), the second portion of the frame surrounding the first portion of the frame and extending away from the first portion of the frame. In one implementation, the 2D tiles can be generated based on the tile position or view perspective to include the plurality of pixels or blocks included in a square or rectangle centered on the point or position. In another example implementation, the plurality of pixels or blocks that form the plurality of 2D tiles within the frame (or image) are predefined or preconfigured and the 2D tiles can be selected (as the generated 2D tiles) such that at least one of the 2D tiles includes the tile position a center of the tile position or view perspective. In yet another implementation, during the aforementioned rotation of the spherical frame (or image), the spherical frame (or image) can be rotated such that the tile position or view perspective is positioned at the center of the projection onto the surface of the cylinder, rectangle or square. As such, the center tile can be one of the tiles selected (as the generated 2D tiles).

In step S1235 the 2D tiles are encoded using two or more QoS settings. For example, the 2D tile may be transformed (encoded or compressed) into transform coefficients using a configured transform (e.g., a KLT, a SVD, a DCT or an ADST). The encoded transform coefficients or set of residual values for the block can be quantized. For example, the controller 120 may instruct (or invoke) the quantization block 220 to quantize coded motion vectors and the coded residual errors, through any reasonably suitable quantization techniques. In addition, the controller 120 may instruct the entropy coding block 220 to, for example, assign codes to the quantized motion vector codes and residual error codes to match code lengths with the probabilities of the quantized motion vector codes and residual error codes, through any coding technique. The encoder 125 (as implemented in encoder 1105) may encode each of the plurality of 2D tiles separately.

In an example implementation, a different quality (or quality of service (QoS)) may be used on a tile (of the plurality of tiles) that includes the view perspective as compared to tiles at a peripheral view or outside (e.g., not seen by a viewer during playback) the view perspective. The QoS can be based on compression algorithm, a transmission rate, and/or an encoding scheme. For example, the tile (or tiles) that include the view perspective may be encoded at a higher QoS than the tiles at a peripheral view or outside the view perspective. The QoS may affect the resolution of the a tile and/or tiles when decoded. Accordingly, the tile that includes the view perspective (as a viewable perspective including a portion of the spherical video frame) can be encoded such that the tile that includes the view perspective has a higher resolution (when decoded) as compared to tiles at a peripheral view or outside (e.g., not seen by a viewer during playback) the view perspective (when decoded).

In an example implementation, the plurality of 2D tiles at a peripheral view or outside the view perspective can include tiles of differing dimensions. Further, a larger of the tiles of differing dimensions can be encoded with a lower QoS as compared to a QoS of a smaller of the tiles of differing dimensions. Accordingly, a resolution of decoded tiles associated with 2D tiles at a peripheral view or outside the view perspective can be different based on a size of a tile and/or a position of a tile.

In step S1240 an encoded (compressed) video bits packet including the encoded 2D tiles is generated. For example, the packet builder 1130 can build a packet for transmission. The packet may include compressed video bits 10A. The packet may include the encoded tiles (e.g., a plurality of tiles). The packet may include a header for transmission. The header may include, amongst other things, the information indicating the mode or scheme use in intra-frame coding by the encoder. The header may include information indicating parameters used to convert a frame of the spherical video frame to a 2-D rectangular representation. The header may include information indicating parameters used to achieve the QoS (e.g., a plurality of QoS) of the encoded tiles.

In one example implementation, the packet builder 1130 builds a packet that includes only the plurality of encoded tiles as the encoded bits. In another implementation, the packet builder 1130 can build a packet that mimics an encoded complete frame. Accordingly, the packet builder 1130 may fill in a mimicked frame with dummy data in data (or bit) locations (of a frame) that are not associated with the plurality of encoded tiles. For example, the packet builder 1130 could include a template for an encoded frame, map bits associate with the plurality of encoded tiles to a position in the template corresponding to the plurality of encoded tiles and assign the remainder of the positions in the template with dummy data (e.g., a value of 0).

FIG. 13 illustrates a method for decoding streaming spherical video according to at least one example embodiment. As shown in FIG. 13, in step S1305 a packet including encoded (compressed) video bits is received, the packet includes a plurality of encoded 2D tiles selected from a spherical video frame (or spherical image). For example, the packet may include compressed video bits 10A. The packet may include a header for transmission. The header may include, amongst other things, the information indicating the mode or scheme use in intra-frame coding by the encoder. The header may include information indicating parameters used to convert a frame of the spherical video to a 2-D rectangular representation. The header may include information indicating parameters used to achieve the QoS of the plurality of encoded tiles. As discussed above, a different quality (or quality of service (QoS)) may be used on a tile (of the plurality of tiles) that includes the view perspective as compared to tiles at a peripheral view or outside (e.g., not seen by a viewer during playback) the view perspective. For example, the QoS of the tile that includes the view perspective may be higher than the QoS of the tiles at a peripheral view or outside (e.g., not seen by a viewer during playback) the view perspective.

In step S1310, in one implementation, a 2D representation of the spherical video frame (or image) based on the 2D tiles can be generated. For example, in this case only the plurality of encoded tiles are received. Therefore, the decoder (e.g., implementing frame builder module 1155) may fill in a mimicked frame with dummy data in data (or bit) locations (of a frame) that are not associated with the plurality of encoded tiles. For example, the frame builder module 1155 could include a template for an encoded frame, map bits associate with the plurality of encoded tiles to a position in the template corresponding to the plurality of encoded tiles and assign the remainder of the positions in the template with dummy data (e.g., a value of 0).

In step S1315 the 2D representation, including the plurality of encoded tiles, is decoded. For example, a video decoder (e.g., decoder 175, 1150, 1170) entropy decodes the encoded 2D representation. For example, the compressed video bits can be decoded by entropy decoding using, for example, Context Adaptive Binary Arithmetic Decoding to produce a set of quantized transform coefficients. The video decoder de-quantizes the transform coefficients given by the entropy decoded bits. For example, the entropy decoded video bits can be dequantized by mapping values within a relatively small range to values in a relatively large range (e.g. opposite of the quantization mapping described above). Further, the video decoder inverse transforms the video bits using an indicated (e.g., in the header) transform (e.g., a KLT, a SVD, a DCT or an ADST). The video decoder can filter the reconstructed pixel in the video frame. For example, a loop filter can be applied to the reconstructed block to reduce blocking artifacts. For example, a deblocking filter can be applied to the reconstructed block to reduce blocking distortion. Decoding the 2D representation can include using (each of) the QoS as input parameters for the decoding scheme or codec.

In step S1320 the 2D representation is converted to the spherical video frame. For example, the decoded 2D representation can be converted to a spherical video frame (or image). For example, the 2D representation can be converted using the inverse of the technique described above with regard to mapping a spherical frame (or image) to a 2D representation of the spherical frame (or image).

In step S1325 a spherical video stream (or spherical image) is generated based on at least one spherical video frame frame(s) including the decoded plurality of tiles. For example, at least one video frame of reconstructed converted pixels of the spherical video, including the decoded plurality of tiles, may be organized in a sequence to form a spherical video stream. As discussed above, the tile (of the plurality of tiles) that includes the view perspective was encoded with a higher QoS than the tiles at a peripheral view or outside (e.g., not seen by a viewer during playback) the view perspective. Accordingly, the generating of the spherical video stream including may result in the visible portion of the spherical video stream being of a higher quality than the peripheral or non-visible portion of the spherical video stream during a playback of the spherical video stream.

In an example implementation, if the view perspective as seen by the viewer changes during the streaming (and/or decoding) of the spherical video or image, an indication of the changed view perspective can be triggered and sent to a device executing an encoding of the spherical video.

Figure 14A:
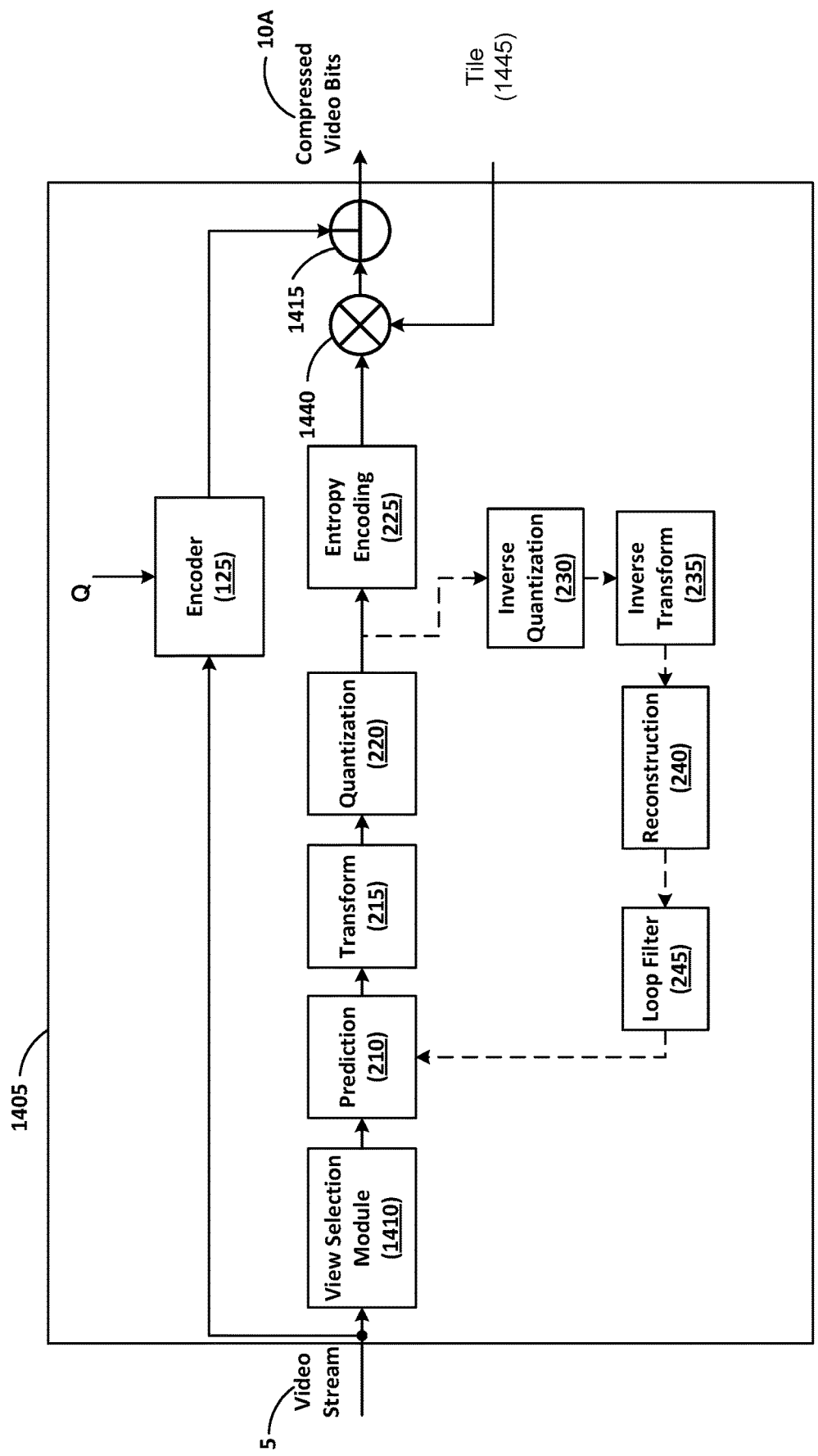
FIG. 14A illustrates another flow diagram for a video encoder system according to at least one example embodiment.

FIG. 14A illustrates another flow diagram for a video encoder system 1405 according to at least one example embodiment. The video encoder 1405 can replace video encoder 125 in system 100 shown in FIG. 1A and described above. Accordingly, the video encoder 1405 includes a spherical to 2D representation block 205, a prediction block 210, a transform block 215, a quantization block 220, an entropy encoding block 225, an inverse quantization block 230, an inverse transform block 235, a reconstruction block 240, and a loop filter block 245. In addition, the video encoder 1405 includes a view selection module 1410, encoder 125, and packet builder (or combiner) 1415. In an alternative implementation (and/or an additional implementation), the encoder 1405 includes a switch 1440. Other structural variations of video encoder 1405 can be used to encode input video stream 5. As shown in FIG. 14A, dashed lines represent a reconstruction path amongst the several blocks and solid lines represent a forward path amongst the several blocks.

The view selection module 1410 may be configured to select a tile (or plurality of tiles) based a view or perspective or view perspective of a user watching the spherical video. For example, as discussed above, the view, perspective or view perspective may be a viewable perspective 320 which in turn may be a portion of the sphere 300 as viewed from inside perspective 305. The tile may be a plurality of pixels selected based on the view. The plurality of pixels may be a block, plurality of blocks or macro-block that can include a portion of the spherical image that can be seen by the user. The portion of the spherical image may have a length and width. The portion of the spherical image may be two dimensional or substantially two dimensional. The tile can have a variable size (e.g., how much of the sphere the tile covers). For example, the size of the tile can be encoded and streamed based on, for example, how wide the viewer's field of view is and/or how quickly the user is rotating their head. For example, if the viewer is continually looking around, then larger, lower quality tiles may be selected. However, if the viewer is focusing on one perspective, smaller more detailed tiles may be selected.

In an example implementation, parameters used in and/or determined by encoder 125 can be used by other elements of the encoder 1405. For example, motion vectors (e.g., as used in prediction) used to encode the 2D representation could be used to encode the tile. Further, parameters used in and/or determined by the prediction block 210, the transform block 215, the quantization block 220, the entropy encoding block 225, the inverse quantization block 230, the inverse transform block 235, the reconstruction block 240, and the loop filter block 245 could be shared between encoder 125 and the encoder 1405.

The portion of the spherical video frame or image may be processed as an image. Therefore, the portion of the spherical video frame may be converted (or decomposed) to a C×R matrix of blocks (hereinafter referred to as blocks). For example, the portion of the spherical video frame may be converted to a C×R matrix of 16×16, 16×8, 8×16, 8×8, 8×4, 4×8, 4×4 or 2×2 blocks each having a number of pixels.

According to an example implementation, the encoder 125 may encode a frame at a different quality (or quality of service (QoS)), as indicated by Q, than the encoder 1405 encodes the tile. The QoS can be based on compression algorithm, a transmission rate, and/or an encoding scheme. Therefore, the encoder 125 may use a different compression algorithm and/or encoding scheme than encoder 1405. For example, the encoded tile may be at a higher QoS than the frame encoded by the encoder 125. As discussed above, encoder 125 may be configured to encode a 2D representation of the spherical video frame. Accordingly, the tile (as a viewable perspective including a portion of the spherical video frame) can be encoded with a higher QoS than the 2D representation of the spherical video frame. The QoS may affect the resolution of the frame when decoded. Accordingly, the tile (as a viewable perspective including a portion of the spherical video frame) can be encoded such that the tile has a higher resolution of the frame when decoded as compared to a decoded 2D representation of the spherical video frame.

The packet builder 1415 may be configured to build a packet for transmission. The packet may include compressed video bits 10A. The packet may include the encoded 2D representation of the spherical video frame and the encoded tile (or plurality of tiles). The packet may include may include a header for transmission. The header may include, amongst other things, the information indicating the mode or scheme use in intra-frame coding by the encoder. The header may include information indicating parameters used to convert a frame of the spherical video frame to a 2D rectangular representation. The header may include information indicating parameters used to achieve the QoS of the encoded 2D rectangular representation and of the encoded tile.

In an alternative implementation (and/or an additional implementation), the encoder 1405 can project the tile using a different projection technique or algorithm than that used to generate the 2D representation of the spherical video frame. Some projections can have distortions in certain areas of the frame. Accordingly, projecting the tile differently than the spherical frame can improve the quality of the final image, and/or use pixels more efficiently. In one example implementation, the spherical image can be rotated before projecting the tile in order to orient the tile in a position that is minimally distorted based on the projection algorithm. In another example implementation, the tile can use (and/or modify) a projection algorithm that is based on the position of the tile. For example, projecting the spherical video frame to the 2D representation of can use an equirectangular projection, whereas projecting the spherical video frame to a representation including a portion to be selected as the tile can use a cubic projection.

In an alternative implementation (and/or an additional implementation), the encoder 1405 includes the switch 1440. In this example implementation, instead of encoding a tile based on the selected view, the tile is chosen from a previously encoded (and stored) tile as read from a datastore (e.g., view frame storage 1515). The previously encoded tile can be time and view dependent. In other words, the tile can be selected based on the frame that is currently being encoded (e.g., by encoder 125 as shown in FIG. 14A). Accordingly, the frame that is currently being encoded and the selected tile are from the same source file (e.g., the same (or equivalent) spherical video file) and in the same time slice. The tile can be view, perspective or view perspective dependent because the previously encoded tile can be selected based on the same view as the view that would have been selected from the spherical video frame. In other words, the selected previously encoded tile is selected based on the same criteria as used by the view selection module 1410 to select a tile from the spherical video frame to be encoded.

Figure 14B:
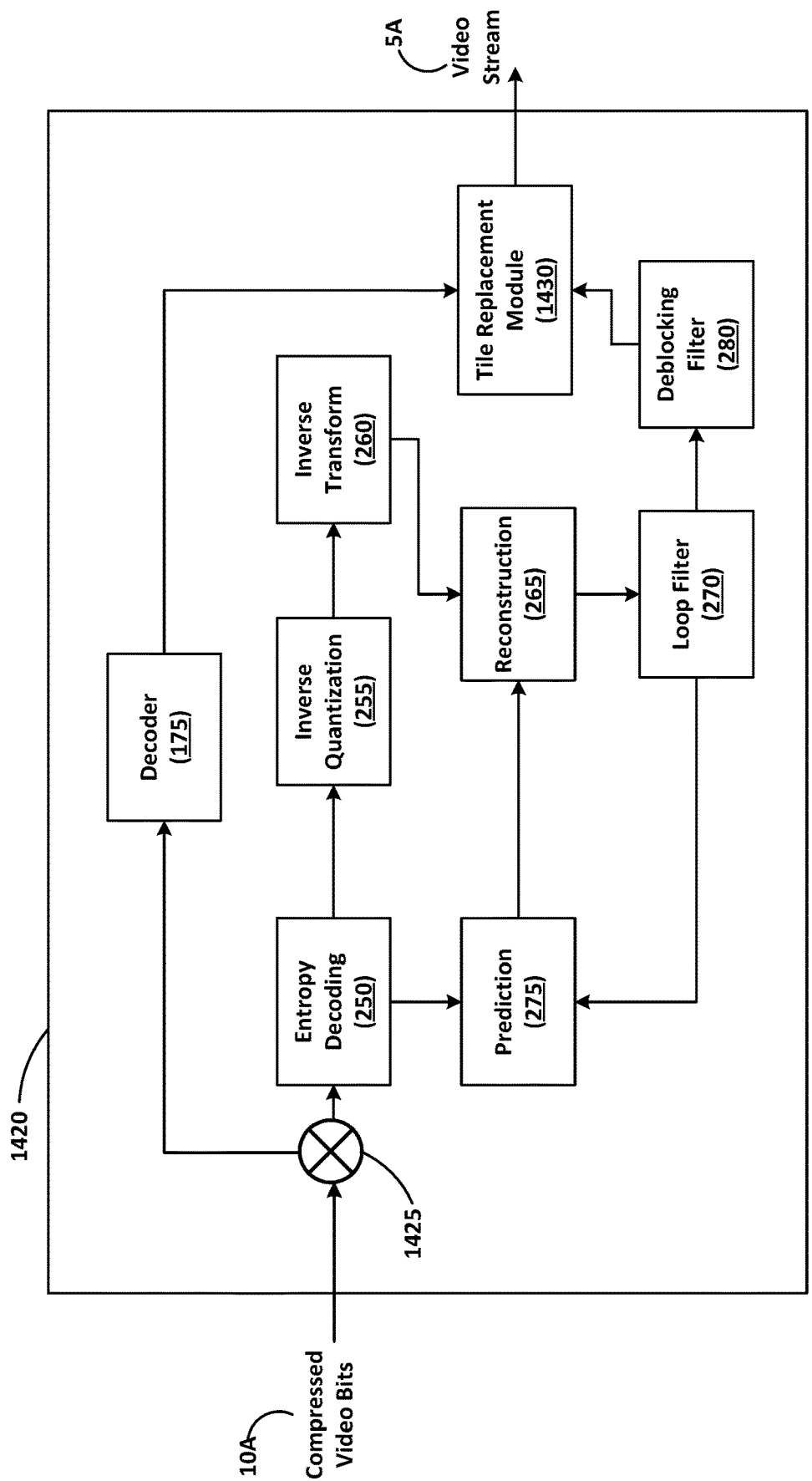
FIG. 14B illustrates another flow diagram for a video decoder system according to at least one example embodiment.

FIG. 14B illustrates another flow diagram for a video decoder system according to at least one example embodiment. The video decoder 1420 can replace video decoder 175 in system 150 shown in FIG. 1B and described above. Accordingly, the video decoder 1420 includes an entropy decoding block 250, an inverse quantization block 255, an inverse transform block 260, a reconstruction block 265, a loop filter block 270, a prediction block 275, a deblocking filter block 280 and a 2D representation to spherical block 285. In addition, the video decoder 1420 includes decoder 175, a packet de-constructor 1425, and a tile replacement module 1430.

The packet de-constructor 1425 may be configured to separate the encoded 2D rectangular representation of the spherical video frame from the encoded tile. The encoded 2D rectangular representation of the spherical video frame is then decoded by the decoder 175. The tile is also decoded and then the tile replacement module 1430 may be configured to replace the corresponding pixels (or blocks or macro-block) in the spherical video frame with the pixels of the decoded tile. As discussed above, the tile was encoded with a higher QoS than the 2D rectangular representation of the spherical video frame. Accordingly, the resultant spherical video has a higher quality image (or portion of the spherical video) in the view, perspective or view perspective of the watcher of the spherical video as compared to the image(s) (or portion of the spherical video) that is not in (or outside) the view, perspective or view perspective of the watcher.

In an example implementation, parameters used in and/or determined by decoder 175 can be used by other elements of the encoder decoder 1420. For example, motion vectors (e.g., as used in prediction) used to decode the 2D representation could be used to decode the tile. Further, parameters used in and/or determined by the entropy decoding block 250, the inverse quantization block 255, the inverse transform block 260, the reconstruction block 265, the loop filter block 270, a prediction block 275, the deblocking filter block 280 could be shared between decoder 175 and the decoder 1420.

Figure 15A:
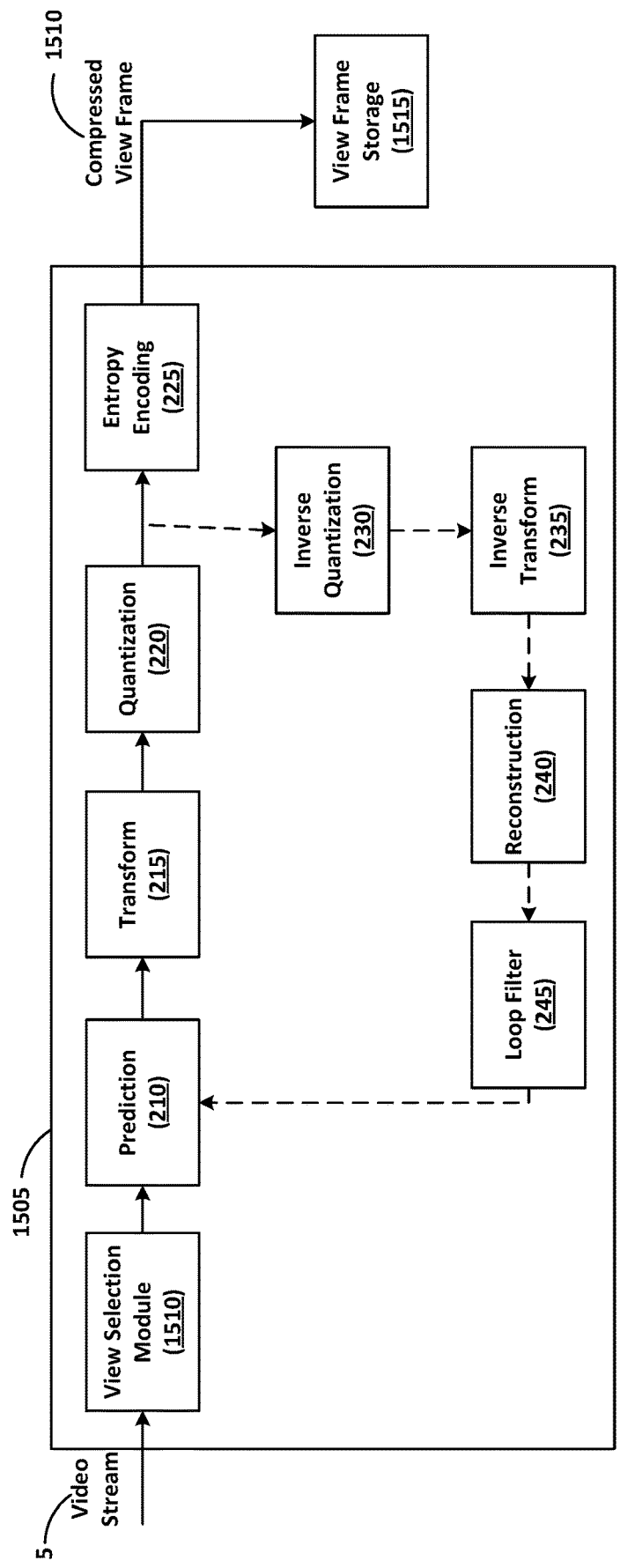
FIGS. 15A and 15B illustrate a flow diagram for a video encoder system according to at least one example embodiment.
Figure 15B:
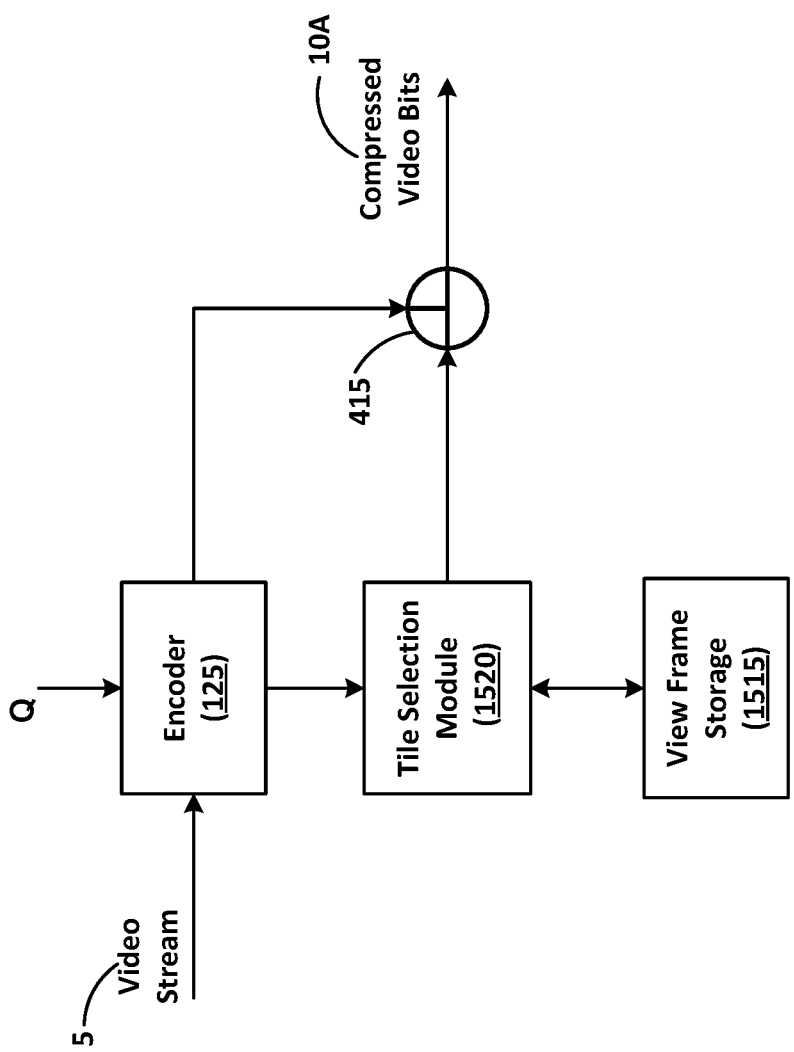

FIGS. 15A and 15B illustrate a flow diagram for a video encoder system according to at least one example embodiment. As shown in FIG. 15A, the encoder 1505 adds features to encoder 125. Accordingly, the video encoder 1505 includes a spherical to 2D representation block 205, a prediction block 210, a transform block 215, a quantization block 220, an entropy encoding block 225, an inverse quantization block 230, an inverse transform block 235, a reconstruction block 240, and a loop filter block 245. In addition, the video encoder 1505 includes a view selection module 1510. Other structural variations of video encoder 1505 can be used to encode input video stream 5. As shown in FIG. 15A, dashed lines represent a reconstruction path amongst the several blocks and solid lines represent a forward path amongst the several blocks.

The view selection module 1510 may be configured to select a tile (or plurality of tiles) based a view or perspective of a user watching the spherical video. For example, as discussed above, the view, perspective or view perspective may be a viewable perspective 320 which in turn may be a portion of the sphere 300 as viewed from inside perspective 305. The tile may be a plurality of pixels selected based on the view. The plurality of pixels may be a block, plurality of blocks or macro-block that can include a portion of the spherical image that can be seen by the user. The portion of the spherical image may have a length and width. The portion of the spherical image may be two dimensional or substantially two dimensional.

In an alternative implementation (and/or an additional implementation), the encoder 1505 can project the tile (or plurality of tiles) using a different projection technique or algorithm than that used to generate the 2D representation of the spherical video frame. For example, some projections can have distortions in certain areas of the frame, so projecting the tile differently than the spherical frame can improve the quality of the final image, and/or use pixels more efficiently. In one example implementation, the spherical image can be rotated before projecting the tile in order to orient the tile in a position that is minimally distorted based on the projection algorithm. In another example implementation, the tile can use (and/or modify) a projection algorithm that is based on the position of the tile. For example, projecting the spherical video frame to the 2D representation of can use an equirectangular projection, whereas projecting the spherical video frame to a representation including a portion to be selected as the tile can use a cubic projection.

The portion of the spherical video frame or image may be processed as an image. Therefore, the portion of the spherical video frame may be converted (or decomposed) to a C×R matrix of blocks (hereinafter referred to as blocks). For example, the portion of the spherical video frame may be converted to a C×R matrix of 16×16, 16×8, 8×8, 4×4 or 2×2 blocks each having a number of pixels.

Encoder 1505 may operate off-line as part of a set-up procedure for making a spherical video available for streaming. The view selection module 1510 may be configured to select a plurality of views so that the encoder 1505 can encode a plurality of tiles. Each of the plurality of tiles may be stored in view frame storage 1515. Each of the plurality of tiles may be indexed such that each of the plurality of tiles that are stored with a reference to the frame (e.g., a time dependence) and a view (e.g., a view dependence). Accordingly, each of the plurality of tiles so that they are time and view, perspective or view perspective dependent and can be recalled based on the time and view dependence.

As such, in an example implementation, the encoder 1505 may be configured to execute a loop where a frame is selected and a portion of the frame is selected as a tile based on a view. The tile is then encoded and stored. The loop continues to cycle through a plurality of views. When a desired number of views, for example, every 5 degrees around the vertical and every 5 degrees around the horizontal of the spherical image, are saved as tiles, a new frame is selected and the process repeats until all frames of the spherical video have a desired number of tiles saved for them. This is but one example implementation for encoding and saving tiles. Other implementations are contemplated and within the scope of this disclosure.

As shown in FIG. 15B, encoder 125 can be encoding a spherical video stream 5. The encoder 125 can communicate information to a tile selection module 1520. For example, the encoder 125 can communicate an indication of a frame number, an indication of a view, perspective or view perspective and an indication of a QoS used for encoding the spherical video stream 5. The tile selection module 1520 can use this information to select a tile (or plurality of tiles from the view frame storage 1515. The packet builder 1415 may be configured to build a packet for transmission. The packet may include compressed video bits 10A. Amongst other data or information, the packet may include the encoded 2D representation of the spherical video frame as encoded by encoder 125 and the encoded tile (or plurality of tiles as read from the view frame storage 1515.

Figure 16:
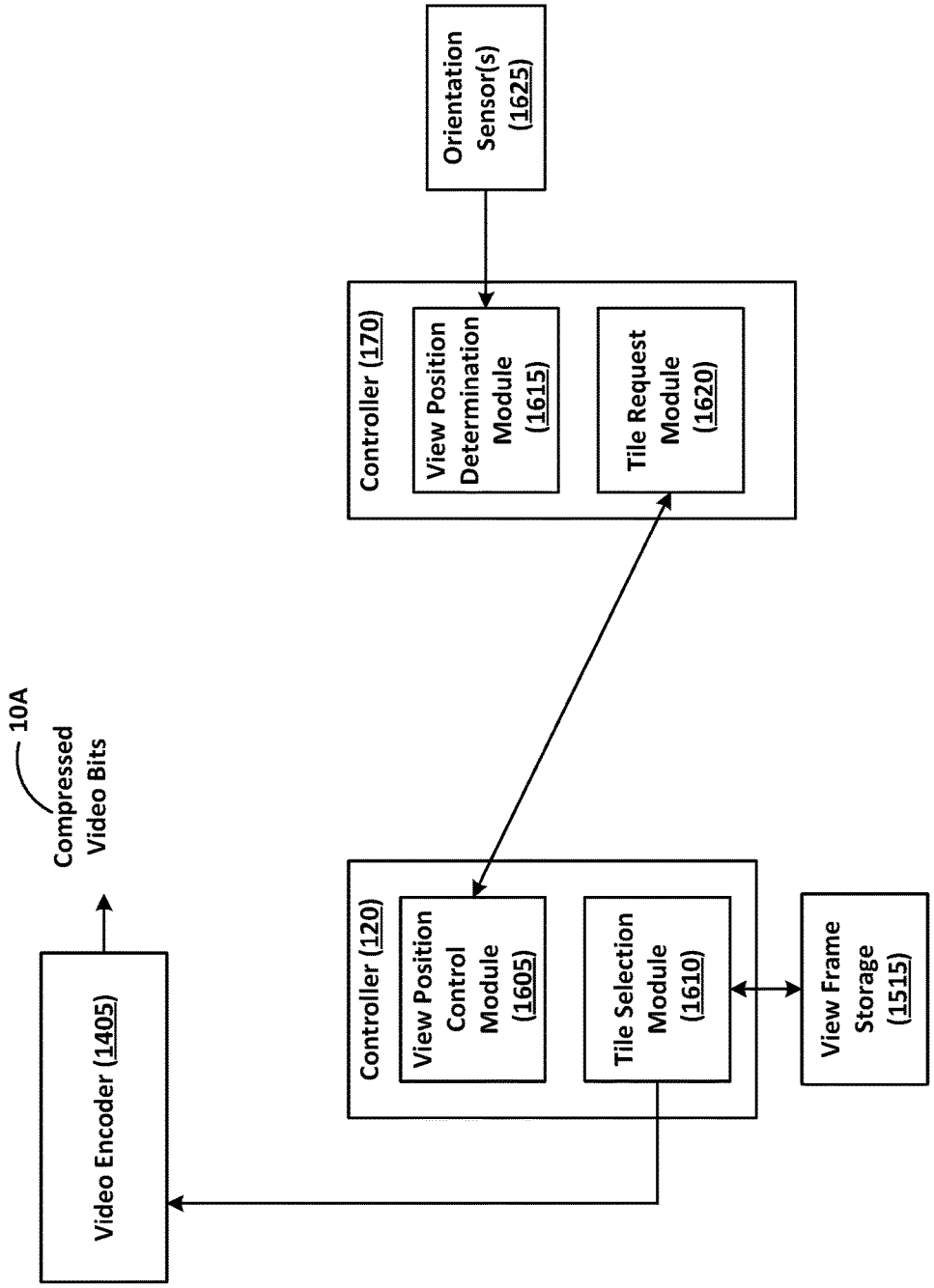
FIG. 16 illustrates a system according to at least one example embodiment.

FIG. 16 illustrates a system 1600 according to at least one example embodiment. As shown in FIG. 16, the system 1600 includes the controller 120, the controller 170, the encoder 1405, the view frame storage 1515 and an orientation sensor 1625. The controller 120 further includes a view position control module 1605 and a tile selection module 1610. The controller 170 further includes a view position determination module 1615 and a tile request module 1620.

According to an example implementation, the orientation sensor 1625 detects an orientation (or change in orientation) of a viewers eyes (or head), the view position determination module 1615 determines a view, perspective or view perspective based on the detected orientation and the tile request module 1620 communicates the view, perspective or view perspective as part of a request for a tile or a plurality of tiles (in addition to the spherical video). According to another example implementation, the orientation sensor 1625 detects a orientation (or change in orientation) based on an image panning orientation as rendered on a display. For example, a user may use a mouse, a track pad or a gesture (e.g., on a touch sensitive display) to select, move, drag, expand and/or the like a portion of the spherical video or image as rendered on the display.

The request for the tile may be communicated together with a request for a frame of the spherical video. The request for the tile may be communicated together separate from a request for a frame of the spherical video. For example, the request for the tile may be in response to a changed view, perspective or view perspective resulting in a need to replace previously requested and/or queued tiles.

The view position control module 1605 receives and processes the request for the tile. For example, the view position control module 1605 can determine a frame and a position of the tile or plurality of tiles in the frame based on the view. Then the view position control module 1605 can instruct the tile selection module 1610 to select the tile or plurality of tiles. Selecting the tile or plurality of tiles can include passing a parameter to the encoder 1405. The parameter can be used by the view selection module 1410 during the encoding of the spherical video and/or tile. Alternatively, selecting the tile or plurality of tiles can include selecting the tile or plural of tiles from the view frame storage 1515. The selected tile or plurality of tiles can then be passed to the encoder 1405 as tile 1445. In another example implementation, selecting the tile or plurality of tiles can include passing a parameter to the tile selection module 1520 which can use this information to select a tile (or plurality of tiles from the view frame storage 1515 as described above with regard to FIG. 15B.

Accordingly, the orientation sensor 1625 can be configured to detect an orientation (or change in orientation) of a viewers eyes (or head). For example, the orientation sensor 1625 can include an accelerometer in order to detect movement and a gyroscope in order to detect orientation. Alternatively, or in addition to, the orientation sensor 1625 can include a camera or infra-red sensor focused on the eyes or head of the viewer in order to determine a orientation of the eyes or head of the viewer. Alternatively, or in addition to, the orientation sensor 1625 can determine a portion of the spherical video or image as rendered on the display in order to detect an orientation of the spherical video or image. The orientation sensor 1625 can be configured to communicate orientation and change in orientation information to the view position determination module 1615.

The view position determination module 1615 can be configured to determine a view or perspective view (e.g., a portion of a spherical video that a viewer is currently looking at) in relation to the spherical video. The view, perspective or view perspective can be determined as a position, point or focal point on the spherical video. For example, the view could be a latitude and longitude position on the spherical video. The view, perspective or view perspective can be determined as a side of a cube based on the spherical video. The view (e.g., latitude and longitude position or side) can be communicated to the view position control module 1605 using, for example, a Hypertext Transfer Protocol (HTTP).

The view position control module 1605 may be configured to determine a view position (e.g., frame and position within the frame) of a tile or plurality of tiles within the spherical video. For example, the view position control module 1605 can select a rectangle centered on the view position, point or focal point (e.g., latitude and longitude position or side). The tile selection module 1610 can be configured to select the rectangle as a tile or plurality of tiles. The tile selection module 1610 can be configured to instruct (e.g., via a parameter or configuration setting) the encoder 1405 to encode the selected tile or plurality of tiles and/or the tile selection module 1610 can be configured to select the tile or plurality of tiles from the view frame storage 1515.

FIGS. 17-20 are flowcharts of methods according to example embodiments. The steps described with regard to FIGS. 17-20 may be performed due to the execution of software code stored in a memory (e.g., at least one memory 110) associated with an apparatus (e.g., as shown in FIG. 1) and executed by at least one processor (e.g., at least one processor 105) associated with the apparatus. However, alternative embodiments are contemplated such as a system embodied as a special purpose processor. Although the steps described below are described as being executed by a processor, the steps are not necessarily executed by a same processor. In other words, at least one processor may execute the steps described below with regard to FIGS. 17-20.

Figure 17:
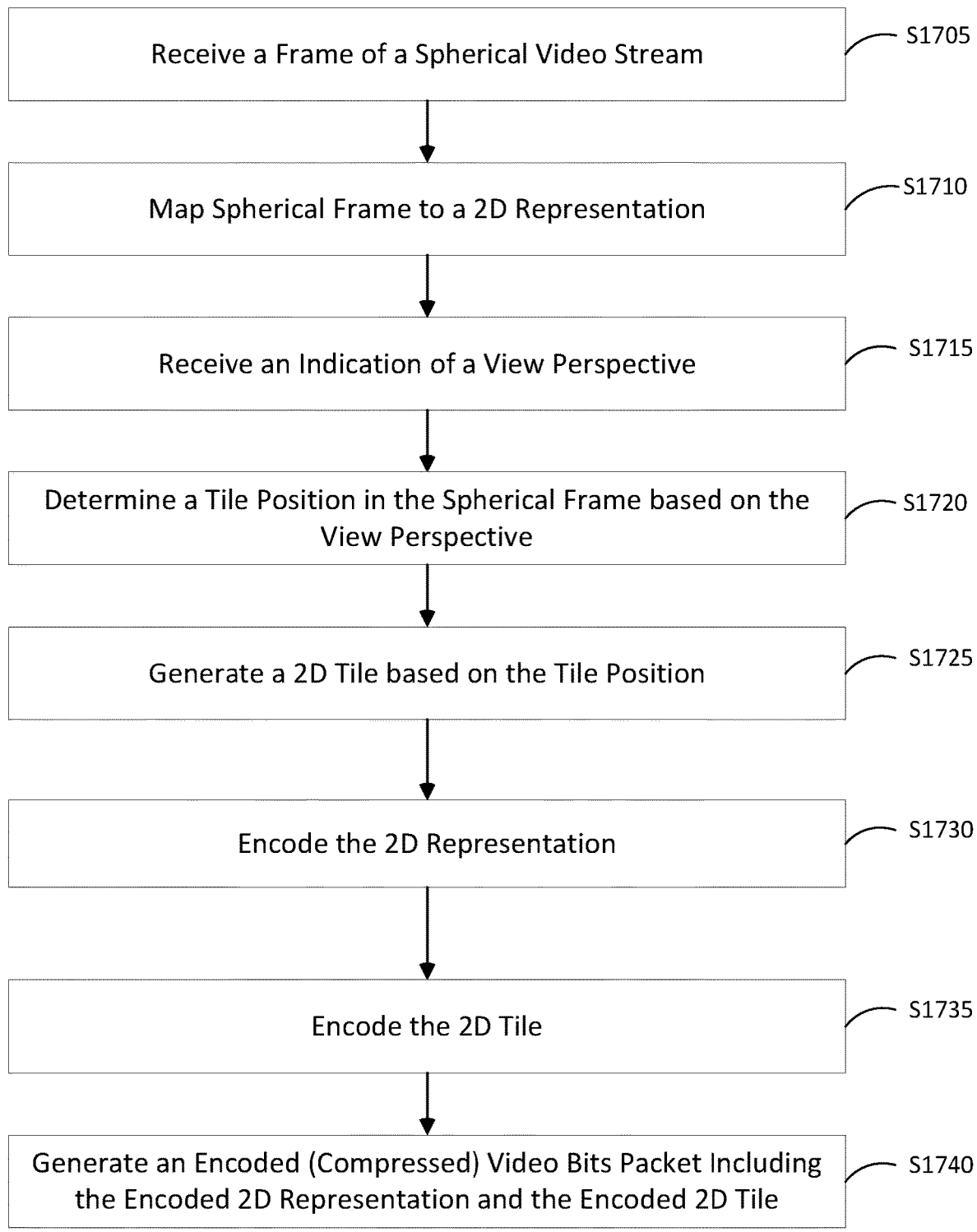
FIGS. 17-19 illustrate methods for encoding streaming spherical video according to at least one example embodiment.

FIG. 17 illustrates a method for encoding streaming spherical video according to at least one example embodiment. As shown in FIG. 17, in step S1705 a frame of a spherical video stream is received. For example, a controller (e.g., controller 120) may instruct an encoder (e.g., encoder 125, 1405, 1505) to receive one or more frames from a video source(s). The video source(s) the may include any video source (e.g., a data storage device, a network, the Internet, a separate computing device, and the like). For example, the video sequence frame(s) may be video frames associated with a spherical video stream (e.g., video stream 5). The video stream may be a real time video stream (e.g., a video conference or a video chat). For example, the video stream may be a previously recorded video (e.g., a movie or a video recorder recording). In addition, the video content may be analog or digital video.

In step S1710 the spherical frame is mapped to a 2D representation. For example, mapping a frame (or spherical image) to a 2D representation can include projecting the frame (or spherical image) onto the surface of a cylinder (which is then unwrapped into a rectangle), a square or rectangle. In one example implementation, the projection can be equirectangular. In other words, pixels along a line at the center of the sphere (e.g., an equator) are mapped to an equidistant line between the top and the bottom of the cylinder, square or rectangle. Then, moving away from the line (e.g., up and down from the line), each horizontal line is mapped to the cylinder as a straight line across the middle of the image with the vertical line remaining vertical. As the horizontal line gets closer and closer to the poles of the sphere, the image can be stretched to fit to the cylinder, the square or the rectangle. Other projections are contemplated. For example, a semi-equirectangular projection could be used. A semi-equirectangular may scale the amount of the aforementioned stretch such that the projection does not completely fill the cylinder, the square or the rectangle.

In step S1715 an indication of a view perspective is received. The indication of the view perspective can be received from a device executing a playback of the spherical video. In other words, the indication of the view perspective can be received from a device implementing a decoder (e.g., decoder 175, 1420) in order for a viewer to view the spherical video. For example, as discussed above, the indication of a view perspective can be based on a portion of a spherical video that a viewer is currently looking at. The indication can be, for example, a point or position (e.g., longitude and latitude) on the sphere, a plurality of points on the sphere, a side of a cube representing the sphere, and/or a plurality of sides of a cube representing the sphere.

In step S1720 a tile position in the spherical frame is determined based on the view perspective. For example, if the indication is a point or position on the sphere (as a spherical image or frame), a tile (e.g., a number of pixels, a block and/or a macro-block) can be determined based on point or position. In an example implementation, the tile (at least one tile or a plurality of tiles) position can be a rectangle centered on the point or position.

In step S1725 a 2D tile is generated based on the tile position. For example, the 2D tile can be an image including a plurality of pixels. The 2D tile or image can be a portion of the frame of the spherical video. The 2D tile or image can include the plurality of pixels included in the rectangle centered on the point or position.

In an alternative implementation (and/or an additional implementation), the tile (or plurality of tiles) can be projected using a different projection technique or algorithm than that used to generate the 2D representation of the spherical video frame. For example, some projections can have distortions in certain areas of the frame, so projecting the tile differently than the spherical frame can improve the quality of the final image, and/or use pixels more efficiently. In one example implementation, the spherical image can be rotated before projecting the tile in order to orient the tile in a position that is minimally distorted based on the projection algorithm. In another example implementation, the tile can use (and/or modify) a projection algorithm that is based on the position of the tile. For example, projecting the spherical video frame to the 2D representation of can use an equirectangular projection, whereas projecting the spherical video frame to a representation including a portion to be selected as the tile can use a cubic projection.

In step S1730 the 2D representation is encoded. For example, the 2D representation may be transformed (encoded or compressed) into transform coefficients using a configured transform (e.g., a KLT, a SVD, a DCT or an ADST). The encoded transform coefficients or set of residual values for the block can be quantized. For example, the controller 120 may instruct (or invoke) the quantization block 220 to quantize coded motion vectors and the coded residual errors, through any reasonably suitable quantization techniques. In addition, the controller 120 may instruct the entropy coding block 220 to, for example, assign codes to the quantized motion vector codes and residual error codes to match code lengths with the probabilities of the quantized motion vector codes and residual error codes, through any coding technique. Further, encoding the frame including the 2D representation may include decomposing the frame into N×N blocks or macroblocks. For example, the controller 120 may instruct the encoder to decompose each of the video sequence frames into macroblocks having N×N dimensions. For example, the encoder can use a quadtree decomposition technique to decompose the frames including the 2D representation.

In step S1735 the 2D tile is encoded. For example, the 2D tile may be transformed (encoded or compressed) into transform coefficients using a configured transform (e.g., a KLT, a SVD, a DCT or an ADST). The encoded transform coefficients or set of residual values for the block can be quantized. For example, the controller 120 may instruct (or invoke) the quantization block 220 to quantize coded motion vectors and the coded residual errors, through any reasonably suitable quantization techniques. In addition, the controller 120 may instruct the entropy coding block 220 to, for example, assign codes to the quantized motion vector codes and residual error codes to match code lengths with the probabilities of the quantized motion vector codes and residual error codes, through any coding technique. Further, encoding the frame including the 2D tile may include decomposing the frame into N×N blocks or macroblocks. For example, the controller 120 may instruct the encoder to decompose each of the video sequence frames into macroblocks having N×N dimensions. For example, the encoder can use a quadtree decomposition technique to decompose the frames including the 2D representation. Further, encoding the 2D tile may include decomposing the 2D tile into N×N blocks or macroblocks. For example, the controller 120 may instruct the encoder to decompose the 2D tile into macroblocks having N×N dimensions. For example, the encoder can use a quadtree decomposition technique to decompose the 2D tile.

In step S1740 an encoded (compressed) video bits packet including the encoded 2D representation and the encoded 2D tile is generated. For example, the packet builder 1415 can build a packet for transmission. The packet may include compressed video bits 10A. The packet may include the encoded 2D representation of the spherical video frame and the encoded tile (or plurality of tiles). The packet may include a header for transmission. The header may include, amongst other things, the information indicating the mode or scheme use in intra-frame coding by the encoder. The header may include information indicating parameters used to convert a frame of the spherical video frame to a 2D rectangular representation. The header may include information indicating parameters used to achieve the QoS of the encoded 2D rectangular representation and of the encoded tile. As discussed above, the QoS of the encoded 2D rectangular representation and the QoS of the encoded 2D tile can be different. For example, the QoS of the encoded 2D rectangular representation may be lower than the QoS of the encoded 2D tile.

Figure 18:
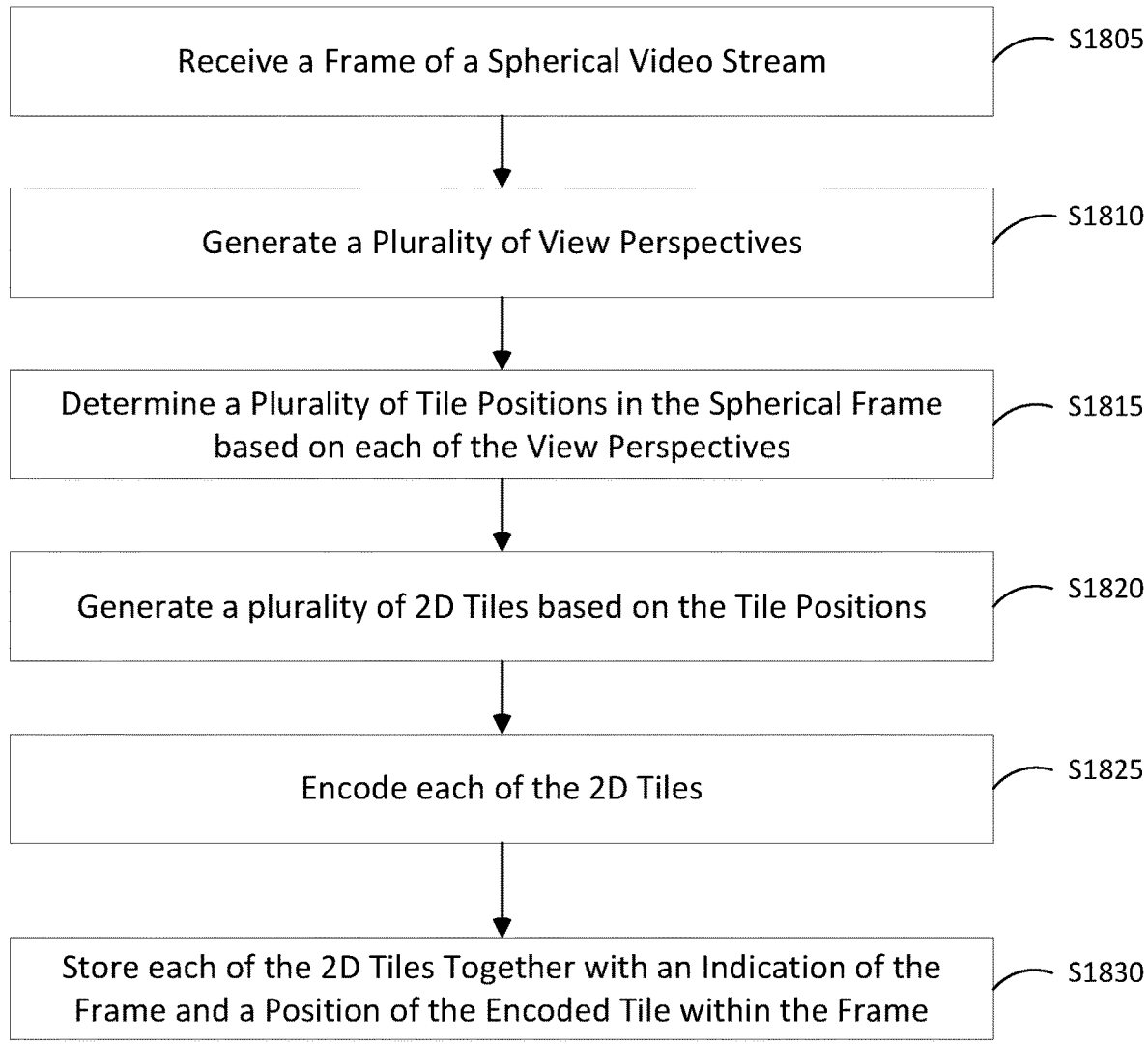

FIG. 18 illustrates another method for encoding streaming spherical video according to at least one example embodiment. As shown in FIG. 18, in step S1805 a frame of a spherical video stream is received. For example, a controller (e.g., controller 120) may instruct an encoder (e.g., encoder 125, 1405, 1505) to receive one or more frames from a video source(s). The video source(s) the may include any video source (e.g., a data storage device, a network, the Internet, a separate computing device, and the like). For example, the video sequence frame(s) may be video frames associated with a spherical video stream (e.g., video stream 5). The video stream may be a real time video stream (e.g., a video conference or a video chat). For example, the video stream may be a previously recorded video (e.g., a movie or a video recorder recording). In addition, the video content may be analog or digital video.

In step S1810 a plurality of view perspectives are generated. For example, the view selection module 1510 may be configured to select a plurality of views or view perspectives so that the encoder 1505 can encode a plurality of tiles. The encoder 1505 may be configured to execute a loop where a frame is selected and a portion of the frame is selected as a tile based on a view. The tile is then encoded and stored. The loop continues to cycle through a plurality of views. When a desired number of views, for example, every 5 degrees around the vertical and every 5 degrees around the horizontal of the spherical image, are saved as tiles, a new frame is selected and the process repeats until all frames of the spherical video have a desired number of tiles saved for them.

In step S1815 a plurality of tile positions in the spherical frame are determined based on each of the view perspectives. For example, a tile position for each of the plurality of view perspectives can be determined. For example, if the plurality of view perspectives are each based on a point or position on the sphere (as a spherical image or frame), a tile (e.g., a number of pixels, a block and/or a macro-block) can be determined based on point or position. In an example implementation, the tile (at least one tile or a plurality of tiles) position can be a rectangle centered on the point or position.

In step S1820 a plurality of 2D tiles are generated based on the tile positions. For example, a 2D tile for each of the plurality of tile positions can be generated (e.g., as a plurality of images). For example, each of the 2D tiles can be an image including a plurality of pixels. The 2D tiles or images can be a portion of the frame of the spherical video. The 2D tiles or images can include the plurality of pixels included in the rectangle centered on the point or position.

In an alternative implementation (and/or an additional implementation), the tile (or plurality of tiles) can be projected using a different projection technique or algorithm than that used to generate the 2D representation of the spherical video frame. For example, some projections can have distortions in certain areas of the frame, so projecting the tile differently than the spherical frame can improve the quality of the final image, and/or use pixels more efficiently. In one example implementation, the spherical image can be rotated before projecting the tile in order to orient the tile in a position that is minimally distorted based on the projection algorithm. In another example implementation, the tile can use (and/or modify) a projection algorithm that is based on the position of the tile. For example, projecting the spherical video frame to the 2D representation of can use an equirectangular projection, whereas projecting the spherical video frame to a representation including a portion to be selected as the tile can use a cubic projection.

In step S1825 each of the 2D tiles are encoded. For example, each of the plurality of 2D tiles may be transformed (encoded or compressed) into transform coefficients using a configured transform (e.g., a KLT, a SVD, a DCT or an ADST). The encoded transform coefficients or set of residual values for the block can be quantized. For example, the controller 120 may instruct (or invoke) the quantization block 220 to quantize coded motion vectors and the coded residual errors, through any reasonably suitable quantization techniques. In addition, the controller 120 may instruct the entropy coding block 220 to, for example, assign codes to the quantized motion vector codes and residual error codes to match code lengths with the probabilities of the quantized motion vector codes and residual error codes, through any coding technique. Further, encoding the frame including the 2D tile may include decomposing the frame into N×N blocks or macroblocks. For example, the controller 120 may instruct the encoder to decompose each of the video sequence frames into macroblocks having N×N dimensions. For example, the encoder can use a quadtree decomposition technique to decompose the frames including the 2D representation. Further, encoding the 2D tile may include decomposing the 2D tile into N×N blocks or macroblocks. For example, the controller 120 may instruct the encoder to decompose the 2D tile into macroblocks having N×N dimensions. For example, the encoder can use a quadtree decomposition technique to decompose the 2D tile.

In step S1830 each of the 2D tiles are stored together with an indication of the frame and a position of the encoded tile within the frame. For example, each of the plurality of encoded 2D tiles may be stored in view frame storage 1515. Each of the plurality of tiles may be indexed such that each of the plurality of tiles that are stored with a reference to the frame (e.g., a time dependence) and a view (e.g., a view dependence). Accordingly, each of the plurality of tiles so that they are time and view, perspective or view perspective dependent and can be recalled based on the time and view dependence.

Figure 19:
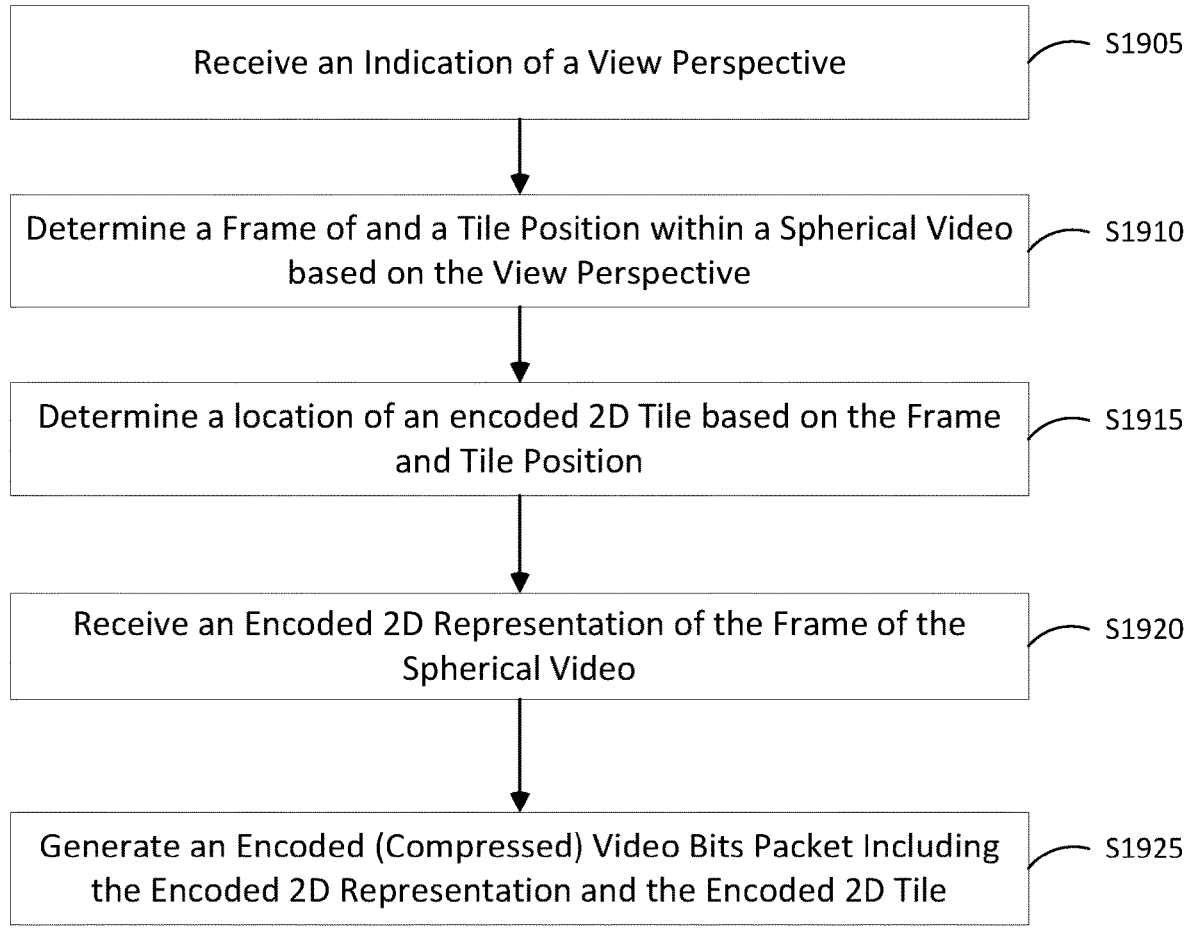

FIG. 19 illustrates a method for encoding streaming spherical video according to at least one example embodiment. As shown in FIG. 19, in step S1905 an indication of a view perspective is received. For example, as discussed above, a tile can be requested by a device including a decoder. The tile request can include information based on a perspective or view perspective related to an orientation, a position, point or focal point of a viewer on a spherical video. For example, the view perspective could be a latitude and longitude position on the spherical video. The view, perspective or view perspective can be determined as a side of a cube based on the spherical video. The indication of a view perspective can also include spherical video information. In an example implementation, the indication of a view perspective can include information about a frame (e.g., frame sequence) associated with the view perspective. For example, the view (e.g., latitude and longitude position or side) can be communicated from the view position determination module 1615 to the view position control module 1605 using, for example, a Hypertext Transfer Protocol (HTTP).

In step S1910 a frame of and a tile position within a spherical video is determined based on the view perspective. For example, the aforementioned information about the frame can be information indicating the frame is the current frame to be encoded or a previously encoded frame (e.g., as a frame sequence or sequence number). Accordingly, the frame can be determined as the current frame to be encoded or the previously encoded frame. Then, the tile position can be based on the view or view perspective within the determined frame.

In step S1915 a location of an encoded 2D tile is determined based on the frame and tile position. For example, using the frame and tile position, an encoded 2D tile can be looked-up or searched for in the view frame storage 1515. Upon finding the 2D tile in the view frame storage 1515, the 2D tile can be retrieved or read from the view frame storage 1515.

In step S1920 receive an encoded 2D representation of the frame of the spherical video is received. For example, an output of encoder 125 can be received. The output of encoder 125 can be encoded video bits representing the 2D representation of the frame of the spherical video.

In step S1925 an encoded (compressed) video bits packet including the encoded 2D representation and the encoded 2D tile is generated. For example, the packet builder 1415 may build a packet for transmission. The packet may include compressed video bits 10A. The packet may include the encoded 2D representation of the spherical video frame and the encoded tile (or plurality of tiles). The packet may include a header for transmission. The header may include, amongst other things, the information indicating the mode or scheme use in intra-frame coding by the encoder. The header may include information indicating parameters used to convert a frame of the spherical video frame to a 2D rectangular representation. The header may include information indicating parameters used to achieve the QoS of the encoded 2D rectangular representation and of the encoded tile. As discussed above, the QoS of the encoded 2D rectangular representation and the QoS of the encoded 2D tile can be different. For example, the QoS of the encoded 2D rectangular representation may be lower than the QoS of the encoded 2D tile.

In an alternative implementation of the steps associated with FIGS. 7-9, in an initialization process, in order to increase the speed of an initial stream of video, only the encoded 2D tiles are encoded and streamed. Then after the initial stream, the encoded 2D representation of the spherical is added to the packet including the encoded 2D tile as previously described.

In another alternative implementation, the QoS of the encoded 2D rectangular representation and the QoS of the encoded 2D tile may be dynamically adjusted based on, for example, the bandwidth available to the video stream. Accordingly, in some implementations the QoS of the encoded 2D rectangular representation may be approximately the same as the QoS of the encoded 2D tile should a threshold amount of, for example, bandwidth available. Decoding may be likewise implemented.

Figure 20:
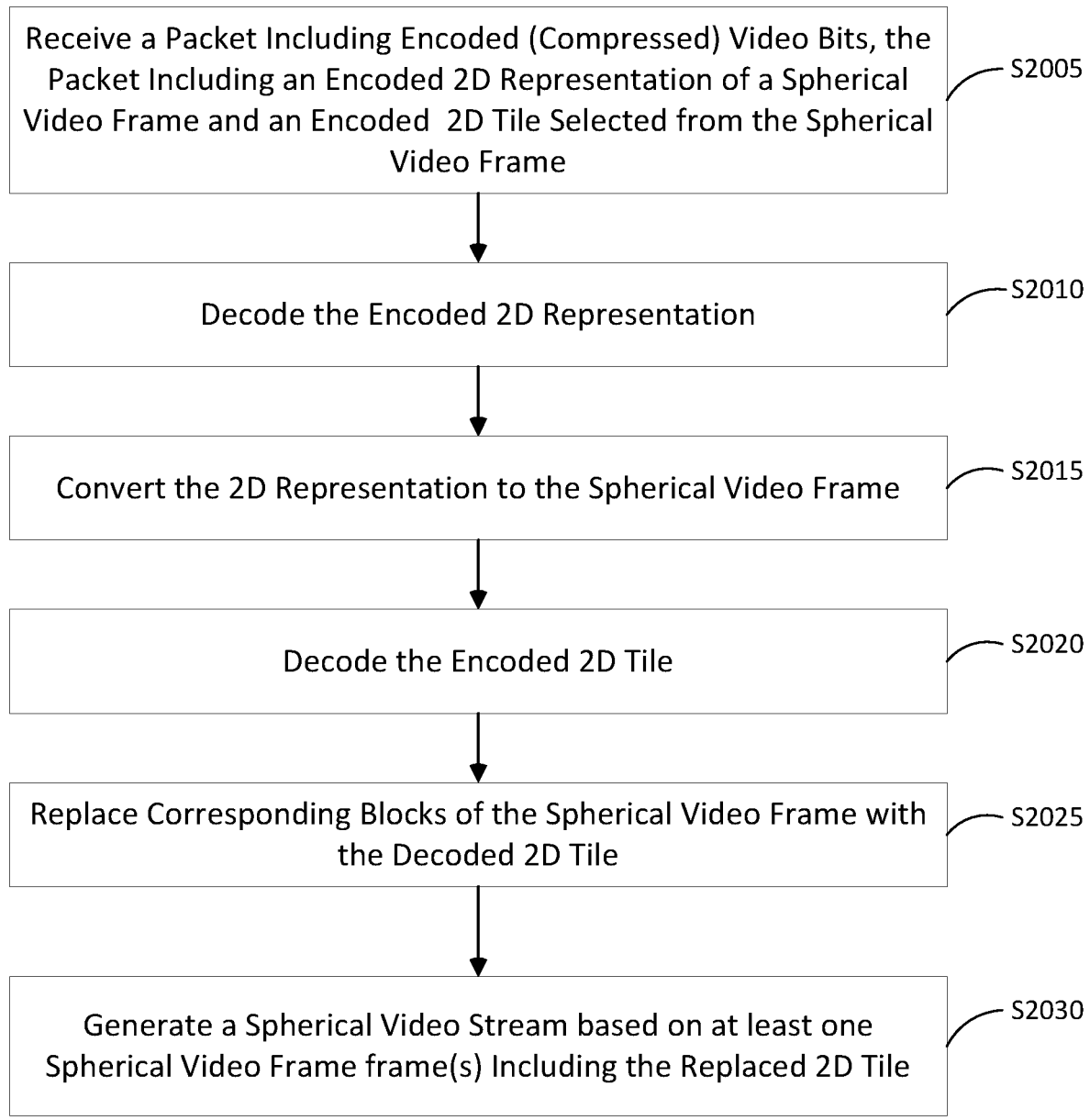
FIG. 20 illustrates a method for decoding streaming spherical video according to at least one example embodiment.

FIG. 20 illustrates a method for decoding streaming spherical video according to at least one example embodiment. As shown in FIG. 20, in step S2005 a packet including encoded (compressed) video bits is received, the packet includes an encoded 2D representation of a spherical video frame and an encoded 2D tile selected from the spherical video frame. For example, the packet may include compressed video bits 10A. The packet may include the encoded 2D representation of the spherical video frame and the encoded tile (or plurality of tiles). The packet may include a header for transmission. The header may include, amongst other things, the information indicating the mode or scheme use in intra-frame coding by the encoder. The header may include information indicating parameters used to convert a frame of the spherical video frame to a 2D rectangular representation. The header may include information indicating parameters used to achieve the QoS of the encoded 2D rectangular representation and of the encoded tile. As discussed above, the QoS of the encoded 2D rectangular representation and the QoS of the encoded 2D tile can be different. For example, the QoS of the encoded 2D rectangular representation may be lower than the QoS of the encoded 2D tile.

In step S2010 the encoded 2D representation is decoded. For example, a video decoder (e.g., decoder 175) entropy decodes the encoded 2D representation. For example, the compressed video bits can be decoded by entropy decoding using, for example, Context Adaptive Binary Arithmetic Decoding to produce a set of quantized transform coefficients. The video decoder de-quantizes the transform coefficients given by the entropy decoded bits. For example, the entropy decoded video bits can be de-quantized by mapping values within a relatively small range to values in a relatively large range (e.g. opposite of the quantization mapping described above). Further, the video decoder inverse transforms the video bits using an indicated (e.g., in the header) transform (e.g., a KLT, a SVD, a DCT or an ADST). The video decoder can filter the reconstructed pixel in the video frame. For example, a loop filter can be applied to the reconstructed block to reduce blocking artifacts. For example, a deblocking filter can be applied to the reconstructed block to reduce blocking distortion.

In step S2015 convert the 2D representation is converted to the spherical video frame. For example, the decoded 2D representation can be converted to a spherical video frame (or image). For example, the 2D representation can be converted using the inverse of the technique described above with regard to mapping a spherical frame (or image) to a 2D representation of the spherical frame (or image).

In step S2020 the encoded 2D tile is decoded. For example, a video decoder (e.g., decoder 1420) entropy decodes the encoded 2D tile. For example, the compressed video bits can be decoded by entropy decoding using, for example, Context Adaptive Binary Arithmetic Decoding to produce a set of quantized transform coefficients. The video decoder de-quantizes the transform coefficients given by the entropy decoded bits. For example, the entropy decoded video bits can be de-quantized by mapping values within a relatively small range to values in a relatively large range (e.g. opposite of the quantization mapping described above). Further, the video decoder inverse transforms the video bits using an indicated (e.g., in the header) transform (e.g., a KLT, a SVD, a DCT or an ADST). The video decoder can filter the reconstructed pixel in the video frame. For example, a loop filter can be applied to the reconstructed block to reduce blocking artifacts. For example, a deblocking filter can be applied to the reconstructed block to reduce blocking distortion.

In step S2025 corresponding blocks of the spherical video frame are replaced with the decoded 2D tile. For example, tile replacement module 1430 may be configured to replace the corresponding blocks (or pixels or macro-block) in the spherical video frame with the pixels of the decoded tile. The replacement may be a pixel by pixel or block by block replacement of pixels or blocks in the decoded and converted spherical video frame with pixels or blocks of the decoded 2D tile. In other words, a portion of data stored in a memory (e.g., a video queue) associated with the spherical video frame is replaced by data representing pixels or blocks of the 2D tile. As discussed above, the 2D tile can be encoded with a higher QoS than the 2D representation of the spherical video frame. Accordingly the resultant spherical video can have higher quality image (or portion of the spherical video) in the view, perspective or view perspective of the watcher of the spherical video as compared to the image(s) (or portion of the spherical video) that is not in (or outside) the view, perspective or view perspective of the watcher.

In step S2030 a spherical video stream is generated based on at least one spherical video frame frame(s) including the replaced 2D tile. For example, at least one video frame of reconstructed converted pixels of the spherical video, including the portions replaced by the 2D tile, may be organized in a sequence to form a spherical video stream. As discussed above, the tile was encoded with a higher QoS than the 2D rectangular representation of the spherical video frame. Accordingly, the generating of the spherical video stream including the replacing with the 2D tile may result in the visible portion of the spherical video stream being of a higher quality than the non-visible portion of the spherical video stream during a playback of the spherical video stream.

Figure 21B:
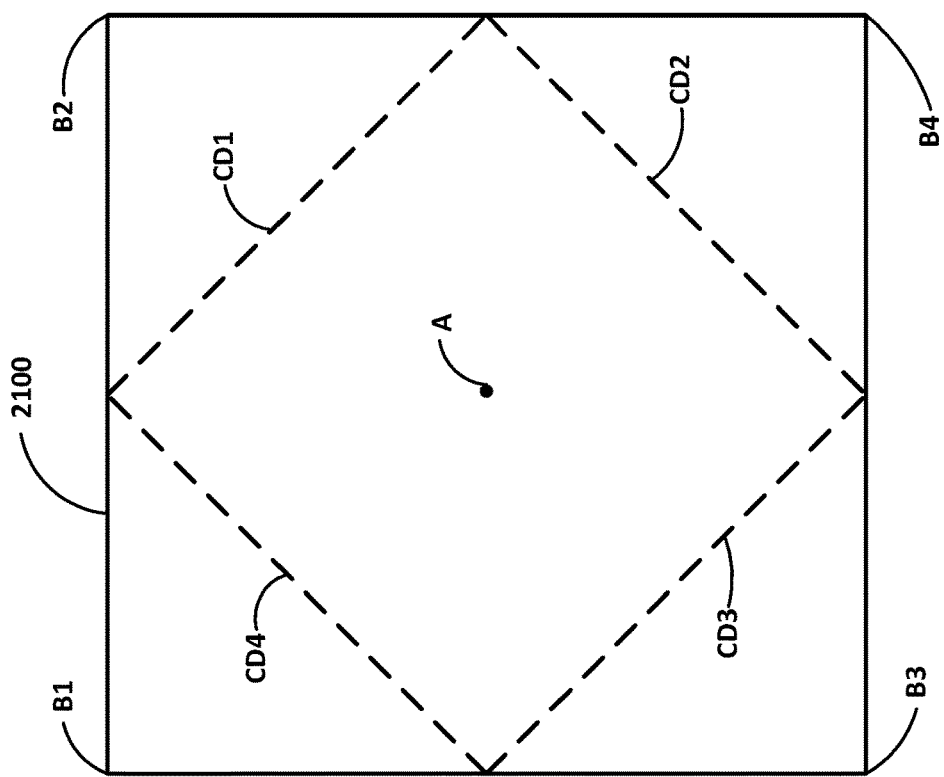
FIGS. 21B and 21C illustrate a block diagram of a 2D square representation of a spherical video frame(s)/block(s) or image/block(s) according to at least one example embodiment.
Figure 21A:
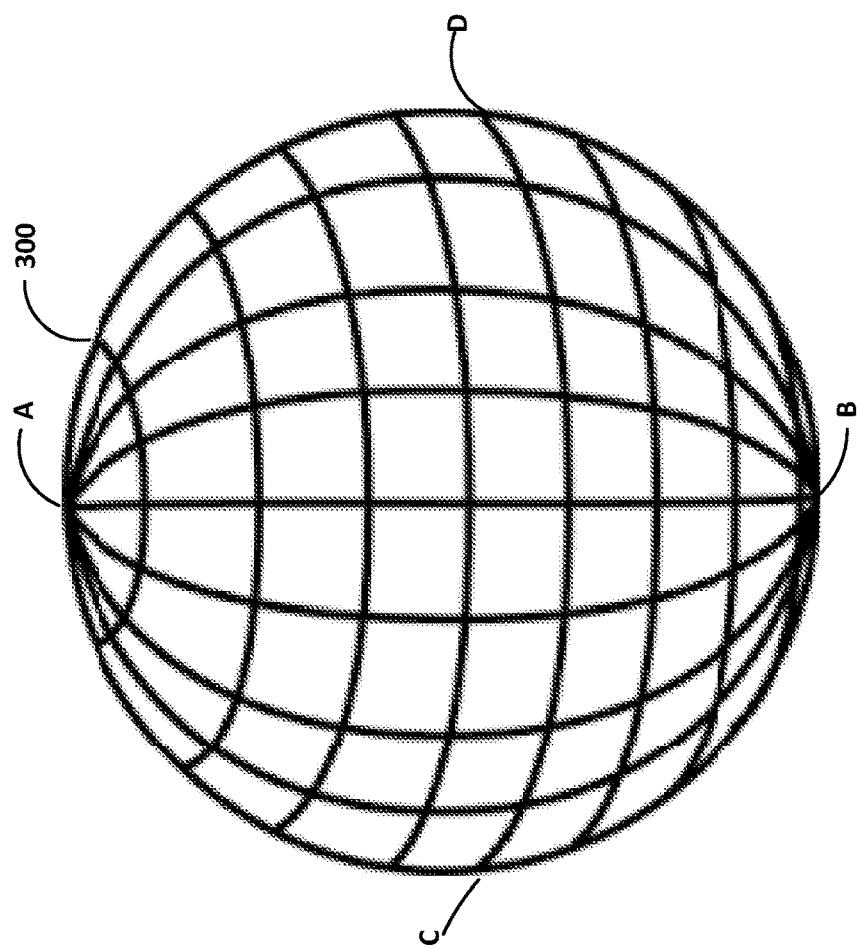
FIG. 21A illustrates a spherical image according to at least one example embodiment.

FIG. 21A further illustrates the sphere 300 as a spherical image according to at least one example embodiment. According to an example implementation, a line between points C and D can be equidistant between points or poles A and B. In other words, line between points C and D can be termed an equator (e.g., the sphere 300 as a globe) of the sphere 300. The line between points C and D can be projected onto a 2D shape (e.g., a square or rectangle).

Figure 21C:
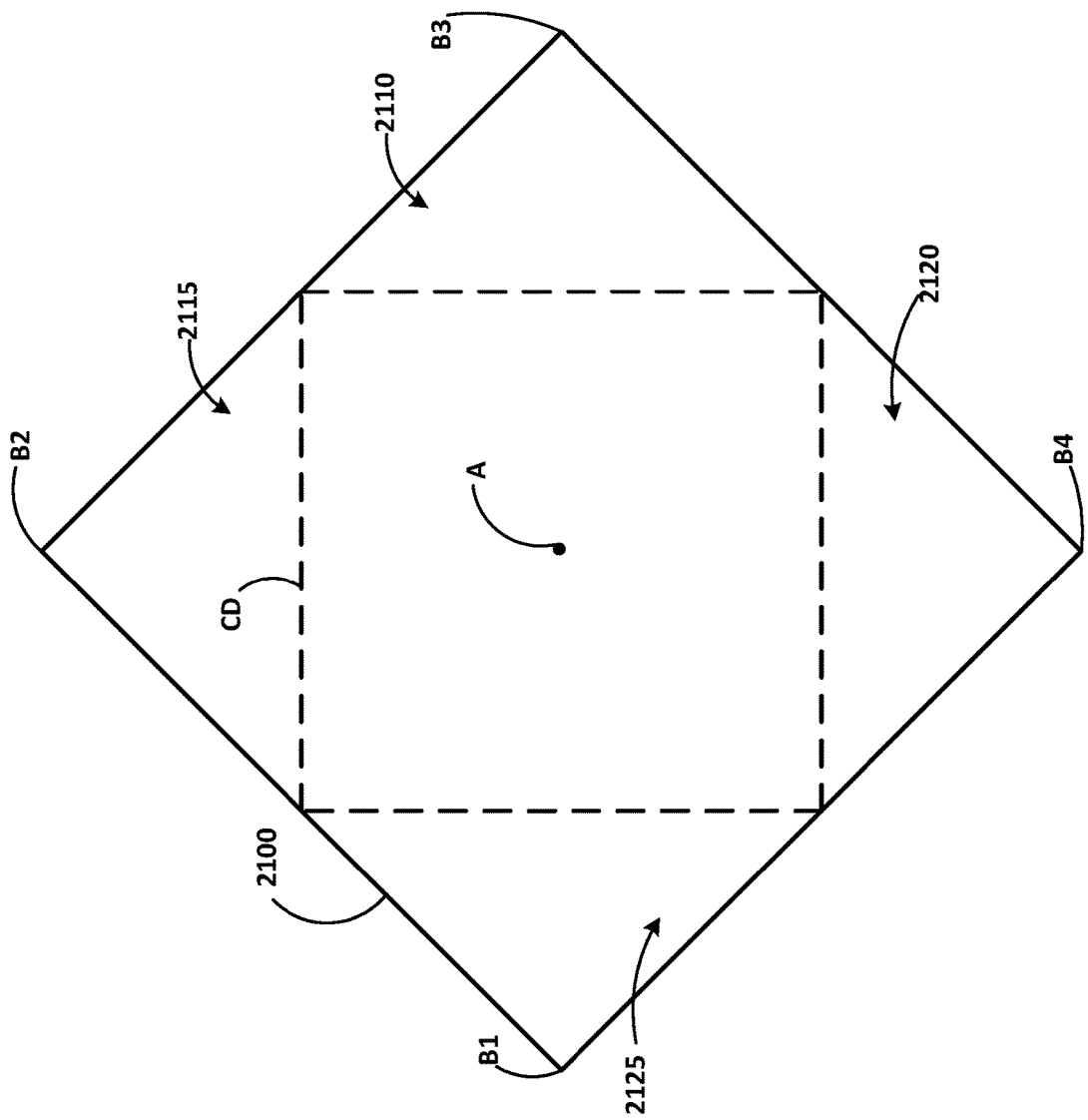

FIGS. 21B and 21C illustrate a block diagram of a 2D square representation of a spherical video frame(s)/block(s) or image/block(s) according to at least one example embodiment. In the example of FIG. 4B, Pole A is mapped or projected to the center of square 2100. Pole B is mapped or projected to the corners of square 2100 and is illustrated as B1, B2, B3 and B4. The line CD1, CD2, CD3, CD4 between points C and D (or the equator) is shown as a rotated square (dashed lines) with respect to square 2100. The corners of line CD1, CD2, CD3, CD4 intersect the sides of the square 2100 equidistant from the corners B1, B2, B3, and B4. The projection of sphere 300 as a spherical video frame or image onto square 2100 can be implemented using a Peirce quincuncial projection algorithm. It may be desirable to encode the 2D representation of the spherical video frame or image as a rectangle. In other words, many encoding standards are configured to encode a video frame or image that is a rectangle (e.g., a 2:1 side ratio). Therefore, in an example implementation, the 2D square representation of the spherical video frame or image can be mapped to a 2D rectangular representation of the spherical video frame or image. In some example implementations, additional processing can be performed to resize the 2D rectangular representation based on a desired encoding scheme.

Figure 21D:
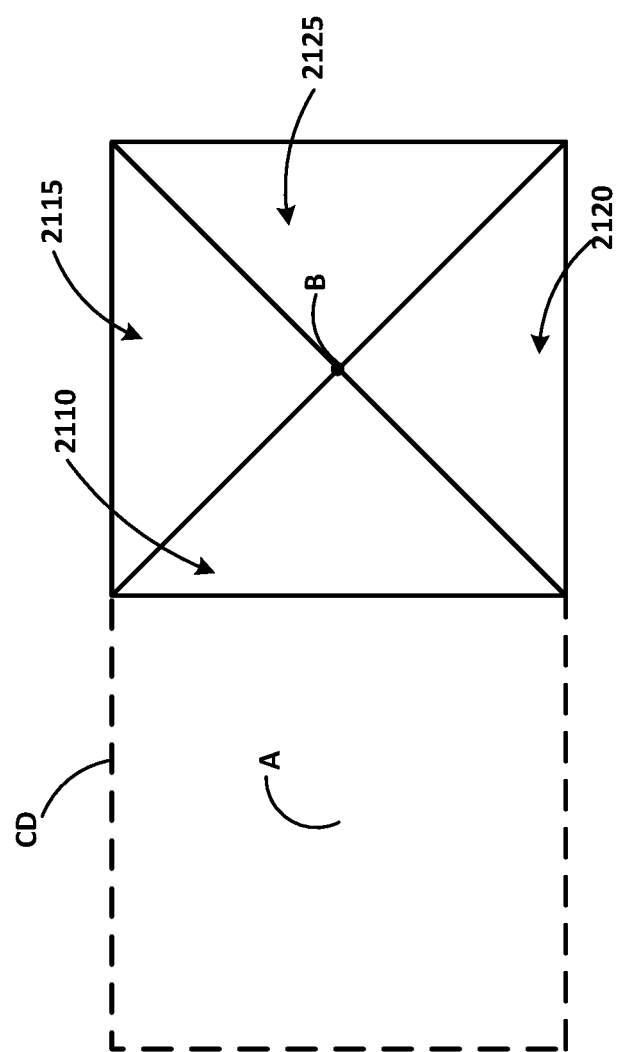
FIG. 21D illustrates a block diagram of a 2D rectangle representation of a spherical video frame(s)/block(s) or image/block(s) according to at least one example embodiment.

FIG. 21C illustrates the projection of sphere 300 as a spherical video frame or image onto square 2100 with square 2100 rotated 45 degrees counterclockwise (square 2100 could be rotated 45 degrees clockwise as well. Note, line CD1, CD2, CD3, CD4 between points C and D shown as a square (dashed lines) rotated with square 2100. In FIG. 21D, the square 2100 is illustrated after being mapped to a rectangle. The rectangle (as a second 2D representation) can be formed of two squares with equal length sides based on the square 2100 (as a first 2D representation). The two squares can be generated from the square 2100 (as the first 2D representation). A first square can have corners that intersect each side of the square 2100 equidistant from the corners of the first two dimensional representation. A second square can be based on four triangles each having a side in contact with a different side of an inner circle of the frame of the spherical video. The second two dimensional representation can be based on the first square and the second square.

As shown in FIG. 21D, triangle 2110 remains in the same position as in FIG. 21C, triangle 2115 has been rotated clockwise, triangle 2120 has been rotated counterclockwise, and triangle 2125 has been rotated 180 degrees and extended to the right. Triangles 2110, 2115, 2120 and 2125 together make a square that is the same size as the square represented by dotted line CD1, CD2, CD3, CD4. In addition pole B is positioned in the center of the square formed by triangles 2110, 2115, 2120 and 2125. Together the square represented by dotted line CD1, CD2, CD3, CD4 and the square formed by triangles 2110, 2115, 2120 and 2125 form a rectangle with a length twice as long as a side. The square represented by dotted line CD1, CD2, CD3, CD4 and the square formed by triangles 2110, 2115, 2120 and 2125 are a 2D rectangular representation of the spherical video frame or image (e.g., of sphere 300).

Figure 21E:
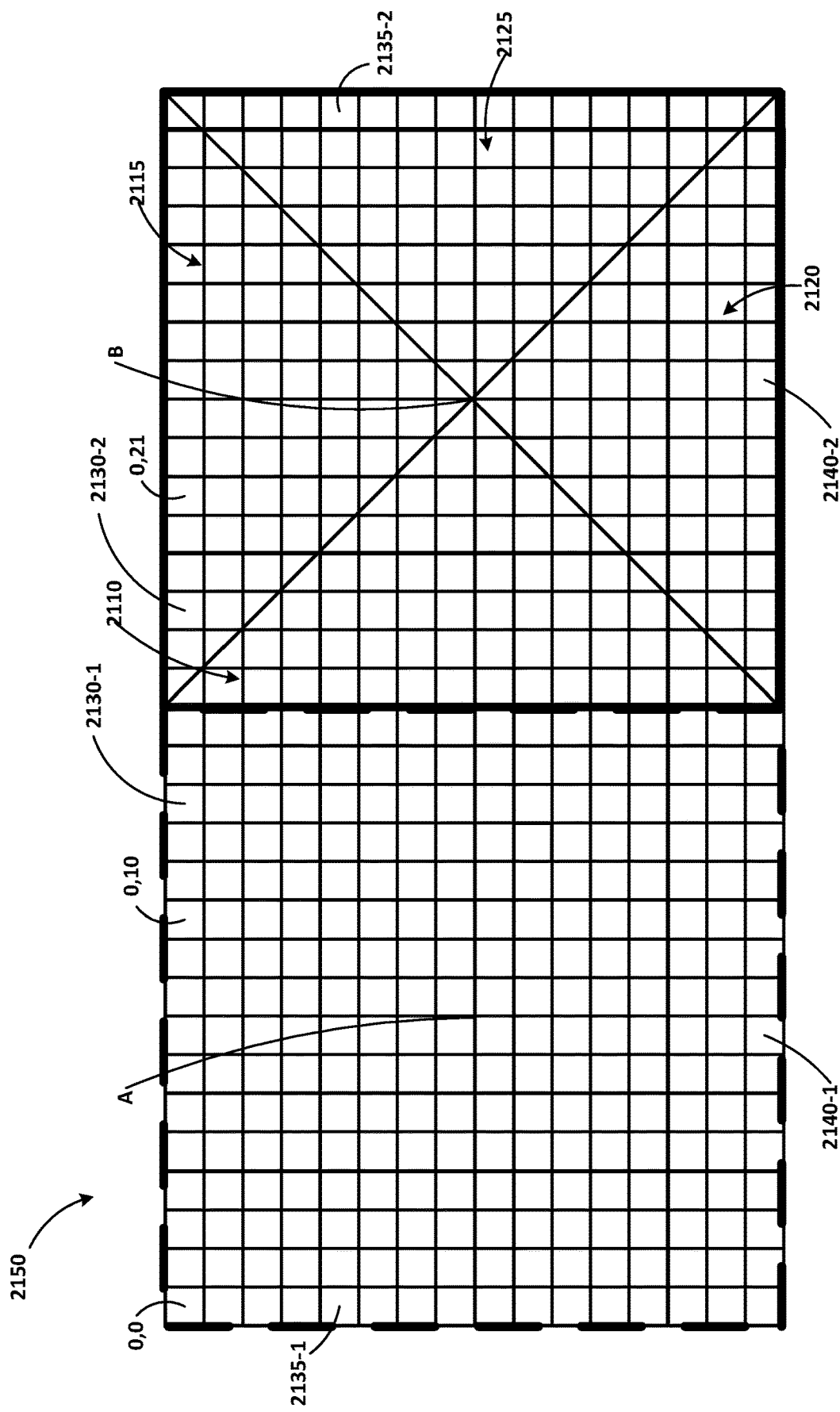
FIG. 21E illustrates a look up table (LUT) according to at least one example embodiment.

FIG. 21D illustrates a block diagram of a 2D rectangle representation of a spherical video frame(s)/block(s) or image/block(s) according to at least one example embodiment. The 2D rectangle representation of a spherical video frame or image is shown as a decomposed image of a C×R matrix of N×N blocks. The C×R matrix is shown with a 2:1 ratio. The N×N blocks may be 2×2, 4×4, 8×8, 8×16, 16×16, and the like blocks (or blocks of pixels). Blocks 2130-1, 2130-2, 2135-1, 2135-2, 2140-1 and 2140-2 are shown in FIG. 21E as boundary blocks or on the boundary of the 2D rectangle representation. However, a spherical image is continuous and has no boundaries. Accordingly, the 2D rectangle representation does as well.

As discussed above, a spherical image is an image that is continuous in all directions. Accordingly, if the spherical image were to be decomposed into a plurality of blocks, the plurality of blocks would be contiguous over the spherical image. In other words, there are no edges or boundaries as in a 2D image. In example implementations, an adjacent end block may be a contiguous block to a block on a boundary of the 2D representation. In the example implementation shown in FIG. 21E, block 2130-1 may be an adjacent end block for 2130-2, block 2135-1 may be an adjacent end block for 2135-2, and block 2140-1 may be an adjacent end block for 2140-2. The opposite may also be the case. In other words, block 2130-2 may be an adjacent end block for 2130-1, block 2135-2 may be an adjacent end block for 2135-1, and block 2140-2 may be an adjacent end block for 2140-2.

Therefore, in any encoding scheme where an adjacent block is used, a block on a boundary of the 2D rectangle representation may have a corresponding adjacent end block located elsewhere in the 2D rectangle representation. FIG. 21F illustrates a look up table (LUT) according to at least one example embodiment. The LUT 2145 may store references between corresponding boundary blocks and adjacent end blocks for the 2D rectangle representation. The LUT 2145 is shown as storing block number indicators as, for example, 2130-1 and 2130-2 corresponding to each other. However, LUT 2145 may store correspondences by x,y coordinates. For example, if the upper left hand corner is 0,0, block 0,10 may correspond (e.g., may be an adjacent end block for) to block 0,21.

FIGS. 22-26B are flowcharts of methods according to example embodiments. The steps described with regard to FIGS. 22-26B may be performed due to the execution of software code stored in a memory (e.g., at least one memory 110) associated with an apparatus (e.g., as shown in FIG. 1) and executed by at least one processor (e.g., at least one processor 105) associated with the apparatus. However, alternative embodiments are contemplated such as a system embodied as a special purpose processor. Although the methods described below are described as being executed by a processor, the methods (or portions thereof) are not necessarily executed by a same processor. In other words, at least one processor may execute the methods described below with regard to FIGS. 22-26B.

Figure 22:
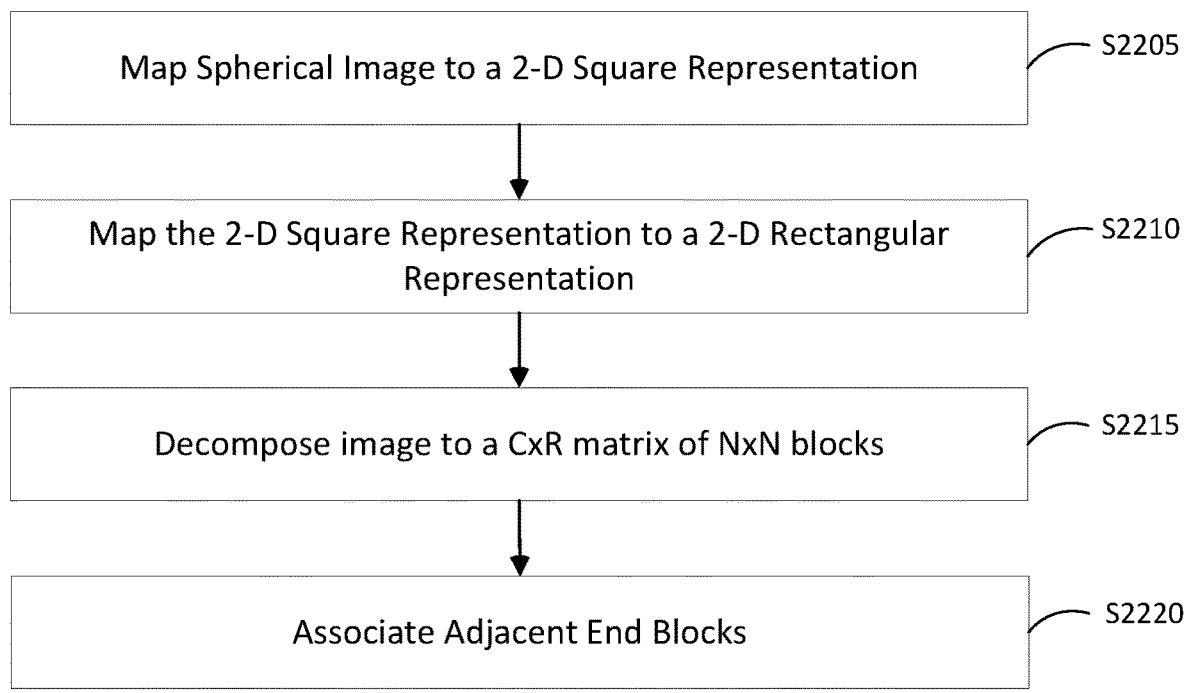
FIG. 22 is a flowchart of a method for mapping a spherical frame/image to a 2D representation of the spherical frame/image according to at least one example embodiment.

FIG. 22 is a flowchart of a method for mapping a spherical image to a 2D representation of the spherical image according to at least one example embodiment. As shown in FIG. 22, in step S2205 a spherical image is mapped to a 2D square representation. For example, FIG. 21B illustrates the sphere 300 illustrated in FIG. 21A as a 2D square representation. The mapping can include mapping the image or a frame of a spherical video to a 2D representation based on a spherical to square projection. In this example, the 2D representation can be a square. The sphere 300 can be projected onto the 2D square representation using a projection algorithm. In one example implementation, the projection algorithm can be a Peirce quincuncial projection algorithm.

The Peirce quincuncial projection algorithm states a point P on the Earth's surface, a distance p from the North Pole with longitude θ and latitude λ is first mapped to a point (p, θ) of the plane through the equator, viewed as the complex plane with coordinate w; this w coordinate is then mapped to another point (x, y) of the complex plane (given the coordinate z) by an elliptic function of the first kind. Using Gudermann's notation for Jacobi's elliptic functions, the relationships are:

$$\tan\left(\frac{p}{2}\right)e^{i\theta} = cn\left(z, \frac{1}{2}\right) \text{ where,} \quad (1)$$

$$w = pe^{i\theta} \text{ and } z = x + iy$$

Other square and/or rectangular projections are within the scope of this disclosure.

In step S2210 the 2D square representation is mapped to a 2-D rectangular representation. The mapping can include mapping the 2D square representation to another (or second) 2D representation. The another 2D representation can be a rectangle. For example, FIG. 21B illustrates 2D square representation. In an example implementation, the 2D square representation can be rotated clockwise or counterclockwise (e.g., as in FIG. 21C). Triangles formed by the intersection of lines (forming a square) based on the equator of the sphere with the sides of the 2D square representation and equidistant from the corners of the 2D square representation can be repositioned to form another square that is the same size as the based on the equator of the sphere. Merging the square based on the triangles and the square based on the equator can form a rectangle with as side ratio of 2:1.

In step S2215 the 2-D rectangular representation is decomposed to a C×R matrix of N×N blocks. For example, as shown in FIG. 21E, the 2D rectangular representation 2150 is a 32×16 matrix of N×N blocks. The N×N blocks may be 2×2, 4×4, 8×8, 8×16, 16×16, and the like blocks (or blocks of pixels).

Accordingly, in step S2220 adjacent end blocks are associated. For example, as discussed above, blocks 2130-1, 2130-2, 2135-1, 2135-2, 2140-1 and 2140-2 are shown as boundary blocks or on the boundary of the 2D rectangle representation. However, a spherical image is continuous and has no boundaries. Accordingly, the 2D rectangle representation does as well. In the example implementation shown in FIG. 21E, block 2130-1 may be an adjacent end block for 2130-2, block 2135-1 may be an adjacent end block for 2135-2, and block 2140-1 may be an adjacent end block for 2140-2. The opposite may also be the case. In other words, block 2130-2 may be an adjacent end block for 2130-1, block 2135-2 may be an adjacent end block for 2135-1, and block 2140-2 may be an adjacent end block for 2140-1. Therefore, the adjacent end blocks may be associated and stored in a lookup table (e.g., lookup table 2145 as shown in FIG. 21C).

In the example implementation shown in FIG. 21E, the rectangular mapping gives an aspect ratio of 2×1 (equivalently 16×8). Encoding standards may utilize other aspect ratios. For example, At least one encoding standard may use an aspect ratio of 16×9. Accordingly, the 2D rectangular representation 2150 can be resized (e.g., vertically) to an aspect ratio of 16×9.

Exploiting spatial redundancy between samples within a frame (e.g., frame, image, slice, group of macroblocks) is referred to as intra-prediction. Exploiting spatial redundancy for samples between frames (e.g., frame, image, slice, group of macroblocks) is referred to as inter-prediction. In intra-prediction a prediction block can be generated in response to previously encoded and reconstructed blocks in the same frame (or image). In inter-prediction a prediction block can be generated in response to previously encoded and reconstructed blocks in a different (e.g., sequentially previous in time or a base/template) frame. The prediction block is subtracted from the current block prior to encoding. For example, with luminance (luma) samples, the prediction block can be formed for each N×N (e.g., 4×4) sub-block or for a N×N (e.g., 16×16) macroblock. During encoding and/or decoding, the blocks or macroblocks can be sequentially coded within each frame or slice.

In intra-prediction, a coding pass can include sequentially coding blocks along a row (e.g., top to bottom), a column (e.g., left to right) or in a zig-zag pattern (e.g., starting from the upper left corner). In an intra-prediction coding pass, the blocks which are located above and to the left of the current block within the frame (or image), have been previously encoded and reconstructed. Accordingly, the blocks which are located above and to the left of the current block can be available to the encoder/decoder as a prediction reference. However, if the current block is in the upper left corner of a frame, then no previous blocks have been coded in the frame. Further, if the current block is in the upper row of a frame, then no neighbors above the current block have been coded. Still further, if the current block is in the left column of a frame, then no neighbors on the same row as the current block have been coded.

Figure 23:
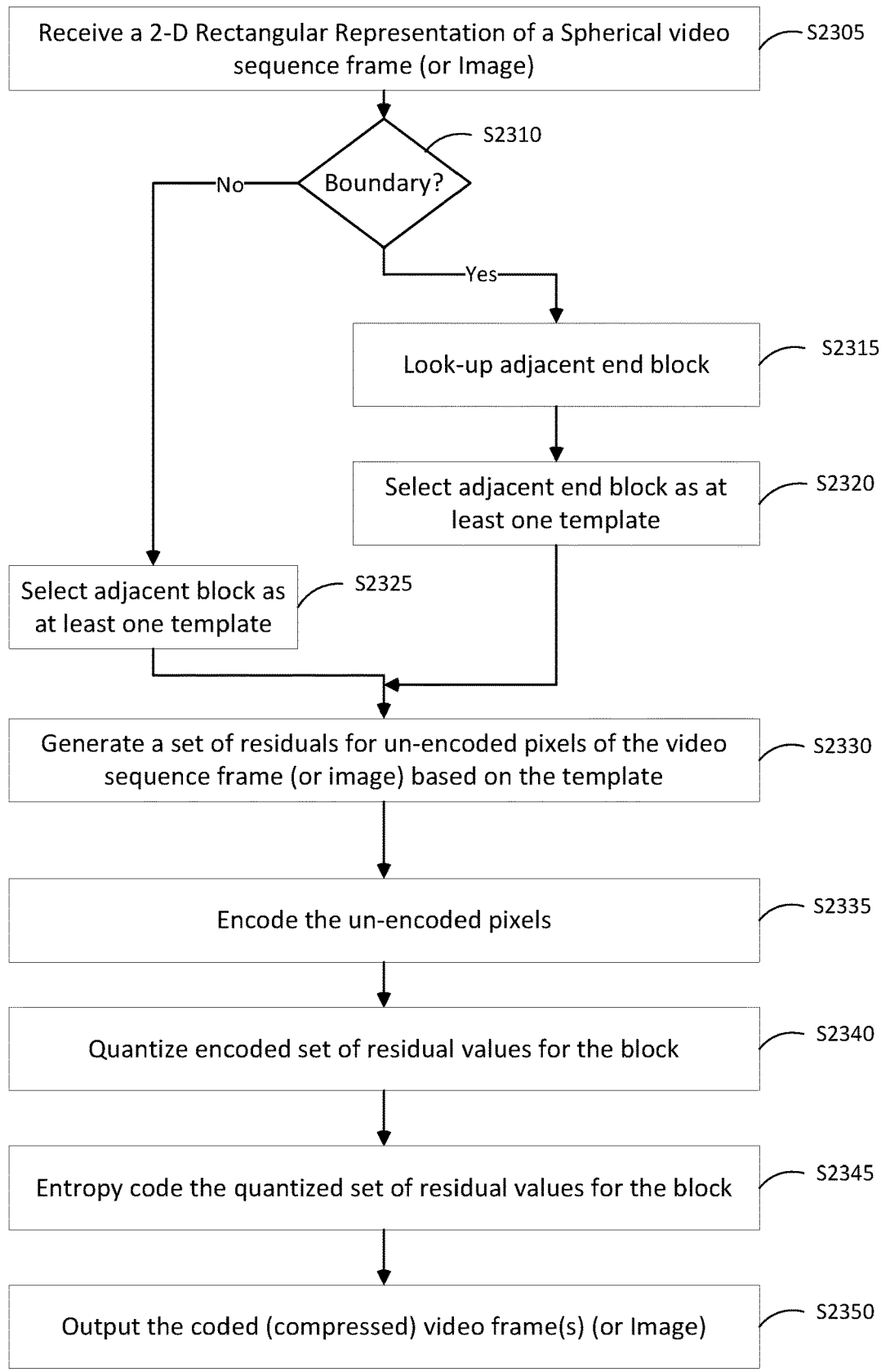
FIGS. 23 and 24 are flowcharts of a method for encoding/decoding a video frame according to at least one example embodiment.

FIG. 23 is a flowchart of a method for encoding a video frame according to at least one example embodiment. As shown in FIG. 23, in step S2305 a controller (e.g., controller 120) receives a 2-D rectangular representation of a spherical video sequence frame (or image) to encode. For example, the video encoder may receive a spherical video stream input 5, break the stream into a plurality of video frames, convert each frame to a 2-D rectangular representation (as discussed above) and select the first video frame. The controller may also set initial configurations. For example, the controller may set an intra-frame coding scheme or mode.

In step S2310 whether or not the current block is at a frame (or image) boundary is determined. For example, in one example implementation, a C×R matrix of N×N blocks includes pixels in each block. Accordingly, blocks in row 0, column 0, row R-1 and column C-1 include pixels of the spherical image. Therefore, if, during a scan, the C×R matrix of blocks includes pixels in each block and the column/row=0 or the column/row=C-1/R-1, the block is at a boundary. If the block is at a boundary, processing moves to step S2315. Otherwise, processing continues to step S2325.

In step S2315 an adjacent end block is looked-up (or identified or searched). For example, in one example implementation, a C×R matrix of blocks may have an associated LUT mapping boundary blocks to a corresponding adjacent end block. In this example column and row adjacent end blocks can be looked-up in a look-up table (e.g., LUT 2145).

In step S2320 an adjacent end block is selected as at least one template. For example, as discussed above, during intra-prediction a prediction block can be generated in response to previously encoded and reconstructed blocks in the same frame (or image). The previously encoded and reconstructed block(s) may be selected from adjacent blocks (e.g., a block that is above and/or to the left of the block to be encoded) as a template. In this case, the block to be encoded is on the end of a column and/or row in the C×R matrix. Accordingly, at least one of the adjacent blocks to be selected as a template can be one of the looked-up adjacent end blocks.

In step S2325 an adjacent block is selected as at least one template. For example, the previously encoded and reconstructed block(s) may be selected from adjacent blocks (e.g., a block that is above and/or to the left of the block to be encoded) as a template. In this case, the block to be encoded is not on the end of a column and/or row in the C×R matrix. Accordingly, at least one of the adjacent blocks to be selected as a template can be selected from a block above and/or to the left of the block to be encoded.

In at least one example embodiment, more than one adjacent block can be selected for use as a template. For example, an adjacent block and a block adjacent (in the same direction) to the adjacent block can be selected (e.g., two blocks). The selected blocks can then be averaged to form a template block. In this example, it is possible for the template to be based on an adjacent block and an adjacent end block.

In step S2330 a set of residuals for un-encoded pixels of the video sequence frame (or image) is generated based on the template. For example, at least one value associated with each pixel may be subtracted from a corresponding value associated with a corresponding block of the selected template.

In step S2335 the un-encoded pixels are encoded. For example, the generated pixels may be transformed (encoded or compressed) into transform coefficients using a configured transform (e.g., a KLT, a SVD, a DCT or an ADST).

In step S2340 the encoder quantizes the encoded set of residual values for the block. For example, the controller 120 may instruct (or invoke) the quantization block 220 to quantize coded motion vectors and the coded residual errors, through any reasonably suitable quantization techniques. In addition, at step S2345, the controller 120 may instruct the entropy coding block 220 to, for example, assign codes to the quantized motion vector codes and residual error codes to match code lengths with the probabilities of the quantized motion vector codes and residual error codes, through any coding technique.

In step S2350 the encoder outputs the coded (compressed) video frame(s). For example, the controller 120 may output the coded video (e.g., as coded video frames) to one or more output devices. The controller 120 may output the coded video as a single motion vector and a single set of predictor values (e.g., residual errors) for the macroblock. The controller 120 may output information indicating the mode or scheme use in intra-frame coding by the encoder. For example, the coded (compressed) video frame(s) may include a header for transmission. The header may include, amongst other things, the information indicating the mode or scheme use in intra-frame coding by the encoder. The intra-frame coding scheme or mode may be communicated with the coded (compressed) video frame(s) (e.g., in the header). The communicated intra-frame coding scheme or mode may indicate parameters used to convert each frame to a 2-D rectangular representation (e.g., a Peirce quincuncial projection as well as any equations or algorithms used). The communicated intra-frame coding scheme or mode may be numeric based (e.g., mode 101 may indicate Peirce quincuncial projection).

Figure 24:
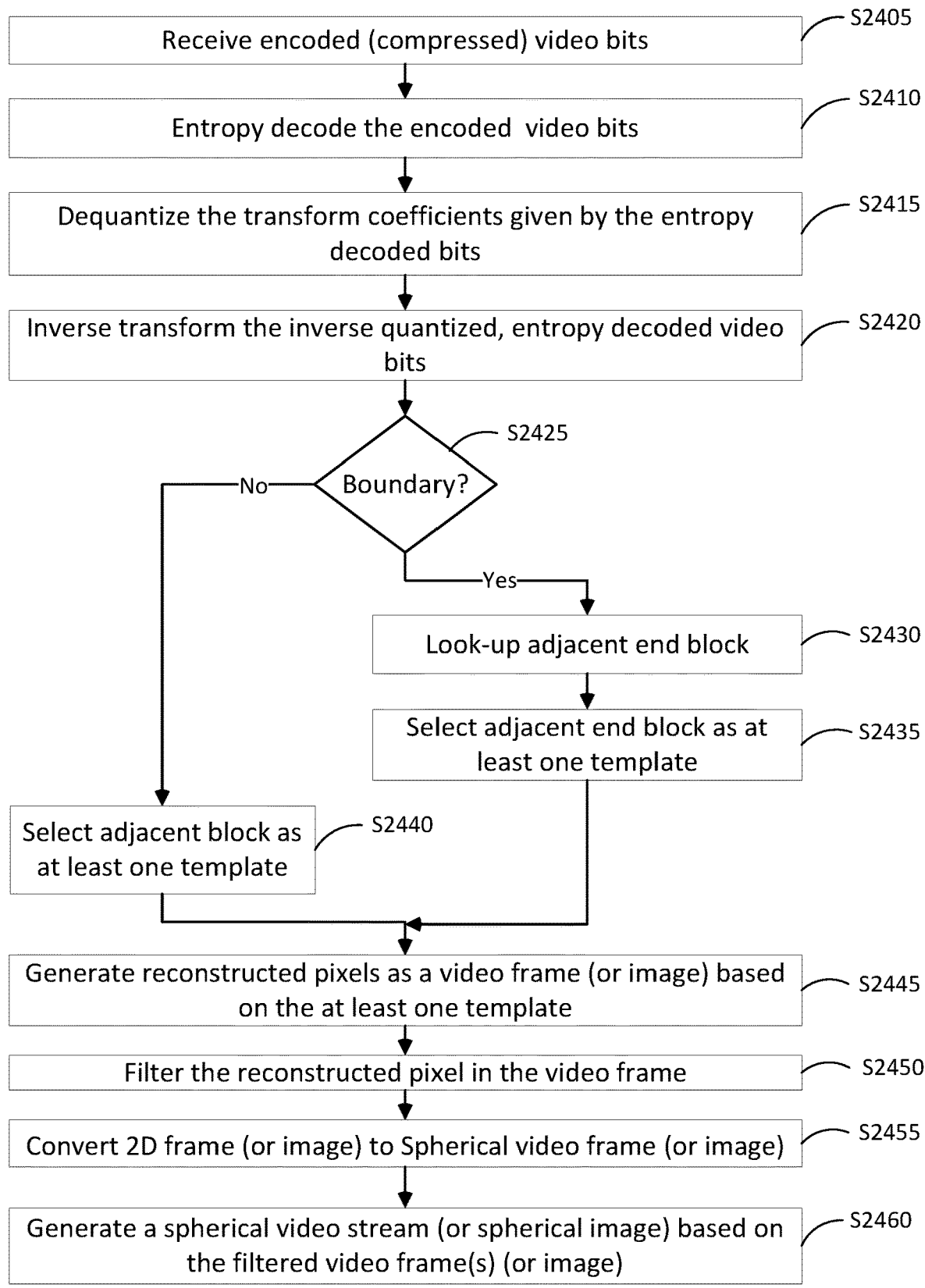

FIG. 24 is a flowchart of a method for decoding a video frame according to at least one example embodiment. As shown in FIG. 24, in step S2405 a video decoder (e.g., video decoder 175) receives encoded (compressed) video bits (e.g., compressed video bits 10). For example, the encoded (compressed) video bits may be a previously encode (e.g., by video encoder 125) real time video spherical stream (e.g., a concert or sporting event recording) received via communication network (e.g., Internet or Intranet). For example, the video stream may also be a previously recorded video (e.g., a movie or a video recorder recording). The coded (compressed) video frame(s) may include a header for transmission. The header may include, amongst other things, the information indicating the mode or scheme use in intra-frame coding by the encoder. For example, the intra-frame coding scheme or mode may indicate parameters used to convert each frame to a 2-D rectangular representation (e.g., indicate a Peirce quincuncial projection as well as any equations or algorithms used).

In step S2410 the video decoder entropy decodes the encoded video bits. For example, the compressed video bits can be decoded by entropy decoding using, for example, Context Adaptive Binary Arithmetic Decoding to produce a set of quantized transform coefficients. In step S2415 the video decoder de-quantizes the transform coefficients given by the entropy decoded bits. For example, the entropy decoded video bits can be de-quantized by mapping values within a relatively small range to values in a relatively large range (e.g. opposite of the quantization mapping described above). Further, in step S2420 the video decoder inverse transforms the video bits using an indicated (e.g., in the header) transform (e.g., a KLT, a SVD, a DCT or an ADST).

In step S2425 whether or not the current block is at a frame (or image) boundary is determined. For example, in one example implementation, a C×R matrix of N×N blocks includes pixels in each block. Accordingly, blocks in row 0, column 0, row R-1 and column C-1 include pixels of the spherical image. Therefore, if, during a scan, the C×R matrix of blocks includes pixels in each block and the column/row=0 or the column/row=C-1/R-1, the block is at a boundary. If the block is at a boundary, processing moves to step S2430. Otherwise, processing continues to step S2440.

In step S2430 an adjacent end block is looked-up. For example, in one example implementation, a C×R matrix of blocks may have an associated LUT mapping boundary blocks to a corresponding adjacent end block. In this example column and row adjacent end blocks can be looked-up in a look-up table (e.g., LUT 2145).

In step S2435 an adjacent end block is selected as at least one template. For example, as discussed above, during intra-prediction a prediction block can be generated in response to previously encoded and reconstructed blocks in the same frame (or image). The previously encoded and reconstructed block(s) may be selected from adjacent blocks (e.g., a block that is above and/or to the left of the block to be encoded) as a template. In this case, the block to be encoded is on the end of a column and/or row in the C×R matrix. Accordingly, at least one of the adjacent blocks to be selected as a template can be one of the looked-up adjacent end blocks.

In step S2440 an adjacent block is selected as at least one template. For example, the previously encoded and reconstructed block(s) may be selected from adjacent blocks (e.g., a block that is above and/or to the left of the block to be encoded) as a template. In this case, the block to be encoded is not on the end of a column and/or row in the N×N matrix. Accordingly, at least one of the adjacent blocks to be selected as a template can be selected from a block above and/or to the left of the block to be encoded.

In at least one example embodiment, more than one adjacent block can be selected for use as a template. For example, an adjacent block and a block adjacent (in the same direction) to the adjacent block can be selected (e.g., two blocks). The selected blocks can then be averaged to form a template block. In this example, it is possible for the template to be based on an adjacent block and an adjacent end block.

In step S2445 the video decoder generates reconstructed pixels as a video frame based on the matched template and the decoded video bits. For example, the video decoder may add the residuals (e.g., transformed or decompressed video bits) to the corresponding position in the matched template resulting in a reconstructed pixel.

In step S2450 the video decoder filters the reconstructed pixel in the video frame. For example, a loop filter can be applied to the reconstructed block to reduce blocking artifacts. For example, a deblocking filter (e.g., as described below with regard to FIGS. 26A and 26B) can be applied to the reconstructed block to reduce blocking distortion.

In step S2455 the 2D frame (or image) is converted to a spherical video frame (or image). For example, the 2D frame can be converted using the inverse of the technique described above with regard to mapping a spherical frame (or image) to a 2D representation of the spherical frame (or image). An example technique is described in more detail below with regard to FIG. 8.

In step S2460 the video decoder generates a spherical video stream (or spherical image) based on the video frame(s). For example, at least one video frame of reconstructed converted pixels may be organized in a sequence to form a spherical video stream.

Figure 25:
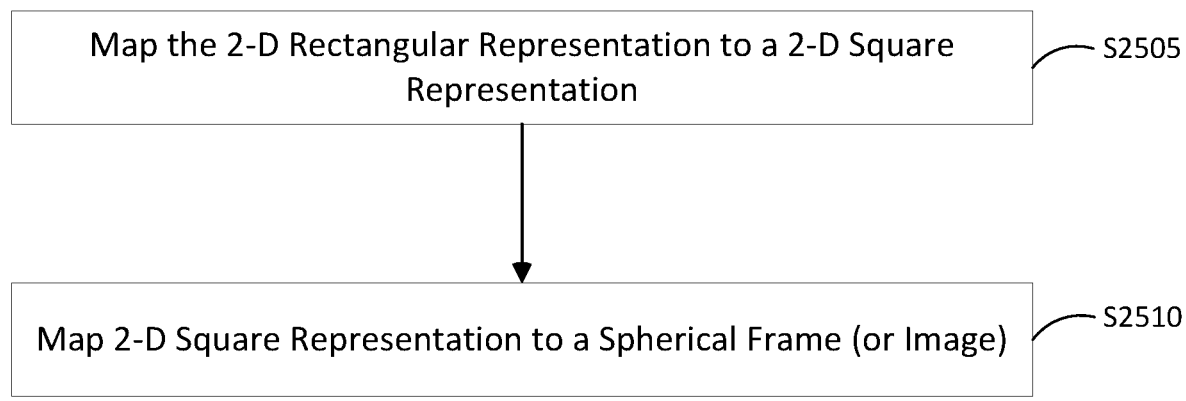
FIG. 25 is a flowchart of a method for converting a 2D representation of a spherical image to a spherical frame/image according to at least one example embodiment.

FIG. 25 is a flowchart of a method for converting a 2D representation of a spherical image to a spherical frame/image according to at least one example embodiment. As shown in FIG. 25, in step S2505 the 2-D rectangular representation is mapped to a 2-D square representation. For example, as shown in FIGS. 21C and 21D, square a square can be mapped to a rectangle formed of two equal sized squares. One of the equal sized squares can be partitioned into four triangles each having a side of the square. Accordingly, an inverse mapping can be performed by repositioning three of four triangles to form a third square as the second two dimensional representation. In an example implementation, triangle 2115 can be rotated counterclockwise, triangle 2120 can be rotated clockwise and triangle 2125 can be rotated 180 degrees. Each of triangles 2115, 2120 and 2125 can be rotated and positioned as shown in FIG. 21C.

In step S2510 the 2D square representation is mapped to a spherical frame (or image). For example, the Peirce quincuncial projection algorithm can be used to convert the 2D square representation to a spherical frame. For example, equation 1 can be used to generate spherical coordinates for pixels in the spherical frame based on the x,y coordinates of corresponding pixels in the 2D square representation.

Figure 26A:
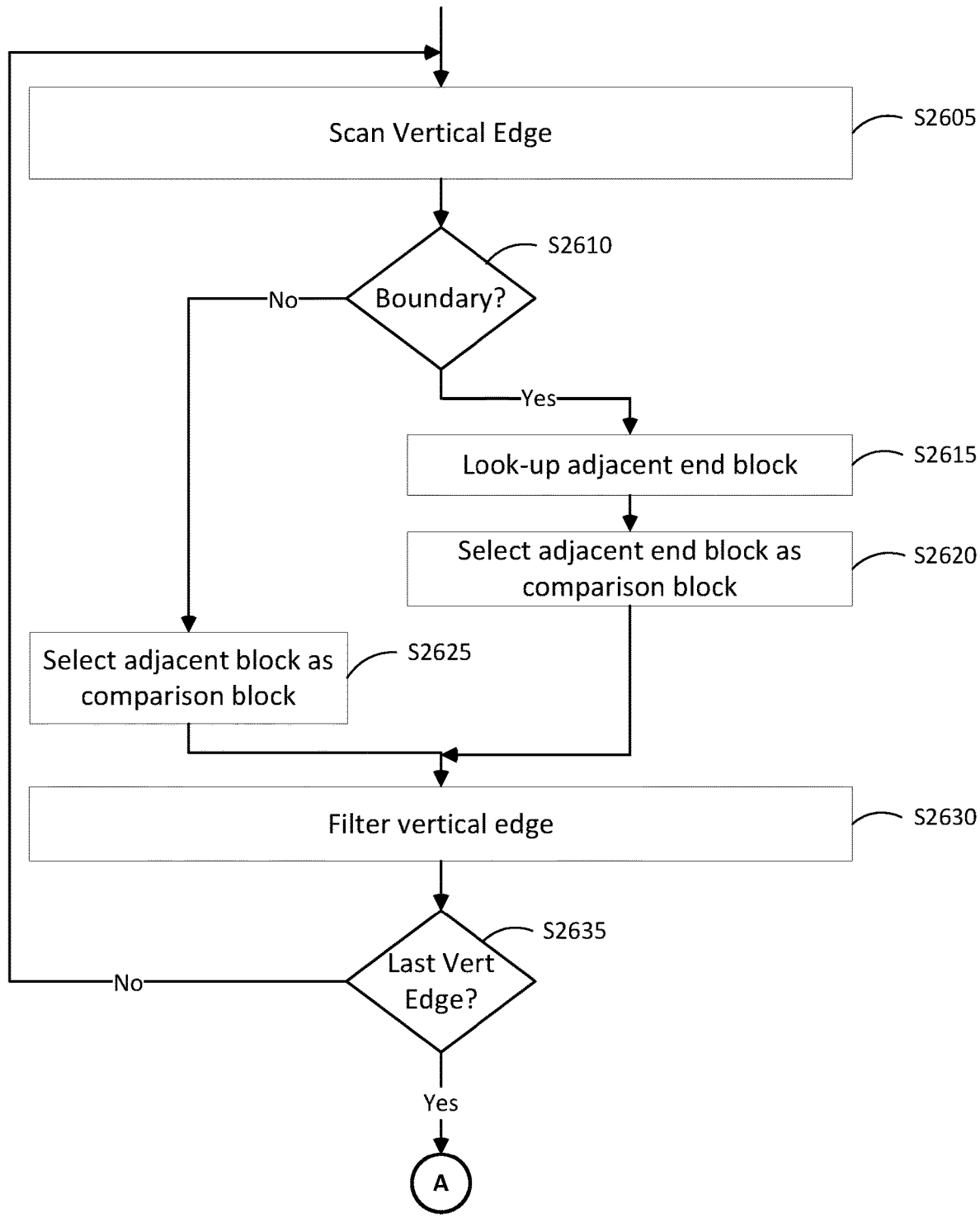
FIGS. 26A and 26B are flowcharts for a method of operating a deblocking filter according to at least one example embodiment.
Figure 26B:
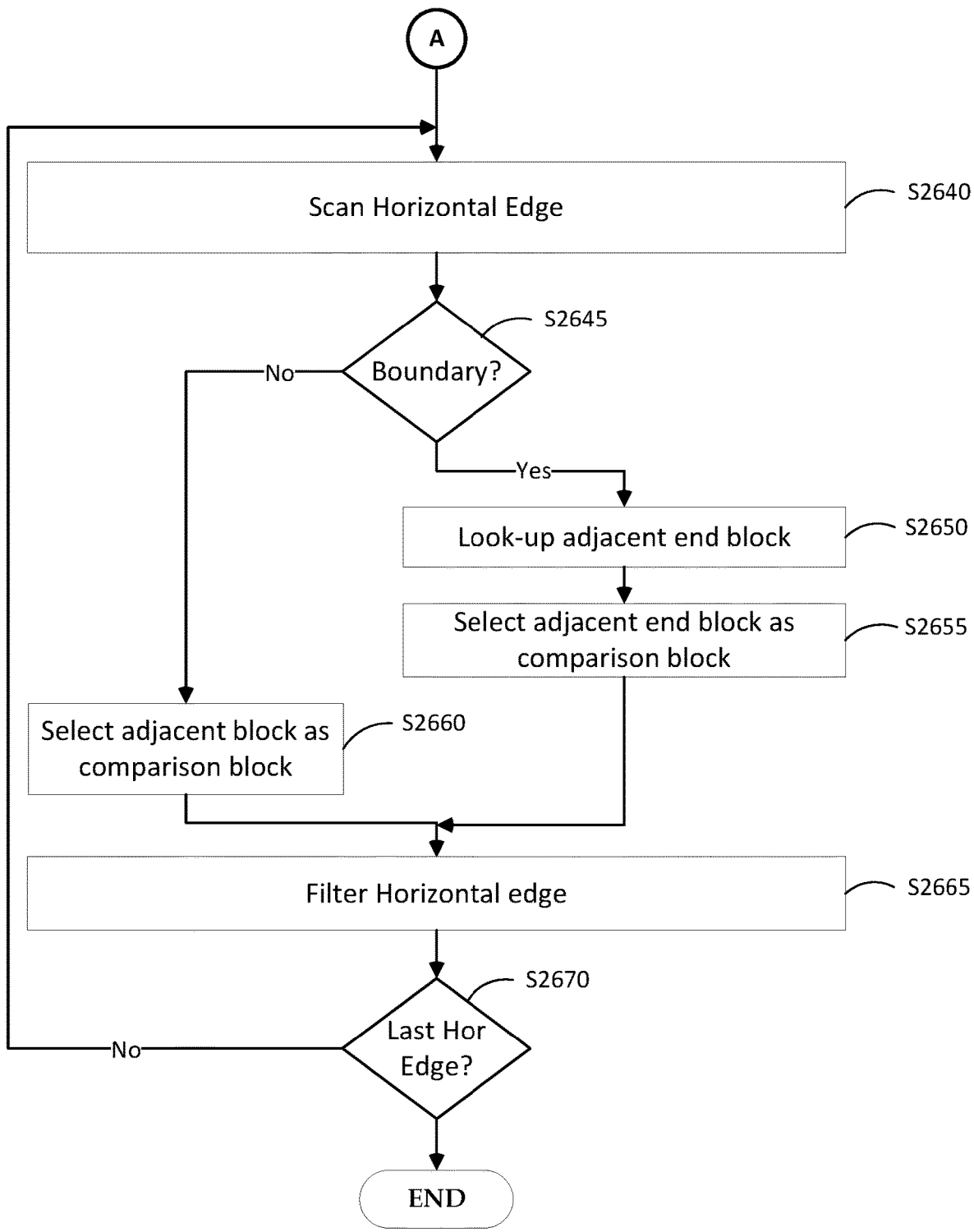

FIGS. 26A and 26B are flowcharts for a method of operating a deblocking filter according to at least one example embodiment. Quantization may introduce blocky artifacts in reconstructed image. The deblocking filter may be configured to smooth the edges between transform blocks. Vertical edges are deblocked first, then horizontal edges are deblocked (however, this order may be different in different implementations). The deblocking filter can be content-adaptive. In other words, the deblocking filter width (e.g., number of pixels deblocked) depends on artifact (or distortion) width or height. Edges can be processed pixel by pixel such that 8, 4, 2 or 1 pixels on either side of the edge are deblocked. The deblocking filter searches for flatness and a distinct step in brightness over the edge. Typically, the boundary of an image, a frame or a slice are not deblocked because there is no comparison block in a 2D image, frame or slice. However, in example embodiments, the image, frame or slice is a spherical image, frame or slice. Accordingly, there are no boundaries as in a 2D image, frame or slice.

As shown in FIG. 26A, in step S2605 a vertical edge is scanned. For example, a scan can begin in the upper left corner (0,0) of the decoded frame. The scan can move down the column until reaching row R-1. Then the scan can begin again at row 0 and work down or scan in a down-up-down sequence. Each scanning of a vertical edge may include one or more blocks.

In step S2610 whether or not the current block is at a frame (or image) boundary is determined. For example, in one example implementation, a C×R matrix of N×N blocks includes pixels in each block. Accordingly, blocks in row 0, column 0, row R-1 and column C-1 include pixels of the spherical image. Therefore, if, during a vertical scan, the C×R matrix of blocks includes pixels in each block and the column=0 or column=C-1, the block is at a boundary. Further in a vertical scan, the blocks to be scanned could be on the left of the block to be processed or the left of the block to be processed. Therefore, if scanning with a left processing orientation, column 0 may include boundary blocks. If scanning with a right processing orientation, column C-1 may include boundary blocks. If scanning with a dual processing orientation, columns 0 and C-1 may include boundary blocks. If the block is at a boundary, processing moves to step S2615. Otherwise, processing continues to step S2625.

In step S2615 an adjacent end block is looked-up. For example, in one example implementation, a C×R matrix of blocks may have an associated LUT mapping boundary blocks to a corresponding adjacent end block. In this example column and row adjacent end blocks can be looked-up in a look-up table (e.g., LUT 2145).

In step S2620 an adjacent end block is selected as a comparison block. For example, as discussed above, during deblocking filtering pixels across an edge of two blocks can be filtered to remove blocky transitions. The comparison block (for a scanned vertical edge block) may be selected from adjacent block(s) (e.g., to the left of the block including the vertical edge to be filtered) as a comparison block. In this case, the block including the vertical edge to be filtered is on an end column in the C×R matrix of the frame (or image). Accordingly, at least one of the adjacent blocks to be selected as a comparison block can be one of the looked-up adjacent end blocks. In other words, the adjacent block to be selected as a comparison block can be other than a left reconstructed block compared to the block to be deblocked.

In step S2625 an adjacent block is selected as a comparison block. For example, as discussed above, during deblocking filtering pixels across an edge of two blocks can be filtered to remove blocky transitions. The comparison block (for a scanned vertical edge block) may be selected from adjacent block(s) (e.g., to the left of the block including the vertical edge to be filtered) as a comparison block. In this case, the block including the vertical edge to be filtered is not on an end column in the C×R matrix of the frame (or image). Accordingly, at least one of the adjacent blocks to be selected as a comparison block can be selected from a block in an adjacent (e.g., to the left) column.

In step S2630 the vertical edge is filtered. For example, as discussed above, the deblocking filter width (e.g., number of pixels deblocked) can depend on artifact (or distortion) width. Therefore, a number of pixels from the block including the vertical edge to be filtered (e.g., 1, 2, 4 or 8) is selected and a corresponding number of from the comparison block are selected. The pixels are then filtered. The filtering (or deblocking) may include, for example, a low pass filter (e.g., to reduce brightness over the edge), applying a regression algorithm over the selected pixels, applying a wavelet-based algorithm over the selected pixels, applying a anisotropic diffusion based algorithm over the selected pixels, and/or performing a weighted sum of pixels over the selected pixels. In any case, deblocking can be performed across block boundaries.

In step S2635 whether or not the current block is the last vertical block is determined. For example, if scanning began at block 0,0, the last block may be block C-1, R-1. If the block is the last vertical block, processing moves to step S2640. Otherwise, processing returns to step S2605.

In step S2640 a horizontal edge is scanned. For example, a scan can begin in the upper left corner (0,0) of the decoded frame. The scan can move along (to the right) a until reaching column C-1. Then the scan can begin again at column 0 and work to the right or scan in a right-left-right sequence. Each scanning of a horizontal edge may include one or more blocks.

In step S2645 whether or not the current block is at a frame (or image) boundary is determined. For example, in one example implementation, a C×R matrix of N×N blocks includes pixels in each block. Accordingly, blocks in row 0, column 0, row R-1 and column C-1 include pixels of the spherical image. Therefore, if, during a horizontal scan, the C×R matrix of blocks includes pixels in each block and the row=0 or row=R-1, the block is at a boundary. If the block is at a boundary, processing moves to step S2650. Otherwise, processing continues to step S2660.

In step S2650 an adjacent end block is looked-up. For example, in one example implementation, a C×R matrix of blocks may have an associated LUT mapping boundary blocks to a corresponding adjacent end block. In this example column and row adjacent end blocks can be looked-up in a look-up table (e.g., LUT 2145).

In step S2655 an adjacent end block is selected as a comparison block. For example, as discussed above, during deblocking filtering pixels across an edge of two blocks can be filtered to remove blocky transitions. The comparison block (for a scanned horizontal edge block) may be selected from adjacent block(s) (e.g., above the block including the horizontal edge to be filtered) as a comparison block. In this case, the block including the horizontal edge to be filtered is on a top or bottom row in the C×R matrix of the frame (or image). Accordingly, at least one of the adjacent blocks to be selected as a comparison block can be one of the looked-up adjacent end blocks. In other words, the adjacent block to be selected as a comparison block can be other than a upper reconstructed block compared to the block to be deblocked.

In step S2660 an adjacent block is selected as a comparison block. For example, as discussed above, during deblocking filtering pixels across an edge of two blocks can be filtered to remove blocky transitions. The comparison block (for a scanned horizontal edge block) may be selected from adjacent block(s) (e.g., above the block including the horizontal edge to be filtered) as a comparison block. In this case, the block including the horizontal edge to be filtered is not on a top or bottom row in the C×R matrix of the frame (or image). Accordingly, at least one of the adjacent blocks to be selected as a comparison block can be selected from a block in an adjacent (e.g., above) row.

In step S2665 the horizontal edge is filtered. For example, as discussed above, the deblocking filter width (e.g., number of pixels deblocked) can depend on artifact (or distortion) height. Therefore, a number of pixels from the block including the horizontal edge to be filtered (e.g., 1, 2, 4 or 8) is selected and a corresponding number of from the comparison block are selected. The pixels are then filtered. The filtering (or deblocking) may include, for example, a low pass filter (e.g., to reduce brightness over the edge), applying a regression algorithm over the selected pixels, applying a wavelet-based algorithm over the selected pixels, applying a anisotropic diffusion based algorithm over the selected pixels, and/or performing a weighted sum of pixels over the selected pixels. In any case, deblocking can be performed across block boundaries.

In step S2670 whether or not the current block is the last horizontal block is determined. For example, if scanning began at block 0,0, the last block may be block C-1, R-1. If the block is the last horizontal block, the deblocking process ends. Otherwise, processing returns to step S2640.

As will be appreciated, the system 100 and 150 illustrated in FIGS. 1A and 1B may be implemented as an element of and/or an extension of the generic computer device 2700 and/or the generic mobile computer device 2750 described below with regard to FIG. 27. Alternatively, or in addition to, the system 100 and 150 illustrated in FIGS. 1A and 1B may be implemented in a separate system from the generic computer device 2700 and/or the generic mobile computer device 2750 having some or all of the features described below with regard to the generic computer device 2700 and/or the generic mobile computer device 2750.

Figure 27:
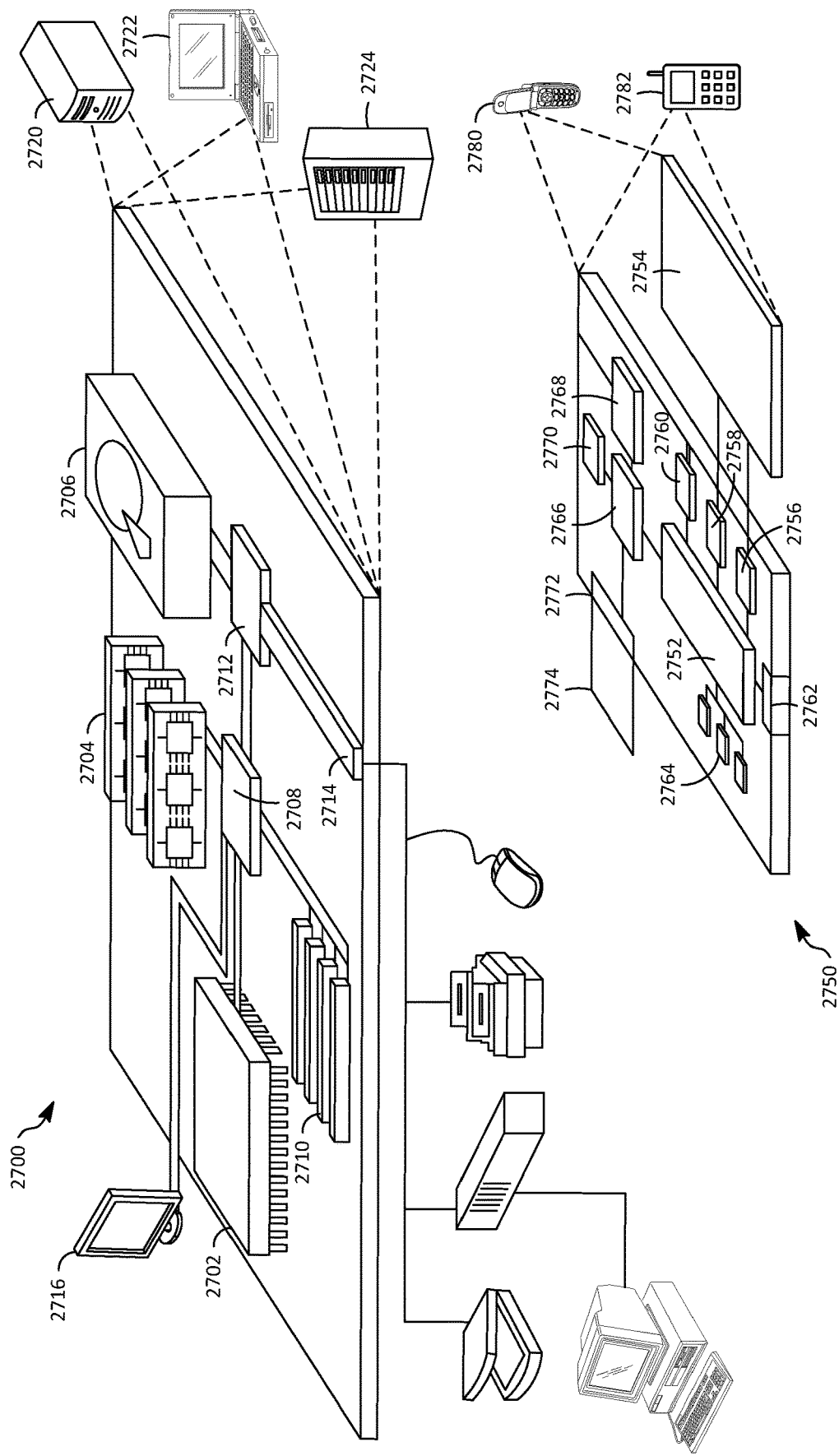
FIG. 27 is a schematic block diagram of a computer device and a mobile computer device that can be used to implement the techniques described herein.

FIG. 27 is a schematic block diagram of a computer device and a mobile computer device that can be used to implement the techniques described herein. FIG. 27 is an example of a generic computer device 2700 and a generic mobile computer device 2750, which may be used with the techniques described here. Computing device 2700 is intended to represent various forms of digital computers, such as laptops, desktops, workstations, personal digital assistants, servers, blade servers, mainframes, and other appropriate computers. Computing device 2750 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 2700 includes a processor 2702, memory 2704, a storage device 2706, a high-speed interface 2708 connecting to memory 2704 and high-speed expansion ports 2710, and a low speed interface 2712 connecting to low speed bus 2714 and storage device 2706. Each of the components 2702, 2704, 2706, 2708, 2710, and 2712, are interconnected using various busses, and may be mounted on a common motherboard or in other manners as appropriate. The processor 2702 can process instructions for execution within the computing device 2700, including instructions stored in the memory 2704 or on the storage device 2706 to display graphical information for a GUI on an external input/output device, such as display 2716 coupled to high speed interface 2708. In other implementations, multiple processors and/or multiple buses may be used, as appropriate, along with multiple memories and types of memory. Also, multiple computing devices 2700 may be connected, with each device providing partitions of the necessary operations (e.g., as a server bank, a group of blade servers, or a multi-processor system).

The memory 2704 stores information within the computing device 2700. In one implementation, the memory 2704 is a volatile memory unit or units. In another implementation, the memory 2704 is a non-volatile memory unit or units. The memory 2704 may also be another form of computer-readable medium, such as a magnetic or optical disk and/or a non-transitory computer readable storage medium.

The storage device 2706 is capable of providing mass storage for the computing device 2700. In one implementation, the storage device 2706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 2704, the storage device 2706, or memory on processor 2702.

The high speed controller 2708 manages bandwidth-intensive operations for the computing device 2700, while the low speed controller 2712 manages lower bandwidth-intensive operations. Such allocation of functions is exemplary only. In one implementation, the high-speed controller 2708 is coupled to memory 2704, display 2716 (e.g., through a graphics processor or accelerator), and to high-speed expansion ports 2710, which may accept various expansion cards (not shown). In the implementation, low-speed controller 2712 is coupled to storage device 2706 and low-speed expansion port 2714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 2700 may be implemented in a number of different forms, as shown in the figure. For example, it may be implemented as a standard server 2720, or multiple times in a group of such servers. It may also be implemented as part of a rack server system 2724. In addition, it may be implemented in a personal computer such as a laptop computer 2722. Alternatively, components from computing device 2700 may be combined with other components in a mobile device (not shown), such as device 2750. Each of such devices may contain one or more of computing device 2700, 2750, and an entire system may be made up of multiple computing devices 2700, 2750 communicating with each other.

Computing device 2750 includes a processor 2752, memory 2764, an input/output device such as a display 2754, a communication interface 2766, and a transceiver 2768, among other components. The device 2750 may also be provided with a storage device, such as a microdrive or other device, to provide additional storage. Each of the components 2750, 2752, 2764, 2754, 2766, and 2768, are interconnected using various buses, and several of the components may be mounted on a common motherboard or in other manners as appropriate.

The processor 2752 can execute instructions within the computing device 2750, including instructions stored in the memory 2764. The processor may be implemented as a chipset of chips that include separate and multiple analog and digital processors. The processor may provide, for example, for coordination of the other components of the device 2750, such as control of user interfaces, applications run by device 2750, and wireless communication by device 2750.

Processor 2752 may communicate with a user through control interface 2758 and display interface 2756 coupled to a display 2754. The display 2754 may be, for example, a TFT LCD (Thin-Film-Transistor Liquid Crystal Display) or an OLED (Organic Light Emitting Diode) display, or other appropriate display technology. The display interface 2756 may comprise appropriate circuitry for driving the display 2754 to present graphical and other information to a user. The control interface 2758 may receive commands from a user and convert them for submission to the processor 2752. In addition, an external interface 2762 may be provide in communication with processor 2752, so as to enable near area communication of device 2750 with other devices. External interface 2762 may provide, for example, for wired communication in some implementations, or for wireless communication in other implementations, and multiple interfaces may also be used.

The memory 2764 stores information within the computing device 2750. The memory 2764 can be implemented as one or more of a computer-readable medium or media, a volatile memory unit or units, or a non-volatile memory unit or units. Expansion memory 2774 may also be provided and connected to device 2750 through expansion interface 2772, which may include, for example, a SIMM (Single In Line Memory Module) card interface. Such expansion memory 2774 may provide extra storage space for device 2750, or may also store applications or other information for device 2750. Specifically, expansion memory 2774 may include instructions to carry out or supplement the processes described above, and may include secure information also. Thus, for example, expansion memory 2774 may be provide as a security module for device 2750, and may be programmed with instructions that permit secure use of device 2750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 2764, expansion memory 2774, or memory on processor 2752, that may be received, for example, over transceiver 2768 or external interface 2762.

Device 2750 may communicate wirelessly through communication interface 2766, which may include digital signal processing circuitry where necessary. Communication interface 2766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 2768. In addition, short-range communication may occur, such as using a Bluetooth, WiFi, or other such transceiver (not shown). In addition, GPS (Global Positioning System) receiver module 2770 may provide additional navigation- and location-related wireless data to device 2750, which may be used as appropriate by applications running on device 2750.

Device 2750 may also communicate audibly using audio codec 2760, which may receive spoken information from a user and convert it to usable digital information. Audio codec 2760 may likewise generate audible sound for a user, such as through a speaker, e.g., in a handset of device 2750. Such sound may include sound from voice telephone calls, may include recorded sound (e.g., voice messages, music files, etc.) and may also include sound generated by applications operating on device 2750.

The computing device 2750 may be implemented in a number of different forms, as shown in the figure. For example, it may be implemented as a cellular telephone 2780. It may also be implemented as part of a smart phone 2782, personal digital assistant, or other similar mobile device.

Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of non-transitory program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

Example embodiments describe techniques for converting spherical images and video to 2D representations and leveraging special characteristics of the 2D representations during encoding/decoding of the images and/or frames of a video.

In a general aspect, a method for encoding a spherical video can include mapping a frame of the spherical video to a two dimensional representation based on a projection. Further, in a prediction process the method can include determining whether at least one block associated with a prediction scheme is on a boundary of the two dimensional representation, and upon determining the at least one block associated with the prediction scheme is on the boundary, select an adjacent end block as a block including at least one pixel for use during the prediction process, the adjacent end block being associated with two or more boundaries of the two dimensional representation.

Implementations can include one or more of the following features. For example, the prediction process can be an intra-prediction process, the at least one block associated with the prediction scheme can be a block to be encoded, and the adjacent end block can be selected as one of a left reconstructed block or an upper reconstructed block of the block to be encoded. The prediction process can be an inter-prediction process, and the at least one block associated with the prediction scheme can be a block included in a plurality of blocks in a reference frame to be searched for a matching block. The prediction process can be an inter-prediction process, and the at least one block associated with the prediction scheme can be selected as a prediction block from a plurality of blocks in a reference frame to be searched, the plurality of blocks crossing a boundary of the reference frame.

For example, the mapping of the frame of the spherical video to the two dimensional representation can include using an equation based on an equirectangular projection. The mapping of the frame of the spherical video to the two dimensional representation can include using an equation based on a semi-equirectangular projection. For example, the method can further include upon determining the block to be encoded is away from the boundary, in an intra-prediction process, select an adjacent block as a template, the adjacent end block being at least one of a left reconstructed block or an upper reconstructed block of the block to be encoded. The selecting of the adjacent end block includes selecting a reconstructed block from at least one of an opposite end of a same row as the block associated with the prediction scheme or an opposite end of a same column as the block to be encoded. The selecting of the adjacent end block includes selecting a reconstructed block from a lookup table.

For example, the method can further include generating at least one residual based on un-encoded pixels of a block to be encoded, encoding the at least one residual by applying a transform to a residual block including the at least one residual, quantizing transform coefficients associated with the encoded at least one residual, entropy encoding the quantized transform coefficients as a compressed video bit stream, and transmitting the compressed video bit stream including a header indicating a intra-frame coding mode, the intra-frame coding mode indicating a technique used during the mapping of the frame of the spherical video to the two dimensional representation.

In a general aspect, a method for decoding a spherical video includes receiving an encoded bit stream including a header indicating a intra-frame coding mode, the intra-frame coding mode indicating a technique used during a conversion of a frame of a spherical video to a two dimensional representation. Further, in a prediction process the method can include determining whether at least one block associated with a prediction scheme is on a boundary of the two dimensional representation, upon determining the at least one block associated with the prediction scheme is on the boundary, select an adjacent end block as a block including at least one pixel for use during the prediction process the adjacent end block being associated with two or more boundaries of the two dimensional representation. The method further includes converting the two dimensional representation to a frame of the spherical video based on a cylindrical projection.

Implementations can include one or more of the following features. For example, the converting of the two dimensional representation can include mapping the two dimensional representation to a spherical image using an equation based on inverse transformation of a projection. The prediction process can be an intra-prediction process, the at least one block associated with the prediction scheme can be a block to be encoded, and the adjacent end block can be selected as one of a left reconstructed block or an upper reconstructed block. For example, the prediction process can be an inter-prediction process, and the at least one block associated with the prediction scheme can be a block included in a plurality of blocks in a reference frame to be searched for a matching block. The prediction process can be an inter-prediction process, and the at least one block associated with the prediction scheme can be selected as a prediction block from a plurality of blocks in a reference frame to be searched, the plurality of blocks crossing a boundary of the reference frame.

In a general aspect, a non-transitory computer-readable storage medium may have stored thereon computer executable program code which, when executed on a computer system, causes the computer system to perform steps including mapping a frame of the spherical video to a two dimensional representation based on a projection. Further, in a prediction process, the steps can include determining whether at least one block associated with a prediction scheme is on a boundary of the two dimensional representation, and upon determining the at least one block associated with the prediction scheme is on the boundary, select an adjacent end block as a block including at least one pixel for use during the prediction process, the adjacent end block being associated with two or more boundaries of the two dimensional representation.

Implementations can include one or more of the following features. For example, the prediction process can be an intra-prediction process, the at least one block associated with the prediction scheme can be a block to be encoded, and the adjacent end block can be selected as one of a left reconstructed block or an upper reconstructed block of the block to be encoded. For example, the prediction process can be an inter-prediction process, and the at least one block associated with the prediction scheme can be a block included in a plurality of blocks in a reference frame to be searched for a matching block. The prediction process can be an inter-prediction process, and the at least one block associated with the prediction scheme can be selected as a prediction block from a plurality of blocks in a reference frame to be searched, the plurality of blocks crossing a boundary of the reference frame. The selecting of the adjacent end block can include selecting a reconstructed block from at least one of an opposite end of a same row as the block associated with the prediction scheme or an opposite end of a same column as the block to be encoded.

Example embodiments describe systems and methods to optimize streaming spherical video (and/or other three dimensional video) based on visible (by a viewer of a video) portions of the spherical video.

In a general aspect, a method includes determining a tile position in a frame of a spherical video based on a view perspective, selecting a first portion of the frame of the spherical video as a first two dimensional tile based on the tile position, selecting a plurality of second two dimensional tiles from a second portion of the frame of the spherical video, the second portion of the frame surrounding the first portion of the frame and extending away from the first portion of the frame, encoding the first two dimensional tile using a first quality, encoding the plurality of second two dimensional tiles using at least one second quality, and transmitting a packet, as a streaming spherical video, the packet including the encoded first two dimensional tile and the plurality of encoded second two dimensional tiles.

Implementations can include one or more of the following features. For example, the method can further include mapping the frame of the spherical video to a two dimensional representation based on a projection to a surface of a two dimensional shape. The first quality is a higher quality as compared to the at least one second quality. The view perspective is based on a viewable portion of the spherical video as seen by a viewer during a playback of the spherical video. For example, the method can further include receiving an indication of the view perspective from a device executing a playback of the spherical video. The packet further includes a header and a mimicked frame including dummy data in data locations of the frame that are not associated with encoded first two dimensional tile and the plurality of encoded second two dimensional tiles. The plurality of encoded second two dimensional tiles include two or more two dimensional tiles of different sizes and the two or more two dimensional tiles overlap each other. As the plurality of second two dimensional tiles extend away from the first portion of the frame, the plurality of second two dimensional tiles includes a third tile that has a dimension that is larger as compared to a dimension of a fourth tile that is closer to the first tile.

The plurality of second two dimensional tiles including tiles of differing dimensions, and a larger of the tiles of differing dimensions is encoded with a lower quality as compared to a smaller of the tiles of differing dimensions. The encoding of the first two dimensional tile and of the plurality of second two dimensional tiles can include separately encoding each tile the encoding can include generating at least one residual for the two dimensional tile by subtracting a template from un-encoded pixels of a block of the two dimensional tile to be encoded, encoding the at least one residual by applying a transform to a residual block including the at least one residual, quantizing transform coefficients associated with the encoded at least one residual, and entropy encoding the quantized transform coefficients as at least one compressed video bit, wherein at least one of the generating of the at least one residual, the encoding of the at least one residual, the quantizing of the transform coefficients, and the quantizing of the transform coefficients includes setting of at least one parameter based on the first quality.

In a general aspect, a method includes receiving an encoded bit stream including a plurality of encoded two dimensional tiles selected from a frame of a spherical video, decoding a two dimensional representation based on the plurality of encoded two dimensional tiles, converting the two dimensional representation to a spherical video frame, and playing back the spherical video including the spherical video frame. The spherical video frame can include a higher quality tile associated with a portion of the spherical video frame at a view perspective as seen by a viewer as compared to a portion of the spherical video frame at a peripheral view or outside the view perspective during the playback of the spherical video.

Implementations can include one or more of the following features. For example, the method can further include generating the two dimensional representation based on a mimicked frame of the spherical video including dummy data in data locations of the frame that are not associated with the plurality of encoded two dimensional tiles. The converting of the two dimensional representation of the spherical video frame includes mapping the two dimensional representation of the spherical video frame to a spherical image using an inverse of a technique used to map the spherical video frame to the two dimensional representation of the spherical video frame. For example, the method can further include determining the view perspective as seen by a viewer has changed, and upon determining the view perspective has changed, triggering an indication of the changed view perspective to a device executing an encoding of the spherical video.

In a general aspect, a non-transitory computer-readable storage medium having stored thereon computer executable program code which, when executed on a computer system, causes the computer system to perform steps including determining a tile position in a frame of a spherical video based on a view perspective, selecting a first portion of the frame of the spherical video as a first two dimensional tile based on the tile position, selecting a plurality of second two dimensional tiles from a second portion of the frame of the spherical video, the second portion of the frame surrounding the first portion of the frame and extending away from the first portion of the frame, encoding the first two dimensional tile using a first quality, encoding the plurality of second two dimensional tiles using at least one second quality, and transmitting a packet, as a streaming spherical video, the packet including the encoded first two dimensional tile and the plurality of encoded second two dimensional tiles.

Implementations can include one or more of the following features. For example, the first quality is a higher quality as compared to the at least one second quality. The view perspective is based on a viewable portion of the spherical video as seen by a viewer during a playback of the spherical video. The steps can further include receiving an indication of the view perspective from a device executing a playback of the spherical video. The plurality of encoded second two dimensional tiles include two or more two dimensional tiles of different sizes and the two or more two dimensional tiles overlap each other. As the plurality of second two dimensional tiles extend away from the first portion of the frame, the plurality of second two dimensional tiles includes a third tile that has a dimension that is larger as compared to a dimension of a fourth tile that is closer to the first tile.

Example embodiments describe systems and methods to optimize streaming spherical video (and/or other three dimensional video) based on visible (by a viewer of a video) portions of the spherical video.

In a general aspect, a method includes determining a tile position in a frame of a spherical video based on a view perspective, selecting a portion of the frame of the spherical video as a two dimensional tile based on the tile position, encoding the two dimensional tile at a first quality, mapping the frame of the spherical video to a two dimensional representation of the spherical video based on a two dimensional projection algorithm, and encoding the two dimensional representation of the spherical video at a second quality.

Implementations can include one or more of the following features. For example, the method can further include transmitting the encoded two dimensional tile and the encoded two dimensional representation as a streaming spherical video. The first quality is a higher quality as compared to the second quality. The view perspective can be based on a viewable portion of the spherical video as seen by a viewer during a playback of the spherical video. For example, the method can further include receiving an indication of the view perspective from a device executing a playback of the spherical video. For example, the method can further include transmitting the encoded two dimensional tile over a first time period while streaming the spherical video, and transmitting the encoded two dimensional tile and the encoded two dimensional representation over a first time period while streaming the spherical video.

For example, the selecting of the portion of the frame of the spherical video as the two dimensional tile and the encoding of the two dimensional tile can include selecting the two dimensional tile from a datastore of previously encoded tiles and reading the from the two dimensional tile from the datastore. The selecting of the portion of the frame of the spherical video as the two dimensional tile can include selecting the two dimensional tile from the frame of the spherical video as a frame to be encoded based on a position on the spherical video, wherein the position on the spherical video is based on the view perspective. The encoding of the two dimensional tile can include generating at least one residual for the two dimensional tile by subtracting a template from un-encoded pixels of a block of the two dimensional tile to be encoded, encoding the at least one residual by applying a transform to a residual block including the at least one residual, quantizing transform coefficients associated with the encoded at least one residual and entropy encoding the quantized transform coefficients as at least one compressed video bit, wherein at least one of the generating of the at least one residual, the encoding of the at least one residual, the quantizing of the transform coefficients, and the quantizing of the transform coefficients includes setting of at least one parameter based on the first quality.

For example, the encoding of the two dimensional representation of the spherical video can include generating at least one residual for the two dimensional representation of the spherical video by subtracting a template from un-encoded pixels of a block of the two dimensional representation of the spherical video to be encoded, encoding the at least one residual by applying a transform to a residual block including the at least one residual, quantizing transform coefficients associated with the encoded at least one residual, and entropy encoding the quantized transform coefficients as at least one compressed video bit, wherein at least one of the generating of the at least one residual, the encoding of the at least one residual, the quantizing of the transform coefficients, and the quantizing of the transform coefficients includes setting of at least one parameter based on the second quality.

In a general aspect, a method includes receiving an encoded bit stream including an encoded two dimensional representation of a spherical video frame and an encoded two dimensional tile selected from the spherical video frame, decoding the two dimensional tile, decoding the two dimensional representation of the spherical video frame, converting the two dimensional representation to the spherical video frame, and replacing corresponding blocks of the spherical video frame with the decoded two dimensional tile.

Implementations can include one or more of the following features. For example, the receiving of the encoded bit stream includes receiving a header indicating a technique used during a conversion of a frame of the spherical video to the two dimensional representation of the spherical video frame. The replacing of the corresponding blocks of the spherical video frame with the decoded two dimensional tile includes one of pixel by pixel or block by block replacement of pixels or blocks in the decoded and converted spherical video frame with pixels or blocks of the decoded two dimensional tile.

For example, the converting of the two dimensional representation of the spherical video frame includes mapping the two dimensional representation of the spherical video frame to a spherical image using an inverse of a technique used to map the spherical video frame to the two dimensional representation of the spherical video frame. For example, the method can further include generating a spherical video stream based on at least one spherical video frame including the replaced two dimensional tile such that during a playback of the spherical video stream, wherein a visible portion of the spherical video stream is of a higher quality than a non-visible portion of the spherical video stream.

In a general aspect, a non-transitory computer-readable storage medium having stored thereon computer executable program code which, when executed on a computer system, causes the computer system to perform steps including determining a tile position in a frame of a spherical video based on a view perspective, selecting a portion of the frame of the spherical video as a two dimensional tile based on the tile position, encoding the two dimensional tile at a first quality, mapping the frame of the spherical video to a two dimensional representation of the spherical video based on a two dimensional projection algorithm, and encoding the two dimensional representation of the spherical video at a second quality.

Implementations can include one or more of the following features. For example, the steps can further include receiving an indication of the view perspective from a device executing a playback of the spherical video, wherein the view perspective is based on a viewable portion of the spherical video as seen by a viewer during the playback of the spherical video. The first quality is a higher quality as compared to the second quality. The selecting of the portion of the frame of the spherical video as the two dimensional tile and the encoding of the two dimensional tile can include selecting the two dimensional tile from a datastore of previously encoded tiles, and reading the two dimensional tile from the two dimensional tile from the datastore. The selecting of the portion of the frame of the spherical video as the two dimensional tile can include selecting the two dimensional tile from the frame of the spherical video as a frame to be encoded based on a position on the spherical video, wherein the position on the spherical video is based on the view perspective.

Example embodiments describe techniques for converting spherical images and video to 2D representations and leveraging special characteristics of the 2D representations during encoding/decoding of the images and/or frames of a video.

In a general aspect, a method for encoding a spherical video can include mapping a frame of a spherical video to a first two dimensional representation based on a spherical to square projection, the first two dimensional representation being a square, mapping the first two dimensional representation to a second two dimensional representation, the second two dimensional representation being a rectangle, and encoding the second two dimensional representation as an encoded bit stream.

Implementations can include one or more of the following features. For example, the spherical to square projection can be a Peirce quincuncial projection. For example, during an intra-prediction process, the method can include determining whether a block to be encoded is on a boundary of the second two dimensional representation, and upon determining the block to be encoded is on the boundary, select an adjacent end block as a template, the adjacent end block being other than a left reconstructed block or an upper reconstructed block of the block to be encoded. The method can further include determining whether a block to be deblocked is on a boundary of the two dimensional representation, and upon determining the block to be deblocked is on the boundary, select an adjacent end block as a comparison block, the adjacent end block being other than a left reconstructed block or an upper reconstructed block of to the block to be deblocked.

For example, the second two dimensional representation is formed of two squares with equal length sides, and the two squares generated from the first two dimensional representation. The mapping of the first two dimensional representation to the second two dimensional representation can include determining a first square with corners that intersect each side of the first two dimensional representation equidistant from the corners of the first two dimensional representation, determining four triangles each having a side in contact with a different side of an inner circle of the frame of the spherical video, generating a second square based on the four triangles, and generating the second two dimensional representation based on the first square and the second square. The method can further include generating a look-up table indicating a position of at least one corresponding adjacent end block.

For example, the encoding of the second two dimensional representation can include generating at least one residual by subtracting a template from un-encoded pixels of the block to be encoded, encoding the at least one residual by applying a transform to a residual block including the at least one residual, quantizing transform coefficients associated with the encoded at least one residual, entropy encoding the quantized transform coefficients as a compressed video bit stream, and transmitting the compressed video bit stream including a header indicating a intra-frame coding mode, the intra-frame coding mode indicating a technique used during the mapping of the frame of the spherical video to the two dimensional representation.

In a general aspect, a method for decoding a spherical video can include receiving an encoded bit stream including a header indicating a projection technique used during a conversion of a frame of a spherical video to a first two dimensional representation, decoding the first two dimensional representation, mapping the first two dimensional representation to a second two dimensional representation, the first two dimensional representation being a rectangle and the second two dimensional representation being a square, and mapping the second two dimensional representation to a frame of the spherical video based on a spherical to square projection.

Implementations can include one or more of the following features. For example, the spherical to square projection is a Peirce quincuncial projection. During an intra-prediction process, the method can further include determining whether a block to be decoded is on a boundary of the first two dimensional representation, and upon determining the block to be decoded is on the boundary, select an adjacent end block as a template, the adjacent end block being other than a left reconstructed block or an upper reconstructed block of the block to be encoded.

For example, the method can further include determining whether a block to be deblocked is on a boundary of the two dimensional representation, and upon determining the block to be deblocked is on the boundary, select an adjacent end block as a comparison block, the adjacent end block being other than a left reconstructed block or an upper reconstructed block of to the block to be deblocked. The first two dimensional representation is formed of two squares with equal length sides. For example, the mapping of the first two dimensional representation to the second two dimensional representation can include generating a first square and a second square based on the first two dimensional representation, determining four triangles from the second square each of the triangles having a side of the second square, and repositioning three of the four triangles to form a third square as the second two dimensional representation.

The method can further include generating a look-up table indicating a position of at least one corresponding adjacent end block. The decoding of the first two dimensional representation can include entropy decoding the encoded bit stream to generate quantized encoded transform coefficients, de-quantizing the quantized encoded transform coefficients to generate encoded transform coefficients, applying a transform to the encoded transform coefficients to generate at least one reconstructed prediction residual, and adding the at least one reconstructed prediction residual to a prediction block associated with the matched template to reconstruct a pixel block.

In a general aspect a non-transitory computer-readable storage medium having stored thereon computer executable program code which, when executed on a computer system, causes the computer system to perform steps including mapping a frame of a spherical video to a first two dimensional representation based on a spherical to square projection, the first two dimensional representation being a square, mapping the first two dimensional representation to a second two dimensional representation, the second two dimensional representation being a rectangle, and encoding the second two dimensional representation as an encoded bit stream.

Implementations can include one or more of the following features. For example, during an intra-prediction process, the steps can further include determining whether a block to be encoded is on a boundary of the second two dimensional representation, and upon determining the block to be encoded is on the boundary, select an adjacent end block as a template, the adjacent end block being other than a left reconstructed block or an upper reconstructed block of the block to be encoded. The steps further include determining whether a block to be deblocked is on a boundary of the two dimensional representation, and upon determining the block to be deblocked is on the boundary, select an adjacent end block as a comparison block, the adjacent end block being other than a left reconstructed block or an upper reconstructed block of to the block to be deblocked.

The mapping of the first two dimensional representation to the second two dimensional representation can include determining a first square with corners that intersect each side of the first two dimensional representation equidistant from the corners of the first two dimensional representation, determining four triangles each having a side in contact with a different side of an inner circle of the frame of the spherical video, generating a second square based on the four triangles, and generating the second two dimensional representation based on the first square and the second square.

Whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A method, comprising:
transmitting an encoded first two dimensional tile based on a first view perspective; receiving a tile position for a second two dimensional tile, the tile position being based on a second view perspective associated with playback of a spherical video;
selecting, during playback of the spherical video, the second two dimensional tile from a frame of the spherical video as a frame to be encoded based on the position on the spherical video, the position on the spherical video being based on the second view perspective;
rotating the frame of the spherical video, based on a projection algorithm, to orient the tile position from a first position having a first distortion to a second position having a second distortion, the second distortion being less than the first distortion; and
after rotating the frame of the spherical video based on the projection algorithm:
  mapping the frame of the spherical video to a two dimensional representation of the spherical video based on a two dimensional projection algorithm,
  encoding the second two dimensional tile at a first quality based on a head movement speed associated with a user viewing the spherical video, the encoding of the second two dimensional tile including:
    generating at least one residual for the two dimensional tile by subtracting a template from unencoded pixels of a block of the two dimensional tile to be encoded;
    encoding the at least one residual by applying a transform to a residual block including the at least one residual; and
    quantizing transform coefficients associated with the encoded at least one residual; and
  entropy encoding the quantized transform coefficients as at least one compressed video bit, wherein at least one of the generating of the at least one residual, the encoding of the at least one residual, the quantizing of the transform coefficients, and the quantizing of the transform coefficients includes setting of at least one parameter for encoding the mapped frame of the spherical video based on a second quality responsive to detecting a change in a position of the head associated with the user viewing the spherical video, the first quality being a higher quality as compared to the second quality; and
  encoding the mapped frame of the spherical video and transmitting the encoded second two dimensional tile and the encoded mapped frame of the spherical video as a streaming spherical video, and wherein a size of the second two dimensional tile is variable based on the head movement speed.

2. The method of claim 1, wherein the second view perspective is a view perspective associated with a device executing a playback of the spherical video and wherein encoding the mapped frame of the spherical video is further based on a width of a field of view associated with the device.

3. The method of claim 1, further comprising one of:
transmitting the encoded second two dimensional tile over a first time period while streaming the spherical video; or
transmitting the encoded second two dimensional tile and the encoded two dimensional representation over a first time period while streaming the spherical video.

4. The method of claim 1, before transmitting the encoded first two dimensional tile, the method further comprising:
selecting the first two dimensional tile from a datastore of previously encoded tiles; and reading the two dimensional tile from the datastore.

5. The method of claim 1, further comprising:
transmitting the encoded second two dimensional tile and the encoded mapped frame of the spherical video as a streaming spherical video including a header indicating an intra-frame coding mode used by the two dimensional projection algorithm.

6. A non-transitory computer-readable storage medium having stored thereon computer executable program code which, when executed on a computer system, causes the computer system to perform steps comprising:
transmitting an encoded first two dimensional tile based on a first view perspective; receiving a tile position for a second two dimensional tile, the tile position being based on a second view perspective associated with playback of a spherical video;
selecting, during playback of the spherical video, the second two dimensional tile from a frame of the spherical video as a frame to be encoded based on the position on the spherical video, the position on the spherical video being based on the view perspective;
rotating the frame of the spherical video, based on a projection algorithm, to orient the tile position from a first position having a first distortion to a second position having a second distortion, the second distortion being less than the first distortion; and
after rotating the frame of the spherical video based on the projection algorithm:
  mapping the frame of the spherical video to a two dimensional representation of the spherical video based on a two dimensional projection algorithm,
  encoding the second two dimensional tile at a first quality based on a head movement speed associated with a user viewing the spherical video, the encoding of the second two dimensional tile including:

generating at least one residual for the two dimensional tile by subtracting a template from unencoded pixels of a block of the two dimensional tile to be encoded, encoding the at least one residual by applying a transform to a residual block including the at least one residual, quantizing transform coefficients associated with the encoded at least one residual, and entropy encoding the quantized transform coefficients as at least one compressed video bit, wherein at least one of the generating of the at least one residual, the encoding of the at least one residual, the quantizing of the transform coefficients, and the quantizing of the transform coefficients includes setting of at least one parameter based on the first quality, setting of at least one parameter for encoding the mapped frame of the spherical video based on a second quality responsive to detecting a change in a position of the head associated with the user viewing the spherical video, the first quality being a higher quality as compared to the second quality, and encoding the mapped frame of the spherical video; and transmitting the encoded second two dimensional tile and the encoded mapped frame of the spherical video as a streaming spherical video, and wherein a size of the second two dimensional tile is variable based on the head movement speed.

7. The non-transitory computer-readable storage medium of claim 6, wherein the steps further comprise transmitting the encoded second two dimensional tile and the encoded mapped frame of the spherical video as a streaming spherical video.

8. The non-transitory computer-readable storage medium of claim 6, wherein the second quality is configured to conserve processing resources while streaming of the spherical video.

9. The non-transitory computer-readable storage medium of claim 6, wherein the steps further comprise one of:
transmitting the second encoded two dimensional tile over a first time period while streaming the spherical video; or
transmitting the second encoded two dimensional tile and the encoded two dimensional representation over a first time period while streaming the spherical video.

10. The non-transitory computer-readable storage medium of claim 6, wherein before transmitting the encoded first two dimensional tile, the steps further comprise:
selecting the first two dimensional tile from a datastore of previously encoded tiles; and reading the two dimensional tile from the datastore.

11. The non-transitory computer-readable storage medium of claim 6, wherein the steps further comprise:
transmitting the encoded second two dimensional tile and the encoded mapped frame of the spherical video as a streaming spherical video including a header indicating the two dimensional projection algorithm.

12. A streaming server, comprising: a processor; and a memory including processor executable program code which, when executed by the processor, causes the processor to perform steps comprising:
transmitting an encoded first two dimensional tile based on a first view perspective; receiving a tile position for a second two dimensional tile, the tile position being based on a second view perspective associated with playback of a spherical video;

selecting, during playback of the spherical video, the second two dimensional tile from a frame of the spherical video as a frame to be encoded based on the position on the spherical video, the position on the spherical video being based on the view perspective;

rotating the frame of the spherical video, based on a projection algorithm, to orient the tile position from a first position having a first distortion to a second position having a second distortion, the second distortion being less than the first distortion; and after rotating the frame of the spherical video based on the projection algorithm:
mapping the frame of the spherical video to a two dimensional representation of the spherical video based on a two dimensional projection algorithm, encoding the second two dimensional tile at a first quality based on a head rotation speed associated with a user viewing the spherical video, the encoding of the second two dimensional tile including:

generating at least one residual for the two dimensional tile by subtracting a template from unencoded pixels of a block of the two dimensional tile to be encoded, encoding the at least one residual by applying a transform to a residual block including the at least one residual, and quantizing transform coefficients associated with the encoded at least one residual, and entropy encoding the quantized transform coefficients as at least one compressed video bit, wherein at least one of the generating of the at least one residual, the encoding of the at least one residual, the quantizing of the transform coefficients, and the quantizing of the transform coefficients includes setting of at least one parameter based on the first quality;

setting of at least one parameter for encoding the mapped frame of the spherical video based on a second quality responsive to detecting a change in a position of the head associated with the user viewing the spherical video, the first quality being a higher quality as compared to the second quality, and encoding the mapped frame of the spherical video; and transmitting the encoded second two dimensional tile and the encoded mapped frame of the spherical video as a streaming spherical video, and wherein a size of the second two dimensional tile is variable based on the head movement speed.

13. The streaming server of claim 12, wherein the steps further comprise transmitting the encoded second two dimensional tile and the encoded mapped frame of the spherical video as a streaming spherical video.

14. The streaming server of claim 12, wherein the second quality is configured to conserve processing resources while streaming of the spherical video.

15. The streaming server of claim 12, wherein the steps further comprise one of:
transmitting the second encoded two dimensional tile over a first time period while streaming the spherical video; or
transmitting the second encoded two dimensional tile and the encoded two dimensional representation over a first time period while streaming the spherical video.

16. The streaming server of claim 12, wherein before transmitting the encoded first two dimensional tile, the steps further comprise:
   selecting the first two dimensional tile from a datastore of previously encoded tiles; and
   reading the two dimensional tile from the datastore.

* * * * *